(12) United States Patent
Welin

(10) Patent No.: US 8,503,323 B2
(45) Date of Patent: *Aug. 6, 2013

(54) PROCESSING UNIT DECODING PACKETS WITH DEADLINES IN COMMUNICATIONS CHANNEL

(75) Inventor: Andrew W. Welin, Dunsmuir, CA (US)

(73) Assignee: Texas Instruments Incorporated, Dallas, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/179,103

(22) Filed: Jul. 8, 2011

(65) Prior Publication Data

US 2011/0261719 A1    Oct. 27, 2011

Related U.S. Application Data

(62) Division of application No. 12/688,968, filed on Jan. 18, 2010, now Pat. No. 8,009,688, which is a division of application No. 11/218,449, filed on Sep. 1, 2005, now abandoned, which is a division of application No. 09/785,768, filed on Feb. 16, 2001, now Pat. No. 6,975,629.

(60) Provisional application No. 60/191,375, filed on Mar. 22, 2000.

(51) Int. Cl.
| | |
|---|---|
| *H04L 1/00* | (2006.01) |
| *H04L 12/28* | (2006.01) |
| *H04J 1/16* | (2006.01) |
| *H04J 3/14* | (2006.01) |

(52) U.S. Cl.
USPC .......... 370/252; 370/229; 370/230; 370/352; 370/389; 370/392; 370/394; 370/412; 370/413

(58) Field of Classification Search
None
See application file for complete search history.

(56) References Cited

U.S. PATENT DOCUMENTS 8,009,688 B2 *   8/2011   Welin ............................ 370/412

* cited by examiner

*Primary Examiner* — Hassan Phillips
*Assistant Examiner* — Lonnie Sweet
(74) *Attorney, Agent, or Firm* — Lawrence J. Bassuk; W. James Brady; Frederick J. Telecky, Jr.

(57) ABSTRACT

A method of processing first and second record packets of real-time information includes computing for each packet a deadline interval and ordering processing of the packets according to the respective deadline intervals. A single-chip integrated circuit has a processor circuit and embedded electronic instructions forming an egress packet control establishing an egress scheduling list structure and operations in the processor circuit that extract a packet deadline intervals, place packets in the egress scheduling list according to deadline intervals; and embed a decoder that decodes the packets according to a priority depending to their deadline intervals.

3 Claims, 23 Drawing Sheets

$$X = \frac{\text{DECODE EXECUTE TIME}}{\text{TIME AVAILABLE FOR DECODE}}$$

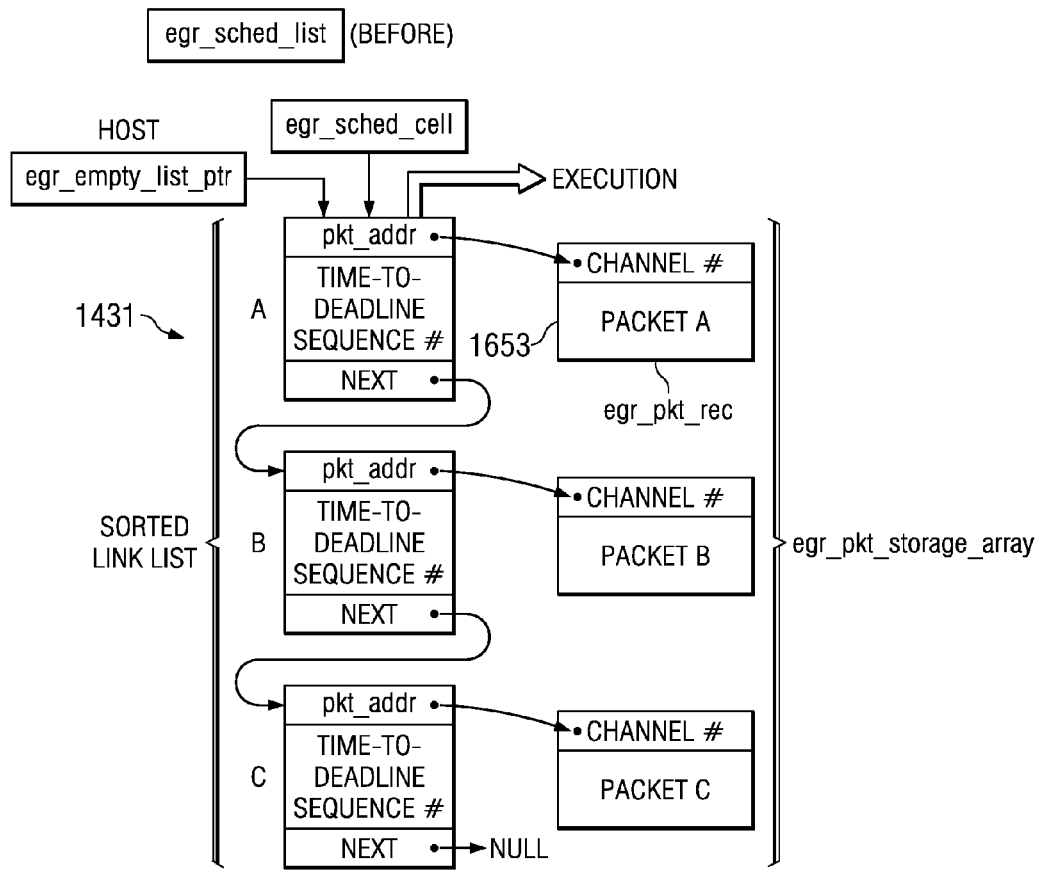
FIG. 16
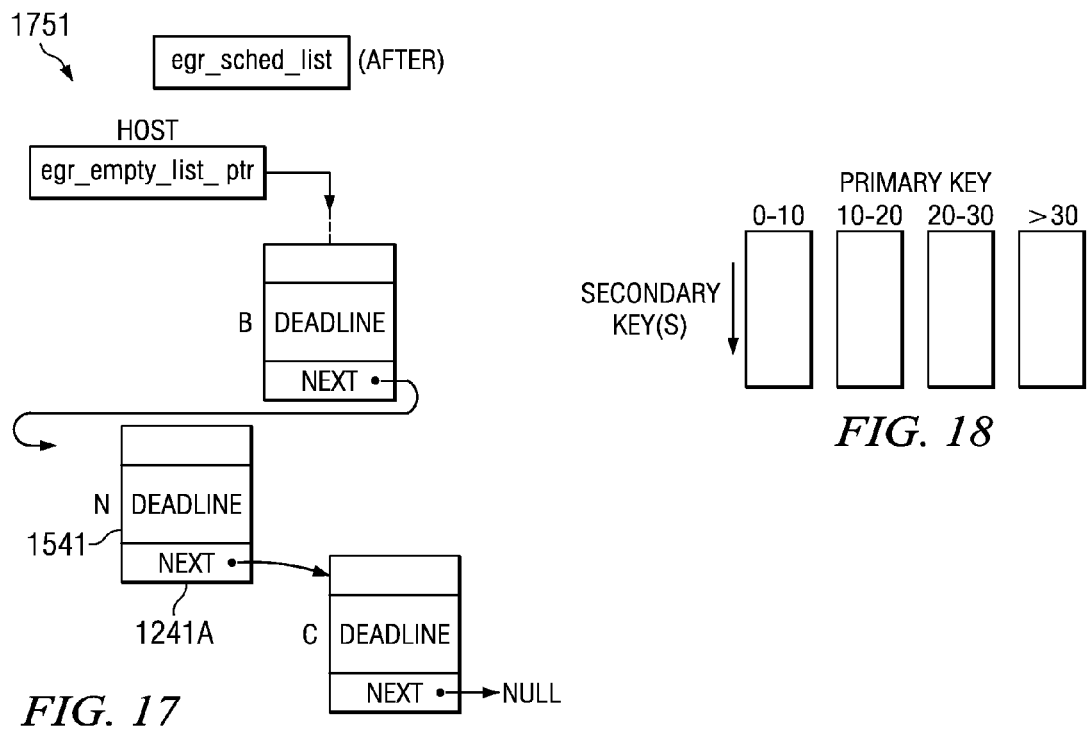
FIG. 17
FIG. 18

PROCESSING UNIT DECODING PACKETS WITH DEADLINES IN COMMUNICATIONS CHANNEL

This application is a divisional of application Ser. No. 12/688,968, filed Jan. 18, 2010, now U.S. Pat. No. 8,009,688, issued Aug. 30, 2011;

Which was a divisional of application Ser. No. 11/218,449, filed Sep. 1, 2005, now abandoned; which was a divisional of prior application Ser. No. 09/785,768, filed on Feb. 16, 2001, now U.S. Pat. No. 6,975,629, granted Dec. 13, 2005; which claimed priority from Provisional Application No. 60/191,375, filed Mar. 22, 2000.

FIELD OF THE INVENTION

The present invention relates to the fields of integrated circuits, networking, systems and processes for packet communications, and especially communication of real time information such as voice, audio, images, video and other real time information over packet.

BACKGROUND OF THE INVENTION

The Internet has long been usable for Internet file transfers and e-mail by packet switched communication. A different technology called circuit switched communication is used in the PSTN (public switched telephone network) wherein a circuit is dedicated to each phone call regardless of whether the circuit is being communicated over in silent periods. Packet switched networks do not dedicate a channel, thereby sharing a pipe or channel among many communications and their users. Packets may vary in their length, and have a header for source information, destination information, number of bits in the packet, how many items, priority information, and security information. A packet of data often traverses several nodes as it goes across the network in "hops." In a stream of data, the packets representative thereof may, and often do, take different paths through the network to get the destination. The packets arrive out of order sometimes. The packets are not only merely delayed relative to the source, but also have delay jitter. Delay jitter is variability in packet delay, or variation in timing of packets relative to each other due to buffering within nodes in the same routing path, and differing delays and/or numbers of hops in different routing paths. Packets may even be actually lost and never reach their destination. Delay jitter is a packet-to-packet concept for the present purposes, and jitter of bits within a given packet is a less emphasized subject herein.

Voice over Packet (VOP) and Voice over Internet Protocol (VoIP) are sensitive to delay jitter to an extent qualitatively more important than for text data files for example. Delay jitter produces interruptions, clicks, pops, hisses and blurring of the sound and/or images as perceived by the user, unless the delay jitter problem can be ameliorated or obviated. Packets that are not literally lost, but are substantially delayed when received, may have to be discarded at the destination nonetheless because they have lost their usefulness at the receiving end. Thus, packets that are discarded, as well as those that are literally lost, are all called "lost packets" herein except where a more specific distinction is made explicit or is plain from the context.

The user can rarely tolerate as much as half a second (500 milliseconds) of delay, and even then may avoid using VOP if its quality is perceptibly inferior to other readily available and albeit more expensive transmission alternatives. Such avoidance may occur with delays of 250 milliseconds or even less, while Internet phone technology hitherto may have suffered from end-to-end delays of as much as 600 milliseconds or more.

Hitherto, one approach has stored the arriving packets in a buffer, but if the buffer is too short, packets are lost. If the buffer is too long, it contributes to delay.

VOP quality requires low lost packet ratio measured in a relatively short time window interval (length of oral utterance for instance, with each packet representing a compressed few centiseconds of speech). By contrast, text file reception can reorder packets during a relatively much longer window interval of reception of text and readying it for printing, viewing, editing, or other use. Voice can be multiplexed along with other data on a packet network inexpensively over long distances and internationally, at low expense compared with circuit-switched PSTN charges.

A Transport Control Protocol (TCP) sometimes used in connection with the IP (Internet Protocol) can provide for packet tags, detection of lost and out-of-order packets by examination of the packet tags and retransmission of the lost packets from the source. TCP is useful for maintaining transmission quality of e-mail and other non-real-time data. However, the delay inherent in the request-for-retransmission process currently may reduce the usefulness of TCP and other ARQ (automatic retransmission request) approaches as a means of enhancing VOP communications.

RTP (Real Time Transport Protocol) and RTCP (RTP Control Protocol) add time stamps and sequence numbers to the packets, augmenting the operations of the network protocol such as IP.

For real-time communication some solution to the problem of packet loss is imperative, and the packet loss problem is exacerbated in heavily-loaded packet networks. Also, even a lightly-loaded packet network with a packet loss ratio of 0.1% perhaps, still requires some mechanism to deal with the circumstances of late and lost packets.

A conventional speech compression process has a portion that samples, digitizes and buffers speech in a frame buffer in frame intervals (e.g. 20 milliseconds), or frames, and another portion that compresses the sampled digitized speech from one of the frames while more speech is being added to the buffer. If the speech is sampled at 8 kiloHertz, then each 20 millisecond example frame has 160 analog speech samples ($8.\text{times}.20$). If an 8-bit analog to digital converter (ADC) is used, then 1280 bits ($160.\text{times}.8$) result as the digitized form of the sampled speech in that 20 millisecond frame. Next the compression process converts the 1280 bits to fewer bits carrying the same or almost the same speech information. Suppose the process provides 8:1 compression. Then 1280/8 bits, or 160 bits of compressed or coded speech result from compression. The compressed speech is then put in the format of a packet, thus called packetized, by a packetizer process.

For every frame of compressed speech in a packet, loss of that packet means loss of each frame in that packet. There then arises the problem how to create 160 bits or more of lost compressed speech. Reduction of packet loss and late packet handling strategy are very important challenges in advancing VOP technology.

Telephony represents a duplex channel. In the case of packet telephony one side (the ingress side) receives voice or digitized voice (PCM data) and produces packets by using any of several compression processes. This ingress side is almost completely 'synchronous'. Voice is changed into frames. The size of the frames for a given data compression process is fixed. Thus the appearance of frames in the system is both clock-like, and fully predictable. The time of execution of a task that compacts the "PCM data" frames into packets (the frame tasks) is known. The appearance of the packets on the output is both predictable as well as quasi-periodic.

On the other side (the egress side) of packet telephony the packets are converted to PCM frames, which (frames) are added to output buffers for each channel. The packets arrive at rate for which only the average if known. This average depends on the process used and thus on the frame size to be produced. The data from the output buffer is output at a constant rate. If not replenished in time, the data will run out at some 10 msec boundary.

Each packet may be considerably off 'its' ideal position in the timeline. Since the density of arrival of packets is only known statistically, the egress side becomes essentially asynchronous. Yet each packet must meet its deadline or be thrown away.

SUMMARY OF THE INVENTION

In one form of the invention, a method of processing first and second received packets of real-time information includes computing for each of said received packets respective deadline intervals and ordering processing of the first and second received packets according to the respective deadline intervals.

In another form of the invention, a single-chip integrated circuit has a processor circuit and embedded electronic instructions that form an egress packet control establishing an egress scheduling list structure and operations in the processor circuit that extract packet deadline intervals DI, place packets in the egress scheduling list according to deadline intervals DI; and embed a decoder that decodes the packets according to a priority depending to their deadline intervals.

In yet another form of the invention, a single-chip circular time differencing integrated circuit has a storage for values representative of the time of two events. An adder/subtractor coupled to the storage generates an electronic difference (delta) and delivers the difference value into the storage thereby resulting a sign bit (S) and a most significant bit (MSB) of the difference value (delta). Logic circuitry responds to the MSB and the sign bit S of the electronic difference (delta) and a predetermined value (TMAX), to drive the adder/subtractor to generate the circular time difference of the two events.

In still another form of the invention, a wireless telephone includes an antenna, a voice transducer, and at least one integrated circuit assembly coupling the voice transducer to the antenna, and providing voice over packet transmissions and embedded electronic instructions comprising an ingress/egress packet control that processes egress information and determines lowest first egress deadline interval DI and further executes an ingress process preempting the egress process when the value of lowest first egress deadline interval DI exceeds a predetermined amount.

Other forms of the invention encompass other processes, integrated circuits, chipsets, line cards and other computer add-in cards, information storage articles, systems, computers, gateways, routers, cellular or other wireless telephone handsets, wireless base stations, appliances, and packet networks, and other forms as claimed.

BRIEF DESCRIPTION OF THE DRAWINGS

FIGS. 15, 16, and 17 are diagrams of inventive and related data structures, records, and inventive updates processes for use in inventive processes, integrated circuits, and systems;

FIG. 18 is a block diagram of an inventive data structure for a queue having primary and secondary keys;

In the Figures, corresponding numerals refer to corresponding parts and steps, except where the context indicates otherwise.

DETAILED DESCRIPTION OF PREFERRED EMBODIMENTS

In multi-channel voice over packet telephony systems, improvements provide basis for optimal performance of the systems, where the metric is the quality of communication expressed in terms of the low drop rate of arriving packets. Each packet "arrives" with its own hard-real time deadline. If the packet is not fully decoded by the deadline it must be dropped. One way to take advantage of that knowledge is in scheduling the packets for execution (decoding).

Due to the nature of packet communication networks, packet arrival on the egress side of voice over packet systems is highly asynchronous. However, the time when the receiver buffer containing egress voice data will run out, unless replenished with new data, is completely predictable. This fact establishes a temporal relationship between the time of arrival of a packet and the time it has to be decoded and added to the data stream (placed in the buffer). That knowledge of the hard real-time deadline for each packet is advantageously utilized in scheduling packets for execution (decoding) herein.

Improved non-preemptive scheduling of the arriving packets emphasizes global systems optimization by use of the temporal relations in scheduling of packets. When a single parameter for optimization is low drop rate of the arriving voice packets, a specific scheduling strategy gives each late packet priority over any other packet that can wait longer to be decoded.

The system is suitably organized to quickly establish the hard real-time deadline of each arriving packet. The decoding process and the arrival time of each packet provide exactly the information needed for soft scheduling or intelligent scheduling on a non-preemptive basis.

Advantageously, processes and apparatus of a first telephony system embodiment provide a full duplex gateway between multiple voice channels and data packet network through execution of 'frame tasks'. At any given time multiple tasks may be ready for execution. One way to order those tasks for execution is by associating priorities with different types of 'frame tasks' and by use of preemption (interrupt processing) to guarantee early execution of high priority tasks.

In another category of embodiments non-preemptive scheduling is utilized in ordering "frame tasks" herein for execution. Some embodiments of multi-channel multi-codec-process data telephony behave as an intelligent non-preemptive queue manager. Incoming packets create a continuously changing set of tasks, each with its own hard real-time deadline, and the system largely avoids interrupt processing.

Overview

Figure 1:
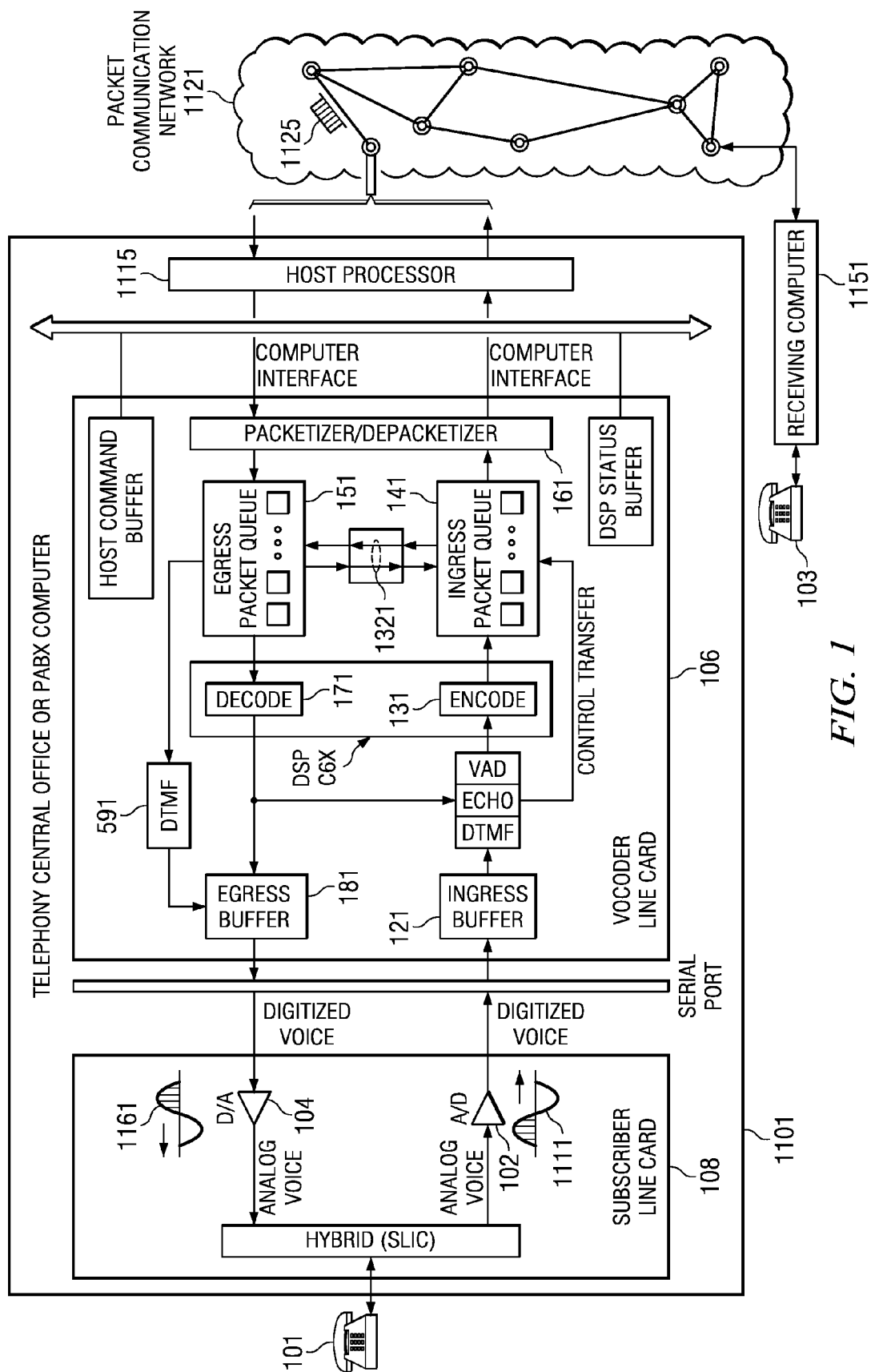
FIG. 1 is a block diagram of an inventive process, integrated circuit, line card, system and packet communication network.
Figure 7:
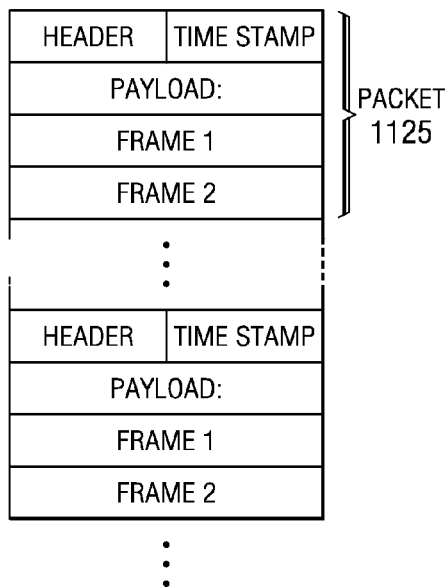
FIG. 7 is a diagram of an example type of packet for use with the inventive processes, integrated circuits and systems herein.

FIG. 1 presents a view of packetized telephony. Packets 1125 (see also FIG. 7) comprise bit streams with headers and their payloads of one or more compressed "frames" of voice data. Each frame, depending on the compression process being applied, comprises 10, 20, 30 or 40 milliseconds of digitized voice. The telephony standard sampling rate converting voice signal into digitized voice data is usually 8 kHz, although other rates are suitably used.

In FIG. 1 telephones 101 and 103 typify plural sources and destinations of voice signals. Telephone 101 (inputs and outputs) is indirectly connected to an Analog to Digital (ADC) and Digital to Analog (DAC) converters 102,104, which produce and receive digitized voice. In telephony there are other types of sources of digital voice. For instance digital trunk lines E1 or T1 can simultaneously multiplex 32 or 23 simplex voice channels respectively.

Whatever the courses or the destinations are, the resulting digital voice data from multiple channels enter (or leave) "Voice Coders-Decoders" (commonly referred to as Vocoders or Vocoder Linecards). The function of the Vocoders Linecards 106 is to transform the incoming and the outgoing voice data into and from "data packets."

The methods of transformations (compression) of frames to packets are often subject to international standards. The standard duration of frames results in the averaged packet rate of 100, 50, 33 1/3 and 25 packets per second. Packets are commonly transferred over high bandwidth (high frequency) carrier. The high capacity media allows time division multiplexing of packets for hundreds or even thousands of voice channels.

On the voice input side of the system (the "ingress" side) the frames are first compressed into packets, then passed to the "Host" computer 1115, and from there are sent out into the Packet Network 1121. For the voice output (egress" side), the Host computer 1115 receives packets from the Packet Network 1121 and passes them to the Vocoder Linecards 106 for decoding. Unfurled frames of voice data are then inserted into egress buffers. From there they are outputted, one sample at a time, at the 8 kHz rate, into a DAC, which turns the samples into analog voice signal.

The Host computer interfaces the Packet Network. Examples of components of the Packet Network are Packet Relay satellites, Packet Telephony Switching Offices or individual cellular phones.

The Central Office on FIG. 1 is shown to include a Subscriber and Vocoder Linecards. Each linecard is designed to support multiple lines. Using a different phrase, they are designed to support multi-channel operations.

Depending on the capability of the DSP processor, current Vocoder Linecards support between 4 to 32 bi-directional (duplex) lines in multiple-codec process modes. Improved processes organize the work for the DSP processors present on the Vocoder Linecards in a manner which results in a higher quality of communication.

The quality of the communication is inversely proportional to packets' "drop rate." Some of the arriving packets may have to be discarded as they fail to catch up with their respective voice streams. Many failures are avoidable and improvements herein organize processing that advantageously to minimize packets' drop rate.

The total number of packets being integrated into the outgoing egress voice streams are advantageously increased In FIG. 1, Host processor with DSP C6201 coupled thereto. The host has a handshake host control process provided therein to exchange information between the host and the source or destination connected to the host. The host controls what a given channel is doing.

In a three-part ingress process wherein the host is a sender. The host in an ingress initiation process detects when a handset 101 is picked up and dials a destination, and then the host opens a channel and sends signaling packets indicative of initiation of the call. In an ingress communication process, the host then sends voice data packets to a destination. In an ingress termination process, the host detects whether the handset 101 has been put down, and then the host closes the channel by sending signaling packets indicative of termination of the call.

Also, the host responds to incoming calls with an egress initiation process, an egress communication process, and an egress termination process. In the egress initiation process, the host 101 receives signaling packets from another computer indicative of initiation of a call to host 101. The host 101 interacts with the DSP so that, among other things, a channel number is assigned to the call being initiated and the decode process to be used has an process identifier stored into the egress channel record 1413 of FIGS. 14 and 15. In this way the channel record characterizes the channel for the host and the DSP to use, and structures the operations of the DSP relative to that channel until the channel is disconnected.

Figure 11:
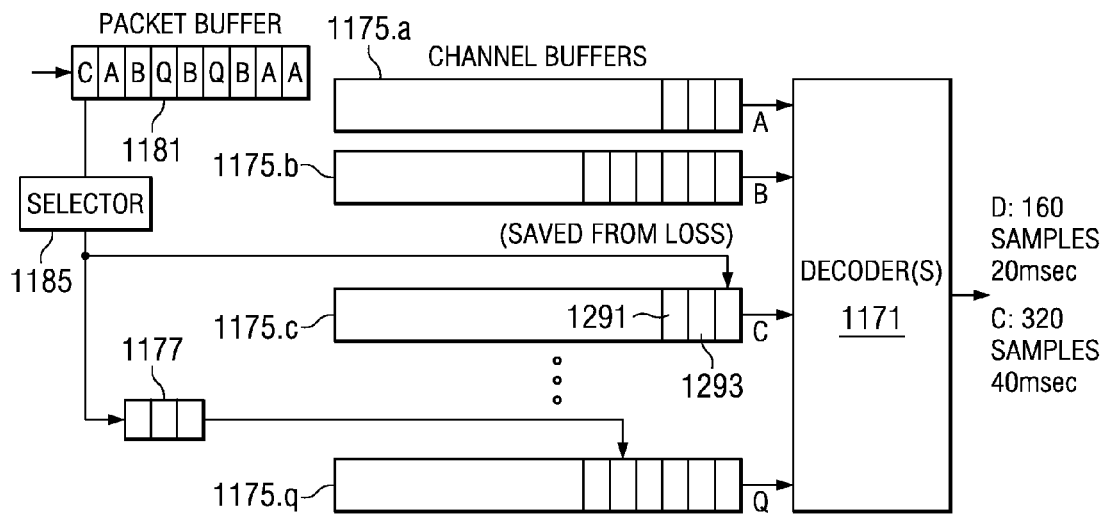
FIG. 11 is a block diagram of an inventive embodiment of buffers and decoder(s) for improved packet communications.
Figure 12:
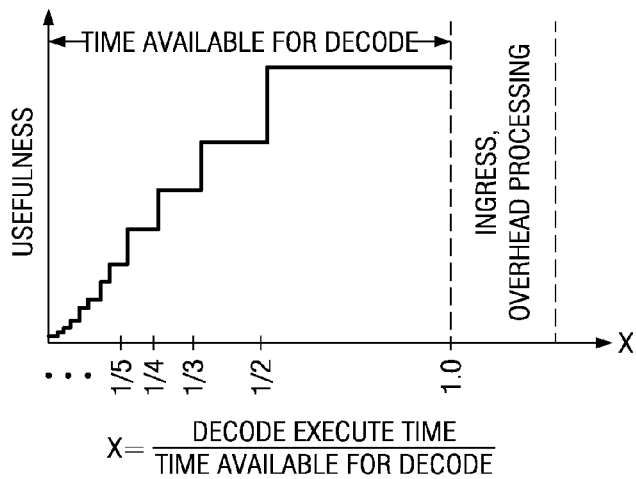
FIG. 12 is a graph of Usefulness versus a parameter X wherein the graph depicts operations and advantages of various inventive embodiments.

In the egress communication process, the host 1115 receives voice data packets from the other computer and decodes them using the process identified by the process identifier in the egress channel record 1413 for that channel over which the voice data packets are coming from the other computer. It is precisely in the egress communications process that improvements of some embodiments such as of FIGS. 11 and 12 are provided, so as to make use of packets which would otherwise be effectively lost to a process hitherto.

In the egress termination process, the host 1115 in FIG. 1 receives signaling packets from the other computer indicative of termination of the call to host 1115. The host 1115 interacts with the DSP so that, among other things, the channel is closed and the egress channel record 1413 is suitably updated, released or closed.

Devices, systems, and processes that manage multiple channels are advantageously improved as described herein. Such embodiments advantageously recognize an opportunity for process optimization in the multiple channel context. A computing system that processes multiple channels is suitably implemented in a central office packet switch or gateway to a packet network, and otherwise in the infrastructure of packet networks, in a recoding router or gateway coupling one part or type of network to another. In the long distance telephone network a high level office, such as a Class Five Office, is one suitable location for implementation, among other places. An internet or private network backbone terminates at the office whereupon numerous channels are concurrently decoded to voice for distribution locally to PBXs and telephone lines, or recoded for further transmission. Likewise, the offices of Internet Service Providers (ISPs) and enterprise network infrastructure locations are also suitable locations.

Packet shuffling or sorting processes as described herein are advantageously implemented at a multichannel node or point in the network where packets are changed into voice in real time order or are recoded into packets to be issued in real time order. Internet with all its capacity does not guarantee delivery of every packet either on-time or even delivery at all, thus introducing Quality of Service (QoS) difficulty in delivering real time data, such as voice, other media, and medical data. Packets come to a receiving VoIP computer, or a 3G wireless IP phone.

The link list queue tells the system which packets to decode first, in order of their deadline number. The system, when a frame task is completed, accesses the cell at the top of the queue 1431 of FIG. 14, and thereupon detects what process to use, and for what channel, and triggers decode of the frame in the corresponding packet.

32 channel management system combined with a 32 channel decoder on the egress side. Note that the decoder is simply a program, and the computer has a set of, for example, five decoder programs implemented five corresponding decode processes of which one might be G.723. A given one of the decoder programs services all of the channels that call for its decode process in block 1413, channel by channel. Block 1413 determines which decoder is assigned to which channel. All 32 channels may use the same decoder. Or 5 channels might use decoder 1, 12 channels use decoder 2, 9 channels use decoder 3, 2 channels use decoder 4, and 4 channels use decoder 5, for another example.

Figure 2:
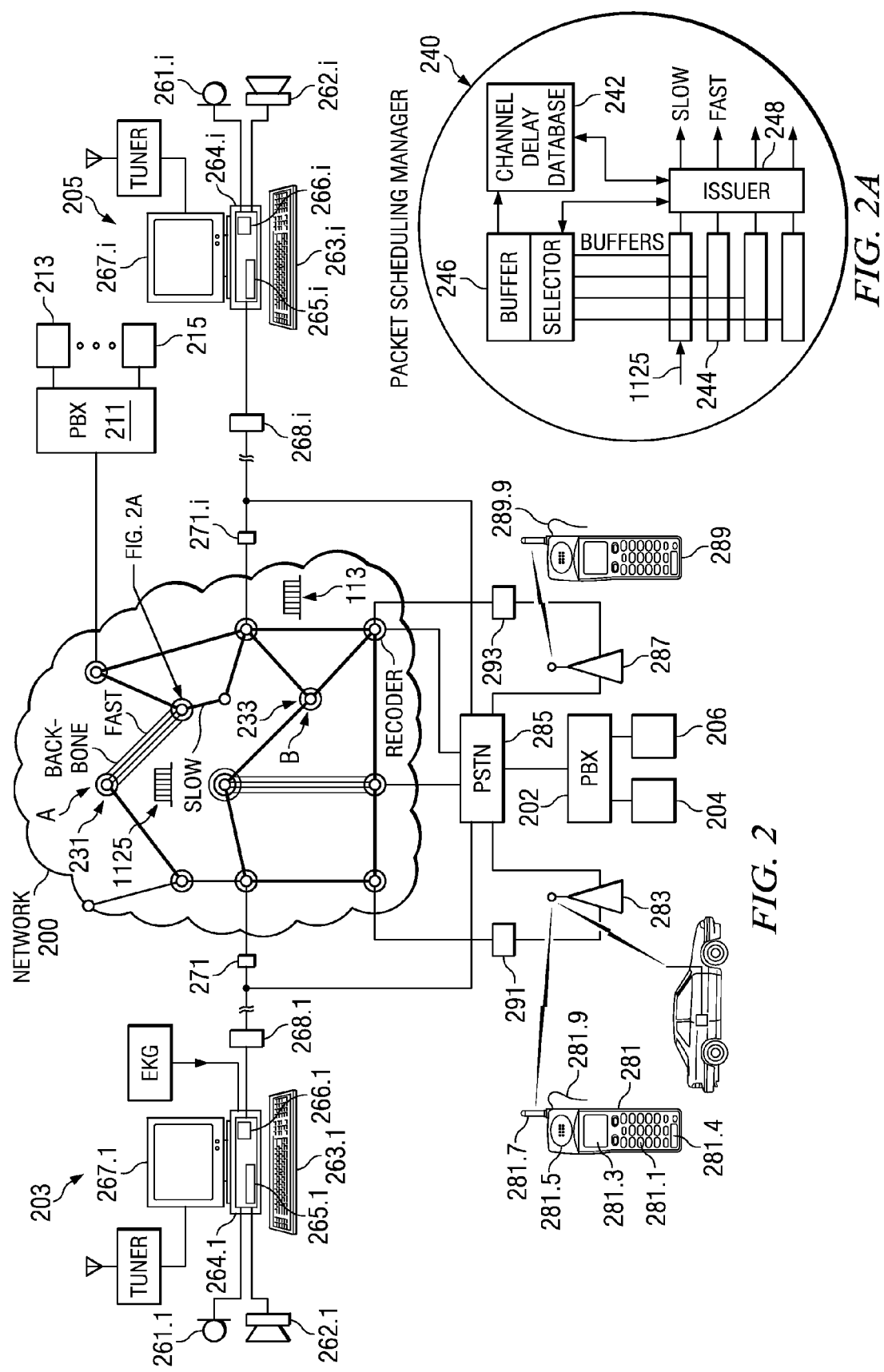
FIG. 2 is a partially pictorial, partially block diagram of various inventive computers, wireless telephones, PBXs, automotive systems, and networks, and FIG. 2 includes a magnified view of an inventive router implemented in networks.

Many, but not all, embodiments have a decoder as in FIG. 1 in the same device, system, or process at a given node of implementation. However, still other embodiments have the decoder physically located remotely, over a synchronous network or otherwise, from the packet shuffling or sorting process site of FIG. 2A. At the network level, the network 200 of FIG. 2 constitutes a system wherein each packet has its own hard deadline. Many packets are channeled into a node or router (e.g., 233) in the network 200 to be sent out in order of priority by a packet scheduling manager 240 of FIG. 2A. If it is known when the speech begins, then it is known exactly when the packet is needed utilizing a channel delay database 1171. Then the system is extended and arranged to make the process all remote, wherein the router and packet scheduling manager of FIG. 2A is provided with a process that decides how to send out packets like 1125 from buffer 1163 to a decoder 171 many nodes away. Thus, a buffer selector 1175 coupled to an issuer 1165 decides when to send various packets SLOW and FAST from the router out to destination nodes. In this way, packets that would otherwise arrive too late at the destination decoder 171 are in fact advanced and issued by issuer block 1165 in the routing process so that they arrive in time for use at the decoder 171 at the end of the path.

In another embodiment a personal computer (PC) 203 (FIG. 2) or workstation is improved for network path diversity and is directly connected to the public switched telephone network (PSTN) 285 through which the PC 203 or workstation communicates to the Internet 200, for example. The choice of modem or means of connection of the computer to the network is suitably any of voice-band (e.g., V.90), cable, LMDS, DSL, Ethernet, wireless, satellite, etc. Software improvement is suitably made at the transport layer (Layer 4) or network layer (Layer 3) or in any event at a network layer of abstraction above the link layer (Layer 2) and physical (PHY) layer (also called Layer 1) at which the selection of modem resides.

Going further in a spatial dimension, the embodiments suitably reside in a PC, a cell phone, a base station, in a server in the Internet backbone and elsewhere.

FIG. 2 shows a network cloud 200 coupling computers 203 and 205. If one path from a source 203 is intermittent, then another path is made to be present so that packets can get to the destination 205. The source 203 inventively launches packets and any dependent packets one or more paths through network 200. In the Internet the path that a given packet will take cannot usually be predicted, and various packets will take different routes due to the fault-tolerant, multiple-path nature of the Internet. A PC or workstation is provided at destination 205 to receive streams of data such as from intermediate nodes 231 and 233.

Further in FIG. 2, personal computer 203 has a microphone 261.1, a loudspeaker (and/or headphones or other audio transducer) 262.1, a keyboard (and/or mouse or other touch-sensitive input device) 263.1, a computer box 264.1 including one or more information storage devices 265.1 and a printed wiring board 266.1 with microprocessor(s), digital signal processor(s), volatile memory, peripheral chipset and peripherals. Associated with computer box 264.1 is a cathode ray tube monitor (and/or liquid crystal display, and/or digital light processor (DLP from Texas Instruments Incorporated) and/or other display device and/or printer) 267.1 coupled to printed wiring board 266.1. Other peripherals (not shown) such as videoconferencing camera, digital still camera, optical scanner, electrocardiograph EKG, wire/power-line/cable/fiber networking interfaces, wireless networking interface and other devices now available or yet to be devised are also coupled to printed wiring board 266.1. A modem 268.1 is also coupled to printed wiring board 261.1. The modem is suitably V.90 voice-band modem, cable modem, DSL (digital subscriber line modem), ISDN (Integrated Services Digital Network) or other suitable modem. The modem 268.1 couples personal computer 203 to a packet network gateway computer 271 as well as to a public switched telephone network PSTN 285.

A similar description applies to various components associated with computer 205 of FIG. 2, and reference numerals with a suffix ".i" have like description of corresponding reference numerals already described in connection with personal computer 203. Also the suffix ".i" indicates that computer 205 is one of many computers coupled to packet network 200 and or via PSTN 285 to a gateway to network 200.

Further in FIG. 2, a cell phone 281 typifies numerous cell phones active in a cell of a cellular telephone base station 283. Cell phone 281 has an enclosure with a manual input (or touch pad or button pad or keyboard) 281.1, a microphone 281.4, an audio output transducer such as a loudspeaker 281.5, a visual interface 281.3 such as an LCD screen, and a wireless antenna 281.7. Inside of cellular telephone 281 is electronics coupled to the aforementioned components, and the electronics includes an analog section coupling the microphone 281.4 and speaker 281.5 to an integrated circuit assembly including TMS320C54xx and/or TMS320C55xx DSP from Texas Instruments Incorporated and a microcontroller such as an ARM™ chip licensed by Advanced RISC Machines. The microcontroller is also coupled to the manual input 281.1 and visual interface 281.3. Further, the microcontroller is coupled with the digital signal processor. A radio frequency RF section couples the other sections and chips to the antenna 281.7 for two-way and multi-way communications.

Base stations 283 and 287 are coupled to a public switched telephone network PSTN 285, which in turn is coupled to the packet network 200. Also, base stations 283 and 287 are respectively coupled to packet network 200 via gateways 291 and 293. In the cell served by base station 287, a cell phone 289 typifies numerous cell phones active in a cell service area of that base station 287.

A private branch exchange PBX 202 couples telephones 204 and 206 to PSTN 285. Suitably, PBX 202 is improved for path diversity communications as described herein. Another PBX 211 couples IP phones 213 and 215 to a node of packet network 200 as illustrated.

Figure 3:
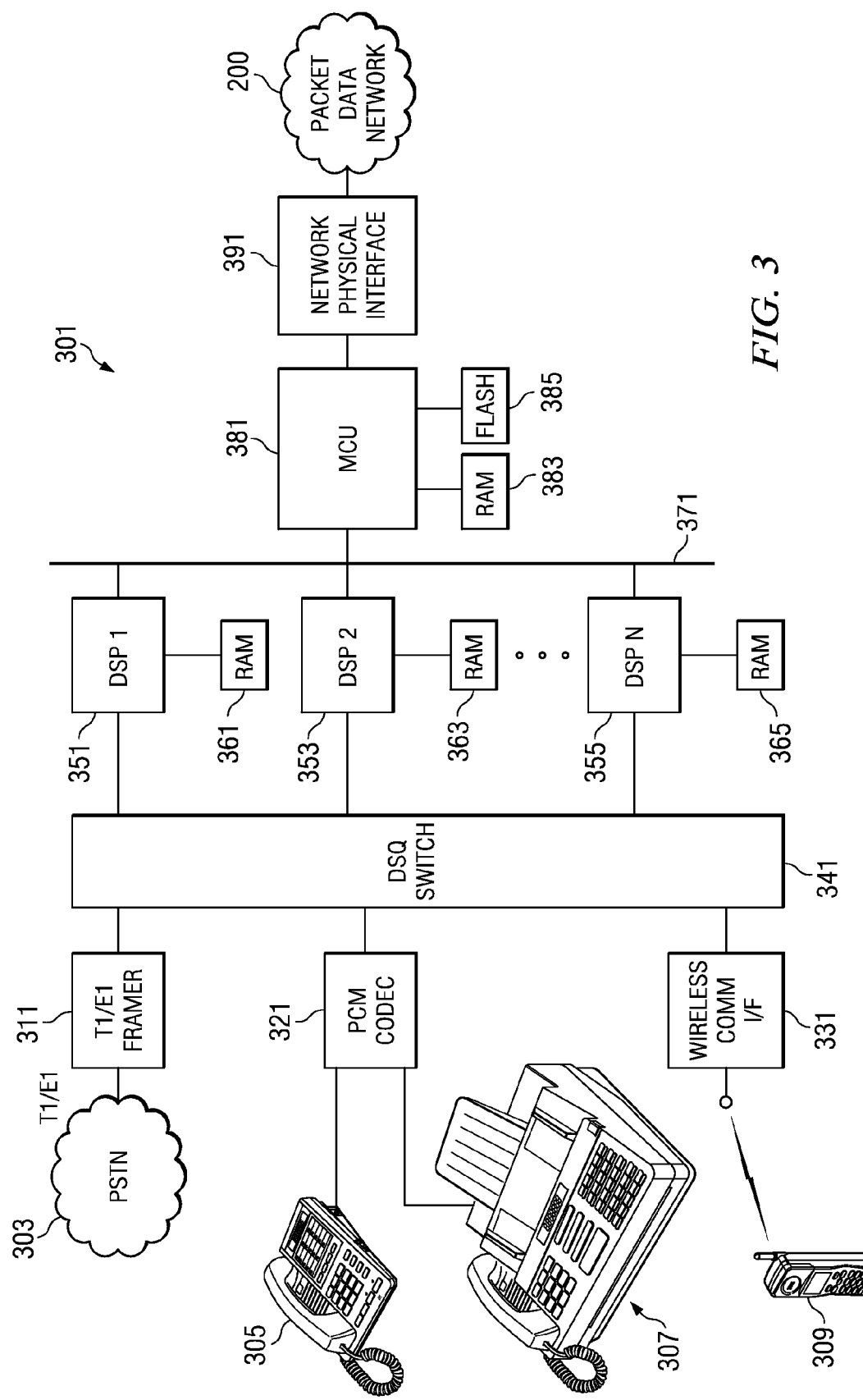
FIG. 3 is a partially block, partially pictorial diagram of an inventive packet network enabled PBX serving telephones, fax/scanners, and wireless telephones for communication with the Public Switched Telephone Network (PSTN) and a packet data network.

In FIG. 3, system components are arranged to provide gateway functions and combined with cellular phone basestation functions and PBX functions. A communication system 301 interfaces to a PSTN (public switched telephone network) 303, to a telephone 305 (and PBX private branch exchanged connected to many wired and cordless telephones, not illustrated), to a fax and/or scanner machine 307 and to cellular telephones 309. PSTN 303 is coupled via T1/E1 Framer 311 to a DSQ Switch 341. Telephone 305 and Fax 307 are coupled via a PCM Codec 321 to the DSQ Switch 341. Cellular telephones 309 are coupled via a wireless communications interface 331 to the DSQ Switch 341.

Further in FIG. 3, the DSQ switch 341 couples the various types of communications to a first port of a bank of one or more DSPs (digital signal processors, such as TI TMS320C6x or TMS320C54x DSPs) 351, 353, and so on to the Nth DSP 355 in the DSP bank. Each DSP suitably has associated memory 361, 363, . . . 365 respectively provided as any suitable mix of volatile and nonvolatile memory selected by the skilled worker. The DSPs are connected via a second port of the bank to a bus 371 which couples them to a microcontroller 381 that has its own RAM memory 383 and flash nonvolatile memory 385. The microcontroller 381 communicates via a PHY, or Network Physical Interface 391, to packet data network 200 of FIG. 2.

In FIG. 3, various parts of the improvements described herein are suitably partitioned between the DSPs 351, 353, . . . 355 and the microcontroller (MCU) 381 and stored on-chip and in the off-chip memories as desired. Various partitioning alternatives are contemplated. Also, the MCU is omitted in another embodiment (not shown) and the various software blocks are partitioned among execution units of one DSP or among multiple DSPs.

Software as disclosed herein is also implemented in or loaded into computers shown in FIG. 2, like 203 and 205, in routers at nodes like 231 and 233 of network 200, gateways connected to PSTN 285, in cellular telephone base stations 283 and 287, and in cellular telephones 281 and 289 themselves. In web television sets, and mobile web TVs, tuners 495 and 795 are included to drive display 267.1 and 267.i in the systems.

In one type of base station networking embodiment, the base stations 283 and 287 of FIG. 2 are respectively coupled directly to the packet network 200 via their own gateways 291 and 293. Base stations 283 and 287 thus communicate by VoP or VoIP over the packet network 200 and bypass PSTN 285.

Cell phones 281 and 289 also use CDP cellular digital packet data to send datagrams over packet network 200. They are further improved as disclosed herein to send VoIP or VOP datagrams at a sufficient data rate and with packet network path diversity for high QoS. The cell phone constitutes a physical layer interface (PHY) which is complemented by higher layer software as in FIGS. 5 and 6 to make it a VoP or VoIP phone.

Figure 5:
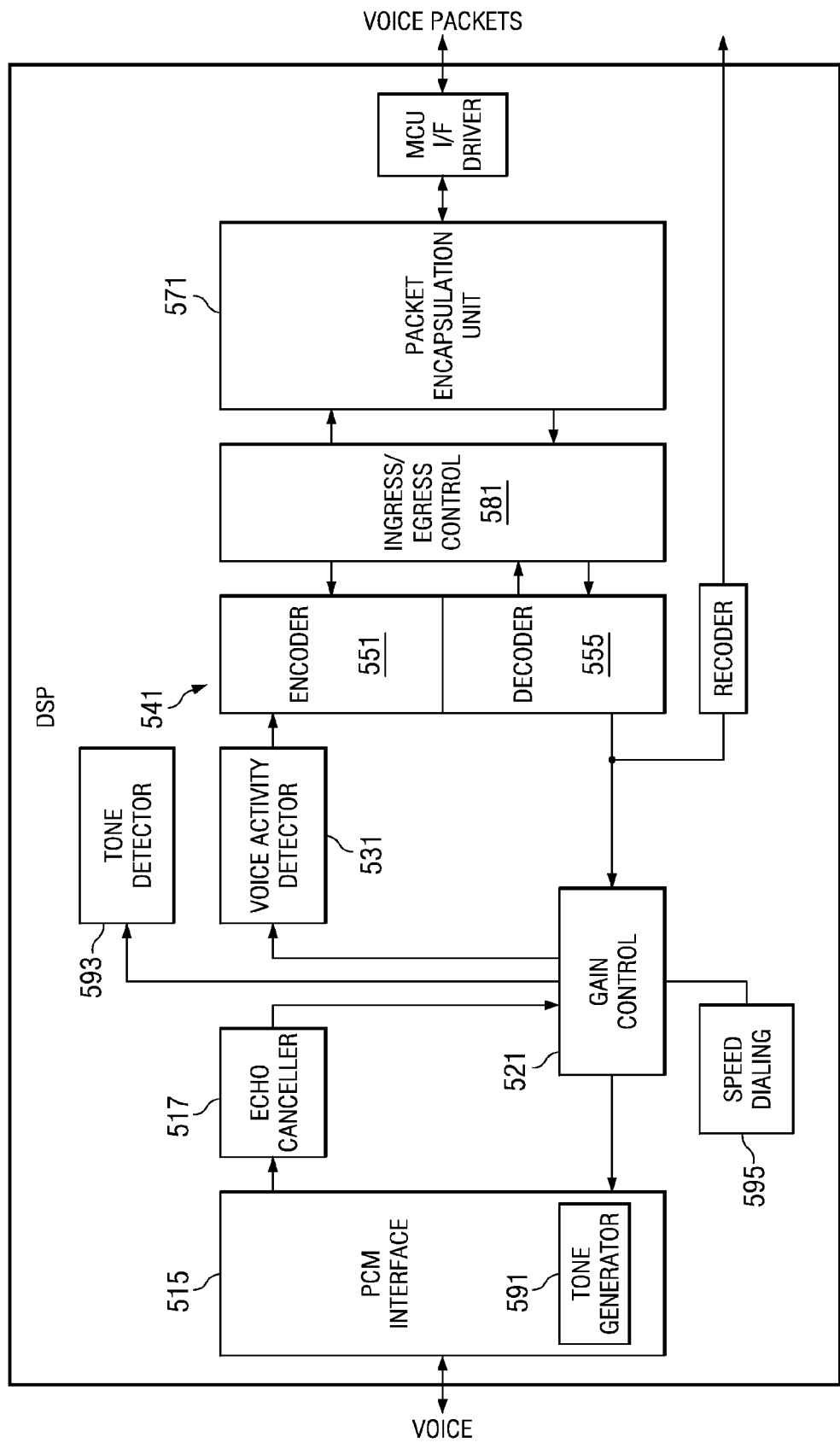
FIG. 5 is a block diagram of an inventive process for software and one or more inventive integrated circuits for enhanced packet communications.
Figure 6:
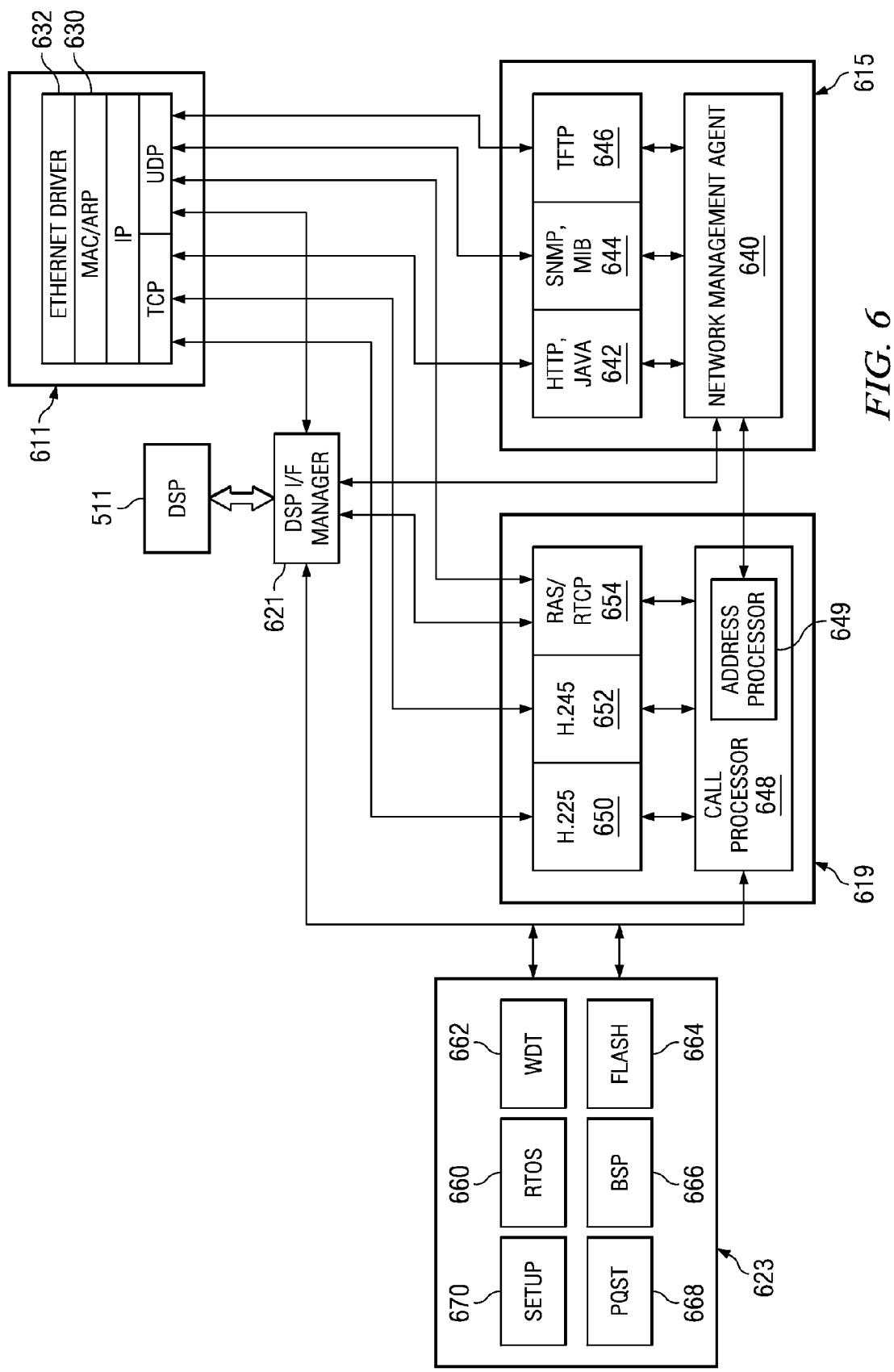
FIG. 6 is a partially block, partially process diagram of inventive processes and one or more inventive integrated circuits for enhanced packet communications.

In the cell phones, the function or software of FIGS. 5 and 6 is manufactured or downloaded into the unit. In this way, an advantageous cell phone embodiment is constituted for packet network enhanced QoS VoP and VoIP and other media packet communications. The cell phones 281 and 289 are suitably provided with positioning software such as GPS (global positioning software), Snaptrack™ protects or the like. The cell phones have a wearable mobile enclosure with a belt-clip 281.9 and 289.9, and their circuitry is suitably mounted in an automotive enclosure such as in the Auto shown in FIG. 2. PCS (Personal Communicator System) wristband apparatus and other highly mobile embodiments with voice-recognition control of the blocks are also contemplated.

The functional or software process blocks of FIGS. 5 and 6 are partitioned to a microcontroller and to a DSP according to speed, power, economic and other tradeoffs as the skilled worker suitably elects. Speech codec and modem suitably run on the DSP. The TCP/UDP/IP stack runs on a DSP but suitably also is partitioned instead into the microcontroller.

Figure 4:
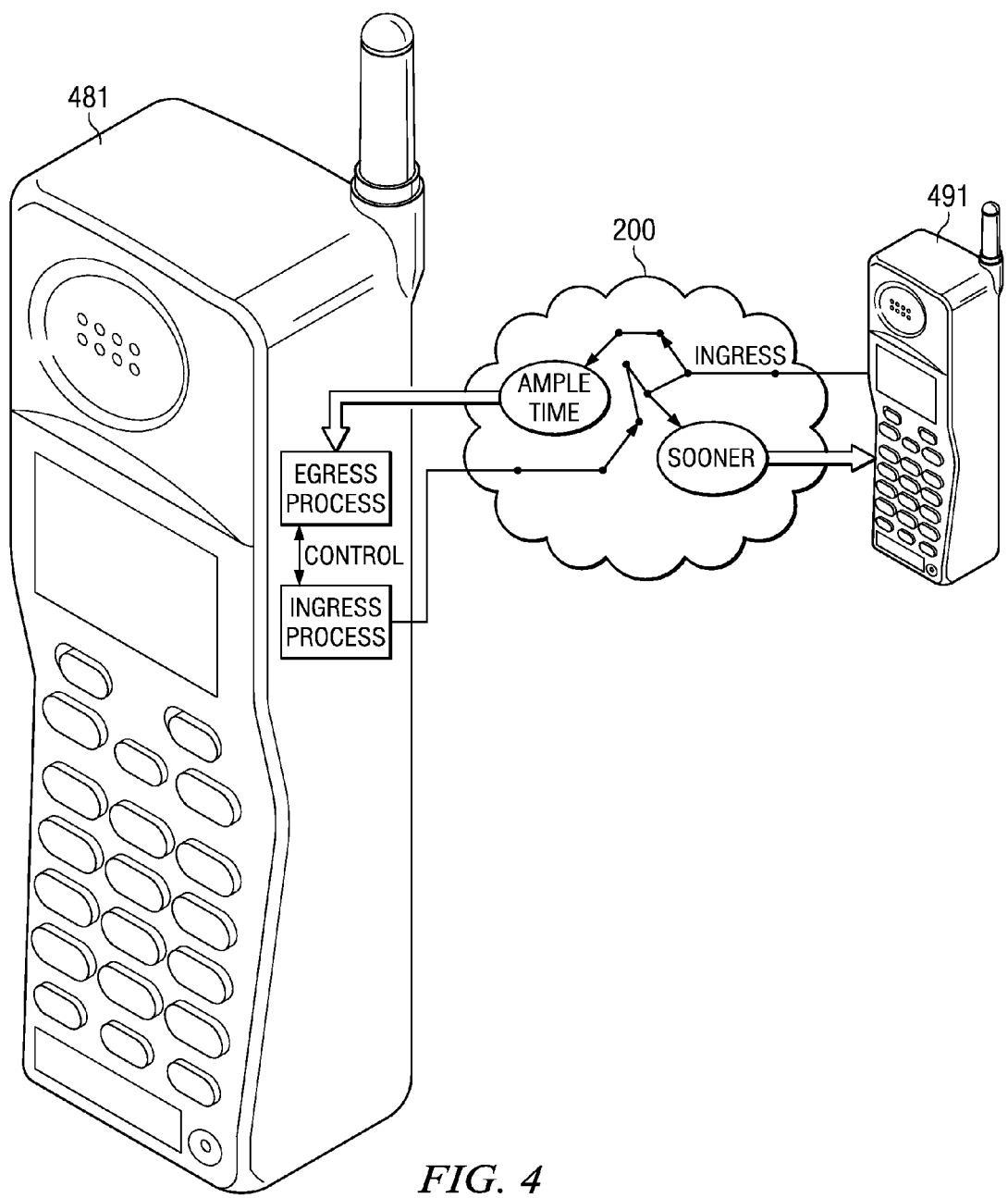
FIG. 4 is a partially pictorial, partially block diagram of inventive wireless telephones with network access and improved for enhanced packet communications.

In systems where a cell phone 289 communicates voice wirelessly to its base station 287, the base station recovers the voice via a wireless communications interface 331 and DSP 351 of FIG. 4. Then according to improvements contemplated here, the voice is recoded by the recoder of FIG. 5 and base station 287 uses the rest of the functional and software blocks of FIGS. 5 and 6 to send packets onto the packet network 200 of FIG. 2. In the reverse direction, as illustrated in FIGS. 5 and 6 functional and software is reciprocally provided.

In a further network and system infrastructure embodiment, a VoIP Solution Provider improves gateways 291 and 293 with the functions and software of FIGS. 5 and 6 for packet network path diversity communications. Then cell phone users and cellular telephone base station operators of equipment unimproved by the functions or software of FIGS. 5 and 6 couple their equipment to improved gateways 291 and 293. The gateways 291 and 293 are also suitably provided as, or added as an add-in printed wiring board or card into, one or more private branch exchanges (PBXs). For large service volumes, as dozens, hundreds or thousands of simultaneous calls, the functions and software of FIGS. 5 and 6 and elsewhere herein implemented in gateways 291 and 293 and such PBXs is straightforwardly made to have multichannel service, by running many voice calls with multichannel speech codecs and multichannel VoIP control for each call. Keyboard 263.i and monitor 267.i interface to the function and software of FIGS. 5 and 6 for occasional supervisory monitoring and control of the multichannel service.

In FIG. 5, a packet voice digital signal processor (DSP) 511 is implemented as an integrated circuit with embedded software establishing blocks as shown. The integrated circuit is suitably a CMOS DSP such as any suitable selection from the TMS320C54x, TMS320C55x or TSM320C6x DSP families, or other such families commercially available from Texas Instruments Incorporated, Dallas, Tex. USA. See Wireless and Telecommunications Products: Central Office, Telemetry RF Receivers and Personal Communications Solutions, Data Book, Texas Instruments Incorporated, 1996, which is hereby incorporated herein by reference, and particular Chapter 9, Digital Signal Processors therein.

For example, the TMS320C54x fixed-point, DSP family is fabricated with a combination of an advanced modified Harvard architecture which has one program memory bus and three data memory buses. This processor also provides a central arithmetic logic unit which has a high degree of parallelism and application-specific hardware logic, on-chip memory, additional on-chip peripherals. This DSP provides a specialized instruction set for operational flexibility and speed of the DSP.

Separate program and data spaces allow simultaneous access to program instructions and data. Two reads and one write operation can be performed in a single cycle. Instructions with parallel store and application-specific instructions are provided. Data can be transferred between data and program spaces. The parallelism supports a powerful set of arithmetic, logic and bit-manipulation operations that can all be performed in a single machine cycle. Control mechanisms manage interrupts, repeated operations and function calling. On-chip RAM and ROM memories are provided. Peripherals on-chip include serial port and HPI host port interface.

In FIG. 5, integrated circuit 511 is improved with software manufactured into the ROM, or other nonvolatile, memory for implementing some part of the process embodiments. Thus, FIG. 5 emphasizes an example of software blocks manufactured into the integrated circuit 511, the hardware described hereinabove being understood. Thus, description in software parlance follows next regarding FIG. 5 wherein for example a "unit" refers primarily to a block of software, although a hardware block is another suitable alternative.

In FIG. 5, voice samples are supplied from an analog to digital converter (ADC) not shown, to a PCM interface 515 and converted there to pulse code modulation. Next the PCM is fed to an Echo Canceller block 517, which feeds a Gain Control block 521. Gain control 521 supplies a Voice Activity Detector 531 which detects whether voice packets or silence packets are to be generated. The output of Voice Activity Detector 531 goes to a speech coder 541 having a Voice Coding Unit, or encoder, 551. The speech coder 541 is suitably devised or implemented by the skilled worker so as to have multiple coding rate modes as contemplated herein. For one example, G.729 and Annexes with 11.8 kbps, 8 kbps and 6.4 kbps selectable source rates sij is suitably used. Then an Ingress/Egress Control Block 581 couples the output of encoder 551 to a Packet Encapsulation Unit 571 which thereupon outputs voice packets from the DSP. Control Block 581 also feeds control signals between itself to voice coding unit 551 to accomplish functions as described herein.

On a receive path in FIG. 5 voice packets enter packet encapsulation unit 571 where they are depacketized and passed to the Ingress/Egress Control Unit 581. Control Unit 581 has software that implements process steps for ordering processing and saving packets which would be lost by conventional techniques.

The destination is suitably improved with an integrated circuit 511' (not shown) similar to or identical to integrated circuit 511 of FIG. 5.

From Packet Playout Control Unit 581, depacketized compressed voice information being received is then supplied in a controlled manner to a speech decoder 555 portion of speech coder 541. Silence packets and voice packets, suitably dejittered and compensated by use of diversity packets as improved according to any of various process embodiments herein, then are decoded by speech decoder 555 and thus played out. The speech thus played out, passes via Gain Control 521 to PCM interface and from there to a DAC (digital to analog converter) not shown which can be provided either on-chip or off-chip as the skilled worker elects. The PCM output as converted by the DAC thus reconstitutes the voice in an advantageous manner more fully satisfactory and enjoyable to the user, by virtue of the various improvements provided and discussed herein. Further, a DTMF "touch-tone" generator 591, also in FIG. 1, and Tone Detector 593 handle the dialing steps for placing a VOP/VoIP telephone call to confer a comprehensive application improved as discussed herein.

In FIG. 6, the improvements are illustratively partitioned so that the RTCP is associated with MCU 381 of FIG. 3. The ingress/egress control block 581 and other FIG. 5 blocks are suitably provided in the DSP software complement for the DSPs of FIG. 3.

In FIG. 6, MCU 381 of FIG. 3 is provided with a TCP/UDP/IP stack 611 which further has MAC/ARP 630, Ethernet driver 632 and other network interface protocol blocks. Further, network management software 615 for MCU 381 has a network management agent 640 controlling and interfacing to a first software block 642 for embedded webserver HTTP (Hypertext Transfer Protocol) and Java applications, a second software block 644 for SNMP protocol, Voice MIBs, and Protocol MIBs, and a third software block 646 for TFTP software download. Still further, telephone signaling gateway software 619 for MCU 381 has call processing software 648, address translation and parsing software 649, and H.323 protocols including H.225 signaling 650, H.245 software 652, and RAS/RTCP software 654. The RTCP function in block 619 is coupled to the UDP function in TCP/UDP/IP stack 611 and also coupled to the Packet Encapsulation unit in DSP 511 of FIG. 5.

A DSP interface manager software block 621 is coupled to software blocks 611, 615, 619 and 623 and communicates with DSP 511 of FIG. 5 and the software blocks described in connection therewith.

MCU 381 runs system software 623 including RTOS (real time operating system 660 such as Microsoft Windows CE or Symbian EPOC, as well as DSP 511 running BIOS™ RTOS from Texas Instruments Inc.) System software 623 includes WDT driver software 662, flash memory manager 664, BSP software, development and self-test (IPQST) software 668, and software installation code. 670

Multiple DSP embodiments of FIGS. 1 and 3 can use several C54x DSPs from Texas Instruments Incorporated, Dallas, Tex., such as in a line card having four (4) C54x DSPs. For example, a telephone central office can have 100,000 (one hundred thousand) lines for handling 10,000 (ten thousand) phone calls concurrently. Thus, numerous DSPs and line cards are used in a telephone central office. Also, the C6x DSP from Texas Instruments Incorporated, Dallas, Tex., provides miniaturization advantages.

Multiple DSPs can be utilized to replicate the embodiments described. Also, multiple DSPs can be used to provide a merged type of embodiments.

Applications Outside VOP

One example context is voice over packet technology, but embodiments are useful in any real-time signal to packet technology. In process control, measured physical variables include temperature, oil pressure, heights of liquid in containers, measurements that result in real time signals. The physical variables are compressed into frames of real time data for multiplexing and using a network to send the frames everywhere. When the frames reach their destination(s), they need to be reconstituted into signals in a manner analogous to voice. But there may not be any voice decoding, or any decoding in fact, in the general telecommunications cases to which various embodiments are also directed. So the process itself is suitably very short, e.g., 200 packets arrive and they need to be depacketized and D/A converted to recreate a real-time signal. However, the same principle applies that as the packets come to the system, some processing needs to be done, and the order of the processing herein is advantageously made to depend on how the deadline interval—how quickly a given frame is needed to contribute to its given stream of data. Thus the advantageous use of deadline interval computations advantageously is applied in any environment using real time packets.

In FIG. 2, a hospital has a network that transfers electrocardiogram EKG information. EKGs are taken, packetized at computer 203 and sent out via a network interface 271 over a network 200. Suppose 40 people in an intensive care unit at the hospital are simultaneously having their EKG taken in real time continually. At a university, an network interface couples EKG packets from network 200 to a computer 205 which depacketizes the EKG packets and sends the EKG real time data on to a monitor 267 for display. A doctor at the university remote location observes the EKG displayed data. Thus the EKG constitutes a real time signal, and the 40 simultaneous EKGs constitute 40 channels of real time data. Processing the channels is advantageously improved according to the teachings herein.

In another embodiment a complex refinery is controlled by hundreds of computers and the information is sent among them by an enterprise packet network. The packets in the network arrive at a node where a decision has to be made to determine the order in which to unpack, or depacketize, the information. Again, processing the channels is advantageously improved according to the teachings herein.

So, it is emphasized that the embodiments are not limited to voice packet processing, but instead to a wide range of real time digital signal over packet applications. Voice is merely one example of a physical signal.

In a system for converting packets to consecutive signal groups that have a predetermined time ordering, the packets lose their ordering in time, and the embodiments reconstitute signals in a predetermined time order. Assuming the packets arrive in the right order, they still must be opened up in the right order to prevent their information being lost.

Standards in factory automations called MAP, and emerging standards in medical communication, suitably are enhanced according to various embodiments.

In video and image compression there are many layers of compression as in MPEG, and the basic entity is one screen. In reconstituting pictures there is a deadline in image frames which recur on the order of 16.6 milliseconds or 33 milliseconds or other period on the order of tens of milliseconds for example. Reconstituting frames in real time suitably is enhanced by various embodiments, for which many channels are contending, see FIG. 34 described later hereinbelow.

Line Card

In FIGS. 1, 3, 8 and 9 the host 1115 receives packets from remote sites and it places them, one packet at a time, in the DSP memory space of the Vocoder. The packets share a common resource, the DSP processor, and the packets are placed in the queue 151. Eventually each packet is taken off the queue 151, and decoded in decode unit 171. The resulting frame of samples is added to an egress buffer 181 for the specific channel.

Figure 8:
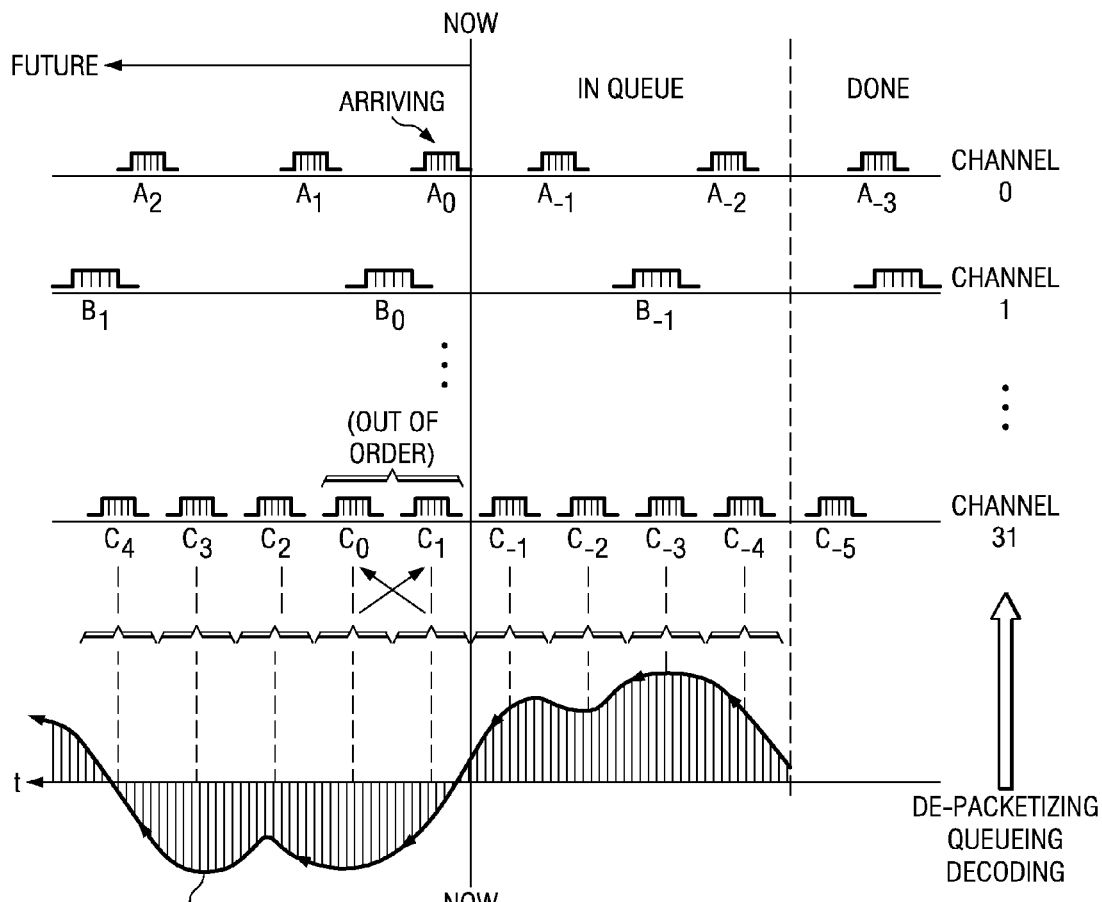
FIG. 8 is a diagram of inventive arrival, queuing, and processing operations wherein a horizontal axis represents time, and a vertical axis portrays various channels of a multi-channel packet communications system.

FIG. 8 depicts a temporal model of arrival of packets. The packets to the right of the vertical dividing line marked "now" are the packets that have already arrived, while those to the left of "now" are yet to arrive in the near future. The queue 151 of packets, part of FIG. 9, is aligned with the arriving packets model along the "now" line, which separates the past from the future.

Figure 9:
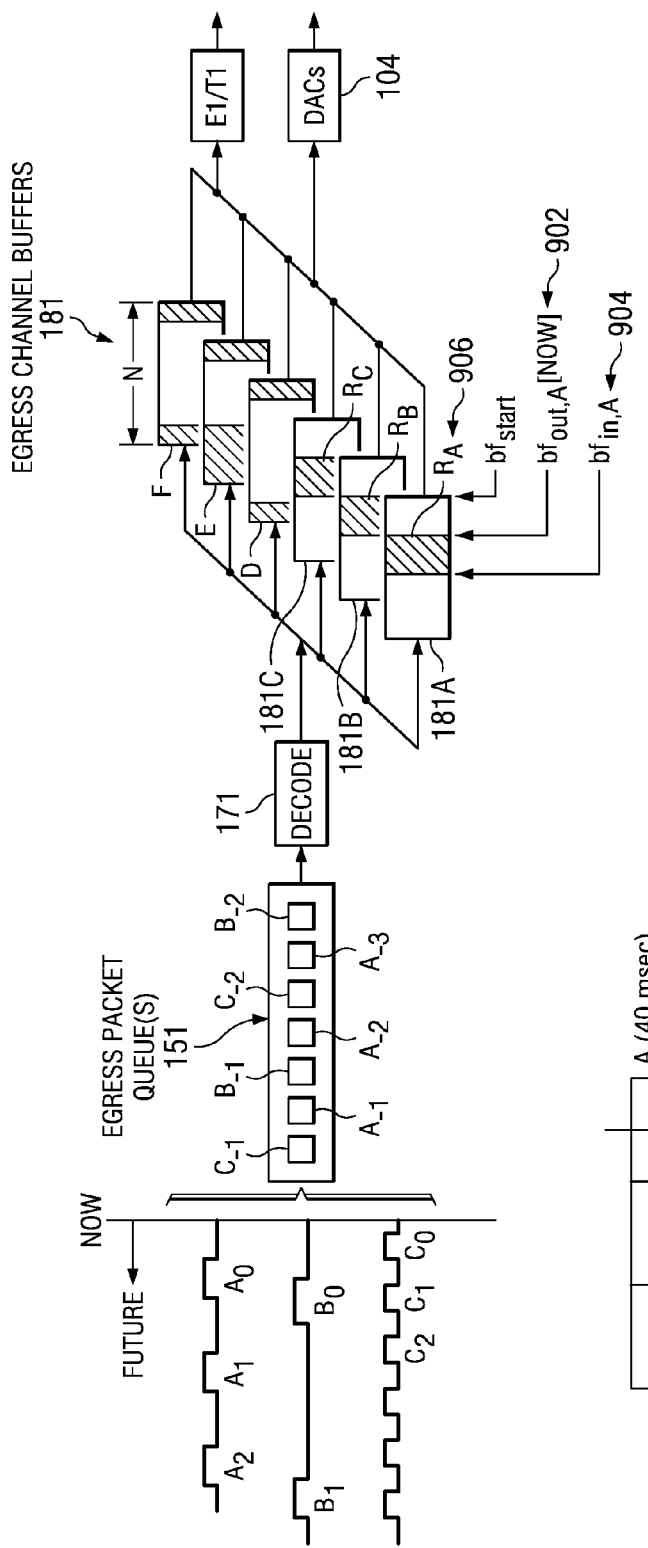
FIG. 9 is a mostly block, partially channels versus time, diagram of an inventive egress processing system that processes communications packets arriving from a network.

Concurrent with arrival, queuing, decoding of packets, and placing the frames in the egress buffers 181 in FIG. 9 there is still another process that is taking place. Samples from egress buffers 181 are being outputted, one sample at a time.

Looking at the buffer 181A, notice a pointer annotated "$bf_{out}$[NOW] 902." It is the address of the front of the data. The word "NOW" emphasizes that the sample being pointed at is the one to be output next. Whenever the 8 kHz clock indicates that the next output sample is required, the sample is retrieved, and the pointer and with it the NOW a moved one down.

An improved process herein relates the "now" of the arriving packet, with "NOW" of the outgoing egress sample, and organizes the underlying system to take advantage of understanding that relationship.

FIG. 9 also illustrates the state of the egress buffer for some channel 181A. The center of the buffer is shown to contain voice data. The address $bf_{out,A}$ 902 which earlier (FIG. 9) was associated with time "NOW" is pointing at the next sample to be retrieved and sent to a DAC. Another address named $bf_{in,A}$ 904 points at the future first data word of the next packet's frame. Between the two addresses there is data ready to be sent out to create the voice stream. That data, marked "$R_A$" 906 is the data reserve.

Assume that right "now" a packet destined for this channel has just arrived.

Observation 1: If the arriving packet is to be included into the voice stream that packet's data must be laid down in the buffer before the reserve R runs out.

Channel B with the reserve of $R_B$ being smaller than $R_A$ is also shown at the right in FIG. 9. For the two channels the reserves are being depleted in the same rate (of 8,000 samples per second). Thus the state of B will become critical before the state of A does. Indeed, the reserves of B must be replenished before the state of A becomes critical.

Consider a case that a packet for channel B has arrived immediately after packet for A, and both are for decoding as in FIGS. 8 and 9, in order of their arrival. If packet A were decoded before the packet B, channel B would be put in jeopardy without any visible benefit for channel A.

Observation 2: The quality of voice communication can be improved if the order of processing of packets is made to depend on the needs of each channel.

Observation 3. The measure of channel's needs is the reserve. Quantitatively, the reserve is the difference of two addresses:

$$R=bf_{out}-bf_{in};$$

This is the measure of the reserve in terms of the number of voice data words in the reserve. Now consider measures of time expressed as the number of clock cycles. Assuming that the clock is the sampling clock, the number of time units $C_A$ in that region are the same. Thus $C_A=R_A$.

If data reserve would wrap around the boundaries of the buffer, see the section "Circular Buffers".

Observation 4: It is possible to organize the queue of packets waiting for decoding according to the needs of the individual channels.

Superimposing an order on the waiting queue creates that possibility. This order is made to depend on the values of the channels' reserves. A new packet is "sorted-in" into the queue based on the value of reserves of its channel.

Two ways of handling the problems are next discussed, with implication how to organize the underlying system processes.

δT approach. A δT (differences) approach is based on maintaining values of reserves for each yet to be unfurled packet in the system. The name δT indicates that the reserves are differences (between two addresses within the egress buffers).

For any one arriving packet, the process accesses addresses $bf_{out}$ and $bf_{in}$, and computes the current reserve $R_X$ for that channel.

Let the packets in the queue for decoding be already sorted with respect to the reserves $R_M$ of their respective channels. The packet X that just arrived is "sorted in" into the ordered queue, by comparing the $R_X$ with the values of $R_M$ of the packets already in the queue.

This approach updates the values of reserves at each tick of the clock. Thus far, the clock is sampling clock of 0.125 msec (8 kHz) rate and updating all instances containing the record of reserves for all channels and all packets in the system, is feasible but burdensome.

Note that the frequency of updates can be even more advantageously reduced to the times of arrival of the packets. For 32 channels that reduces the update rate to 40%. Another solution even further reduces the clock rate to 10 msec (100 Hz.)

The λT Process (and θT Process).

There are several advantages for maintaining precise temporal knowledge of events. The λT process, a linear model of the realistic θT (circular time) approach, is presented below. Details of the θT are shown in the section "Circular Buffers."

The λT (and θT) approach maintains time-stamp values of deadlines for each yet to be unfurled packet in the system. In the λT process the set of time-stamps is a succession of natural numbers in "linear" region of numbers. In the "linear" span normal arithmetic operations are valid. However, when no limit is placed on the values of the time stamps no limit is placed on the size of the container. Thus the λT approach is realizable for limited ranges of time. Any one arriving packet is slated for a specific channel. The channel record provides direct or indirect access to the deadline time, by which the packet's data is inserted into the egress buffer. For the clock equal to the sampling rate that deadline moment t for a given channel is $$t_{DDL,X}=t_{NOW}+R_X;$$

The packets in the queue for decoding are previously sorted with respect to their deadline times. The values of those reserves are accessible for each packet in the queue.

To realize the possibility stipulated in observation 4, first calculate $t_{DDL,X}$ for the new packet on channel X. That is done by accessing the clock ($t_{NOW}$), calculating $R_X$ and adding the two. Then "sort in" the packet into the queue by comparing the $t_{DDL,X}$ for the new packet X with the values of $t_{DDL,M}$ of the packets already in the queue.

The process just described solves the issue stipulated in Observation 2. The processing of packets is ordered to depend on the needs of each channel as expressed by the reserves.

The λT approach described above works when the containers for the time stamps are sufficiently large. "Circular time" in the θT approach confers further advantages, as described in the section "Circular Buffers."

The 10 msec boundary, time differences process=[$CLK_L$, δT]

Public telephony processes are standardized with frame lengths being multiples of 10 msec. Some embodiments herein take advantage of that common denominator. The following section shows the impact of this "local optimization" on the implementation.

The presentation of the implementation that takes advantage of the 10 msec boundary is a stepping stone. In particular, this invention is not limited to the implementations that take advantages of the frames' duration being multiples of 10 msec. Taking advantage of the regularity helps some embodiments of the invention to be made simpler.

Figure 10:
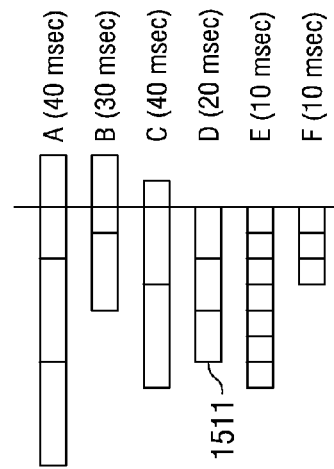
FIG. 10 is a diagram of arrival of packets in various communications channels having codecs operating on different frame lengths wherein a horizontal axis represents time, and a vertical axis portrays various channels of a multi-channel packet communications system.

FIG. 10 illustrates the "FIFO memory" model of egress buffer reserves for several channels. The FIFO memory model assumes that all data is always shifted toward the output (on the left of the buffer). Each time a data element is withdrawn from the memory, all remaining data is shifted forward. When data is added, it is appended to the end of existing data.

In FIG. 10 the reserves of all the channels reserves can now be compared at a glance. Equally important, the "NOW" for all the channels is aligned: in fact it is seen as a single line. The reserves are consumed by "moving" toward the NOW, one sample at a time, at 8 kHz rate.

FIG. 10 previews a design possibility, which takes advantage of the fact that the duration of all frames is a multiple of a 10 msec period. That allows alignment of all frames' starting points at any one of the 10 msec boundaries. Notice on FIG. 14 that "NOW" for all channels is away from the next 10 msec boundary by the same fraction of the 10 msec period, thus the same number of samples.

Aligning the starting points of the frames also aligns the ends of the frames. In consequence (inspect FIG. 10 again) all the reserves' ends fall on one of the 10 msec boundaries. That implies that deadlines for any packet also fall on one of the 10 msec boundaries. In consequence the time resolution of measurements can be lowered from a single sample (125 usec) to the block period (10 msec).

The 10 msec-boundary approach reduces the "drop rates" (loss rates) of packets and minimally delay the egress voice channel by some amount of time up to 10 msec. Each time the process initiates the egress side of a telephony call there is an optimal moment to start the first frame. That moment is related to the arrival time of the first packet for each new telephony conversation. With the 10 msec clock that frame's starting point is suitably delayed for up to 10 msec, and after that all the frames in the egress side talk path are delayed by that amount.

Faster clock can provide some performance gain by taking into account the impact of different decoding times for each packet, caused by different decoding processes.

The high-resolution (0.125 msec), absolute time process= [$CLK_H$, θT]

Linear time $CLK_H$, λT is elegant. Realization of the continuous time advantageously uses the circular time θT in place of the λT. Detailed presentation of θT is provided in the section "Circular Buffers."

The two process type δT and θT are very similar, except unlike the λT, the θT process does not require updating the time-records.

FIG. 1 further shows a Multi-Channel/Multi-Codec DSP telephony system on the TI TMS320C6201 platform to support DTMF, echo cancellation and multiple speech/modem coder functions. The selection of the coders suitably occurs at run-time. Multi-channel 8 KHz PCM data comes in simultaneously through the C6201's multi-channel serial port in a TDM fashion. The input data for each channel is separated from the input TDM data stream and saved to a circular buffer. The size of the circular buffer is at least as large as the least common multiple of all the frame sizes of the coders supported.

A non-preemption embodiment advantageously schedules the tasks. The CPU load, or delay, presented by any single 'frame task' is a predetermined interval of time, e.g., 500 μsec. Such predictability of scheduling facilitates validation of the design as well as system performance validation.

Unlike a fixed or static priority system, an process based scheduling system herein takes into account the attributes of individual packets to fine-tune an optimum execution sequence. In this way, adaptive scheduling adjusts itself to changing real-time conditions, an important goal in telephony central office design.

BIOS/™
suitably (but not necessarily) is utilized in tuning up the host interface, in inner level processing and in dealing with unpredictable tasks like the detection of DTMF.

Very important uses of BIOS are the borderline issues: a packet arrives so late, that the current task's delay (500 μsec in worst case) makes the difference between utilization of the packet as voice data, and throwing the packet away.

The input and output digitized signals are divided into frames. The size of the frame depends on the vocoder process, and can range from 10 msec to 40 msec. Current vocoder processes all have a greatest common divisor of 10 msec or 80 samples worth of data. Both the input as well as output sampled data frames are aligned along the common 10 msec boundary. 'Frame task,' or simply 'task' means the CPU activity on behalf of one frame for one channel.

The duration of the frame tasks differs as function of process (including the frame size). However, if the process exceeds a certain duration, the CPU load would be over 100%. The objective of the next section is to estimate the maximum duration, which the worst case 'frame task' may be allotted, while the system's intended function may still be carried out.

Maximum Delay in Absence of Preemption

In a While loop, preemption is avoided by doing just one frame task only and then checking for the 10 ms interrupt. In reality, the task does not respond to interrupts for the brief interval of 400 us., or 473 us as calculated hereinabove for time needed to execute a frame task.

For a given process, all the channels must be executable within the period of the process. The calculation determines that a process servicing 32 channels with 20 ms frame size must have 20/32 ms process execution time per frame task to service each channel. If the encoder is 2/3 and the decoder is 1/3 of the time then the decode and encode upper limits are determined. In actuality several processes are servicing 10, 20, 30 and 40 ms frame sizes in various channels in general. The greatest frame size (40 ms) assuming all the channels were using it, would allow the longest time required for the process to run. The worst case is taken for the calculation by assuming all the channels are utilized by a given process. The process type with the lowest ratio of process execution time divided by frame size establishes the worst case. The frame task simply starts and goes to completion in a predetermined amount of time.

The longest permissible task execution time is found by considering the longest frame. The longest frame (g723) is 30 msec. Assume that all channels are running the g723. Thus we have 30 msec to complete both ingress (voice to packets) as well as egress (packets to voice) processing for all 32 channels.

Thus the maximum time allotted to a channel desirably does not exceed 30/32=934 μsec. If a 20% design safety margin is provided, the maximum allotted time per channel is 747 μsec. Taking an overhead figure of 15% of real workload leaves 635 μsec.

Now consider the two sides: the ingress and the egress each produce a separate 'frame task'. In a worst case scenario, assume the two tasks are not equal in length, and one takes 2/3 of the time. Taking 2/3 of 635 μsec yields a maximum permissible duration of a single CPU 'frame task' of 423 microseconds. In other words, to begin its execution, the highest priority task does not ever need to wait longer than that number. If the scheduling is done between each two tasks, the 423 μsec is a 'realistic figure', which is suitably incorporated into the analysis as potential delay.

Note: In the calculation of 423 microseconds above, the frame time was divided by the number of channels. Next a safety margin and overhead figure are subtracted therefrom. Further a ratio (probably between 1/3 and 2/3) for the time of the egress task is multiplied by the result. Safety margin refers to fact that process is not permitted to use 100% of CPU time. Overhead (e.g. 15% of real workload) refers to some time that the scheduling of FIG. 12, bringing in buffers, responding to interrupts, and other management operations that occupy time that is not part of the decoder processes such as G.xxx. The ratio 2/3 is worst case ratio of egress processing time to sum of ingress and egress (encode time plus decode time) for the worst case time an egress packet would have to wait in a nonpreemptive system in order to get executed. In some cases the calculation is used for design purposes. In other embodiments the calculation result is entered into the decision processes of the embodiments to determine whether to discard a packet.

Delay Horizon at the Ingress (Voice to Packets) Side

Consider the ingress side with a 10 msec process, e.g. g729, a candidate for high priority treatment. Assume all channels are running the g729. In the pre-emption embodiment data frames are aligned along a common 10 msec boundary. Thus the frames for all channels become complete together. 10 msec later the frames for all the channels become available again. And all processing for the batch of frames is suitably completed within the 10 msec.

Thus, full utilization of CPU time implies a built-in latency of 10 msec in processing. Any one task, among the 32 can be placed anywhere in the 10 msec while still guaranteeing the realization of the system's intended function.

In consequence, the potential delay of 423 μsec can is clearly acceptable when placed against a 10 msec horizon.

The Egress (Packets to Voice) Side

Notice that the example 423 μsec figure applies here also. In other words the delay of the highest priority case desirably does suffer a greater delay than e.g., 423 μsec. More generally speaking, the delay desirably does not exceed a time interval equal to the longest frame time divided by the number of channels, less a design safety margin, less an overhead figure, and the result multiplied by a fraction represented by a longer task.

The delay horizon length on the egress side is highly variable. This problem is solved using scheduling as described herein. Scheduling thus provides an advantageous alternative to preemption, where preemption is a mechanism present in real-time kernels. The presented figures indicate that the non-preemptive scheduling can do the job well.

The discussion hereinabove has demonstrated that the time of execution of each of the 'frame tasks' is very short. Thus a possibility presents itself to wait until the presently running task completes, before running the high priority task.

At the time of arrival of any one packet, there is enough information about that packet for its optimal scheduling, to successfully deal with asynchronously arriving packets, and tune up the ingress side for maximum performance.

In FIG. 11, a top-level implementation of the scheduling of the system uses the no-preemptive process-based scheduling. It introduces optimal scheduling of tasks, and with process and apparatus to accomplish it, solving a problem of multiple tasks with unpredictable hard real-time deadlines. Half of the tasks in the system are of that type.

Scheduling the Egress Side (Packet to Voice)

For the egress side the packets appear in unpredictable times. For each incoming packet a decision has to be made where to place the packet's task. Each packet has a hard deadline in front. Tasks are scheduled preemptively in pre-emption embodiments and nonpreemptively in nonpreemption embodiments.

Considering a specific channel, a known process is running on that channel, and with it we know the frame size as in FIG. 10. The 'current' frame is being outputted and eventually will reach the frame boundary. This means:

1—By the time the current frame's end is reached, the next data frame is suitably stored in the buffer if a race condition is to be avoided.

2—By the time the current frame's end is reached, the decoding 'frame task' is desirably completed.

3—The time of the current frame's end less the duration of the 'frame task' is the latest time for beginning the task to finish the task by the time the current frame's end is reached.

4—Since the DMA registers are readily looked up, assume that we a given present time 'NOW' defined as when a packet arrives is determinable in terms of number of samples until the boundary.

5—At 'NOW' look up the state of the output buffer (is the last frame being output, or is the one 'ahead' frame already there.)

6—From time NOW and the state of the output buffer, less the actual 'frame task' execution time, compute a margin interval as an interval from NOW until the 'last moment to execute' of paragraph "3" just above.

Thus, and with advantageous importance, all that is needed to know in order to make a decision where to place the task at hand on the scheduling list is available, as just described.

A method of scheduling is described next.

Notice that all calculations for a given channel are related to the frame boundary. All those boundaries are 10 msec apart. Thus the potential completion times are also 10 msec apart.

Using the present method of the derivation of time, calculate when the arriving packet needs to execute with precision of the sample clock (125 μsec).

Note however, that all the hard real time deadlines are 10 msec apart, so maintain a small set of lists of items whose deadlines are e.g., less then 10 msec from now, less then 20 msec from now, less then 30 msec from now and more then 30 msec from now.

Keep executing the '10 msec list'. For brevity, the discussion next slightly simplifies the transition that occurs when 10 msec list is exhausted, or when the 10 msec (time) boundary arrives. (See the ingress side for more elaborate treatment).

At each 10 msec boundary, examine the 'less then 10' list. The 'less then 10' list should be empty. If the list is not empty it discloses which channel has not been serviced: just output an empty frame. Shift the pointers down: the 20 msec list becomes the new 10 msec list etc.

The 10 msec list is desirably sorted in ascending order of 'time to process.'

Next, redistribute the 'more then 30'

When a new packet arrives, look up the 'time to process.' If the packet belongs to 'more then 10 msec' list, attach it there. For the less then 10 msec list, search the list and place the packet in its time to process place.

Thus, the process and apparatus of this embodiment remarkably achieves and organizes the egress side for optimum processing.

Scheduling the Ingress Side (Voice to Packets)

For the ingress side the frames become complete on certain discrete 10 msec boundaries. All the tasks that just became ready are scheduled at the boundary. The issue could be closed here, except to answer how to commingle the egress and the egress side.

On any one of the 10 msec boundary tasks of any frame lengths, the 10, 20 and 30 msec may become ready. The 10 msec frames are suitably arranged to complete in 10 msec, the 20 frames in 20 msec, and the 30 in 30 msec. However, unlike in the case of egress these are only semi-hard real-time deadlines.

If different assumption is made, e.g., everything must complete in 15 msec, the load capacity of the CPU can be underutilized.

Thus there is a clear implication how to organize the scheduling structure. The structure should contain three lists with tasks' deadlines of 10 msec, 20 msec, and 30 msec. Each list includes the items whose deadlines are e.g.

less then 10 msec from now,
less then 20 msec from now and
less then 30 msec from now.

The 10 msec list has a priority and it is the first to be passed for execution. At the next 10 msec boundary, the original 10 msec list is either empty or it is not. If the 10 msec list is not empty various embodiments handle it advantageously, recognizing that the ingress side deadlines are NOT hard. With a 20% safety margin, as assumed hereinabove, the system is suitably arranged to keep executing, and the system catches up, subject to the provision of a suitable watchdog process.

If on the new boundary the 10 msec list is empty, the 20 msec is or already [see next sentence] has been renamed as 10 msec list. The 30 msec list is renamed as 20 msec, and a new 30 msec list is created. If the original 10 msec list gets used up earlier, the step of shifting down of the lists takes place at that time.

The new 10 msec list is returned to execution.

The next part of the discussions explains 1) how to combine the ingress and the egress side lists, and 2) whether to do any sorting of the list (lists) as well as searching the list to insert a task in the right place.

As to combining lists, the two sides' lists are identical in appearance and almost in function. The ingress side lists represent semi-hard deadlines, while the egress side lists include tasks with hard deadlines. One suitable process maintains both sets, and executes the 10 msec egress list first.

The sorting and searching aspect pertains to egress side only. Just the 10 msec list is benefited by sorting, so the process sorts the 10 msec list. The same goes for insertion of a task into the list. Remember that the lists are 10 msec apart. Inserting a late packet into its 'rightful' place make a real difference for this one packet.

Multi-Channel, Multi-Codec DSP Telephony Software Scheduling of Frame Tasks and Execution Control Process embodiment of FIGS. 13-18 advantageously solves a problem of scheduling frame tasks by assigning priorities to them. Also, this process embodiment addresses and solves an important problem of scheduling packets' frame tasks according to the hard real-time deadlines of the arriving packets. In this way, overall quality of performance or quality of service (QoS) of the system is enhanced because fewer packets are discarded or ignored because of failure to process them in time.

Even for the same communication channel the packets may be sent with slightly different delays (in relation to the PCM frame they include), and may travel through the network by a different physical route from each other. Apparently-random arrival of data packets is the result. Each packet may be considerably off 'its' ideal position in the timeline. Since the density of arrival of packets is only known statistically, the egress side becomes essentially asynchronous.

Unfortunately, each packet has its own hard deadline. Each previous packet has been or is being decompressed into data for output from the voice decoder. That data being output from the voice decoder will eventually be expended, or run out. Thus the current packet must be decompressed by a deadline before the preceding channel data runs out. Each packet must meet its deadline or it will have to be discarded, overwritten or ignored.

The solution of one process embodiment is intelligent queue management, wherein a pure FIFO (first-in-first-out) buffer is improved to intelligently push some packets ahead in the queue.

Because of the uncertainty attendant with arrival of packets, some queuing system, generally speaking, for the waiting packets is provided regardless of the strategy of scheduling adopted in the practice of an inventive embodiment. Thus, the reader's attention should not only be focused on particulars of a given embodiment solving the hard real-time problem, but also to the system organization and maintenance for queuing packets for execution of their respective 'frame tasks'.

In FIGS. 1 and 2 an analog electrical signal 1111 is produced by a transducer (audio, light, pressure, temperature, or any other physical quantity, not shown), whereupon it is sampled as indicated by vertical lines thereon. The samples are numbers so related in time so that, when they are sent by a computer 1101 via a transmission medium 1121, such as the Internet or other network, to a receiving computer 1151, they can be reconstructed as another analog signal 1161. Computers 1101 and 1151 are suitably constructed to handle many signals of the type of 1111 at the same time.

The computer 1101 creates frames of digitized data. It acts as an interface wherein the digital signal is broken into pages, or frames or buffers. An important event in computer processing is buffer interrupt. When a buffer is filled with data, then an interrupt is generated by the buffer and coupled to a processor 1115, and the processor is thereby signaled that it has a full buffer of data to process.

A similar event occurs on the output processing of the computer 1151. The computer 1151 creates the pages. In the case of the packet, the pages are created not out of the voice or other analog waveform 1111 directly but out of packets 1125 that are suitably decoded by computer 1151. The issue here is that at some point the computer 1151 may have created a page or buffered a data frame while a previous frame is being output. When the previous frame of data ends the parent page has to be ready or there will be a break in continuity of the output waveform 1161 being generated by computer 1151. Suppose a packet 1125 is late arriving at computer 1151. Then the break is usually just filled with silence (or gap in the real time output), or filled with noise, or filled with a copy of previously received data.

A core concept of some embodiments lies in the recognition that as the packet arrives at the boundary of the computer 1151, it implicitly carries with itself a hard real time deadline that implicitly one can know ahead of time when that packet needs to be decoded and put into the buffer to be decoded to prevent it from being lost due to late arrival or unnecessarily-delayed handling in the computer 1151.

In such embodiments, first comes recognition that the packet contains a valuable real time deadline explicitly or in a form that can be deduced, derived or computed for that packet. Layers of implementation come next. First, the real time deadline is read or recovered and then used to schedule that packet. Second, comes a layer of particular method steps that define how do that scheduling.

The real time deadline is valuable because it is useful, as described herein, for organizing the sequence in which packets from different channels are processed. From that point on, a top layer of software or other implementation is divided into two components: 1) how to create a data structure and 2) how to organize a system with such data structure such that it is possible to rapidly read, recover or calculate the deadline information, and 3) how to organize a scheduling system that takes advantage of the deadline information.

The arriving packet in one form suitably not only has data but also has the channel number that the packet belongs to. An embodiment having 32 duplex channels has 32 ingress channels and 32 egress channels.

In one set of embodiments, illustrated in FIG. 11 an architecture of saves moderately-late-arriving packets which would be effectively lost to the system if processed in order. The solution advances processing of the packets depending on their deadline. This type of embodiment is useful for instance in infrastructure systems where one or more real time decoders 1171 process many media channels serviced by many parallel buffers 1175.$a$, 1175.$b$, 1175.$c$, ... 1175.$q$ that are receiving packets concurrently. A packet buffer 1181 receives packets for the many channels. If the packets were processed on a first-in-first-out basis from buffer 1181, holding packets C,A,B,Q,B,Q,B,A,A, various late-arriving packets C,A,B would be useless to the system because they would be processed too late. A selector 1185 operates according to a process that advances processing of a packet C, for example, where channel buffer 1175.$c$ is almost empty, by moving packet C "to the head of the line" that is, by moving packet C from the tail end buffer 1181 to the almost-empty channel buffer 1175.$c$. Thus, the late packet C is made available to decoder(s) 1171 soon enough to be useful, or even just in time, advantageously improving the operations of the system.
Removing First Data Packet Dependency in a Channel Returning to FIG. 11, a possible problem in VoIP is that the decoder output begins and depends on the circumstances of the arrival of the very first packet of the compressed speech. This phenomenon is called first packet dependency herein. Depending on the accident of the arrival delay of that first packet relative to the succeeding packet(s) the process may propagate this accident in an unfortunate way and degrade the reception performance for all the rest of the packets. To solve this problem, a buffer 1177 is used to accumulate some packets. The decode system is made intelligent enough to delay the egress output of the first packet, thereby advantageously reserving a cushion of time for subsequent packets before their deadline expires. In this way, late arriving packets that arrive, for example, 40 ms late still have 20 ms of grace, thanks to the provision of the 60 ms buffering of the very first packet.

This buffering time is chosen long enough to provide effective deadline cushioning, and short enough to not unacceptably contribute to delay in conversational speech that might be noticed by the users before they can hear reply speech.

In this way, the improved decode system, device and process ameliorates the sensitivity of VoIP/VoP/media system to accidents in arrival delay of the very first packet in a channel. By contrast a conventional anti jitter buffer merely evens out the variations in delay between successive packets in the communications stream. Buffer 1177 is a both single-channel and multiple-channel improvement.

Alternatively, the first packet is simply placed back a number of spaces in its channel buffer of FIG. 11. This result is advantageously accomplished by suitably programming selector software or configuring buffer hardware.

Numerous different embodiments are described in more detail. Among other types of embodiments, some embodiments put the packets in storage and queue some corresponding information called cells in a buffer analogous to buffer 1181. The cells can point to the packets. Deadline information for each packet is obtained and put in the cells directly, or a cell pointer points to the deadline information. In other embodiments, the queue is not a physical buffer, but a linked list data structure in software. In other embodiments, the packet buffer has a sophisticated selector process 1185 and distinct channel buffers 1175.$a$-.$q$ are unnecessary.

Turn now to FIG. 12. A time interval is used up for host to receive a packet, strip or examine the header of FIG. 7 and then in FIG. 15, determine the channel number and channel process, compute the deadline interval, and load the frame(s) into the buffer ahead of the decoder. Various embodiments confer increasingly substantial improvement where enough time exists to recover the information that is getting lost in the shuffle of packets delay. If the decode time were zero in a limiting case, the scheduling approaches herein might not be necessary because any order of taking packets would be satisfactory. Thus, a curve of improvement exists considering egress only with total available channel time less ingress processing time. FIG. 12 shows such a curve.

In FIG. 12, when normalized decode time (on the horizontal axis) is zero, the usefulness of deadline interval sequencing herein (on the vertical axis) is also zero because there is no point of ordering as every undecoded frame is instantaneously available. Normalized decode time is here defined as the amount of execute time the system actually takes to execute a given decode process divided by the maximum amount of time the system could make available to execute that decode process. As the normalized decode time x rises on the horizontal axis, the usefulness rises until the decode time is approaches a limit (indicated by vertical dotted line). This limit is proportional and roughly equal to interval (length of frame, e.g. 20 milliseconds) divided by the number of active channels per processing element (PE) in the system in the special case when every decoder has the same execute time.

With a large number of channels active, sequencing the decodes in order of deadline interval for each of the packets gives them more chance of being processed in time before the deadlines, than when there are few channels active because the amount of time available to process fewer active channels is much longer. Thus, x moves rightward, provided the number of active channels increases, the process is programmed on the DSP(s) to allow an active channel to give up more DSP time when other channels are active.

Now consider the effect of designing with more DSPs or with more pipes per DSP. If there were 8 DSPs with four superscalar pipes in them then to process 32 channels, then the highest number of active channels per PE is 32/8.times.4=1. But if there were 4 DSPs with two superscalar pipes in them for 32 channels, then the highest number of active channels per PE is 32/4.times.2=4. Processing elements are computed as PE=pipes.times.number of DSPs. If a decode process uses more than one PE at a time, then processes per DSP is used instead of PE/DSP. Example: Each process uses 2 pipes/process. 8 DSPs have 4 pipes each. Use 8 DSP.times.(4 DSP pipes.times.2 pipes/process)=16 instead of 32. 1

In summary, $$X = \frac{(\text{Actual Decode Execute Time}/)}{\text{FrameInterval}} X \frac{\text{ActiveChannels}C_A}{Nr.DSPsX \frac{\text{Pipes}}{DSP} / \frac{\text{Pipes}}{\text{Decode}}}$$

The graph of FIG. 12 is illustrated as stairsteps, when time available for decode permits (right to left) at first only one full frame per channel of decode, then 2 frames of decode, then 3 frames of decode, etc., in the time available. The graph of FIG. 12 recognizes that sequencing the latest very late packet to the head of a sequencing queue becomes ever more critical the more execute time a frame needs for decoding, compared to the execute time the system can make available. The time available for decode in the graph of FIG. 12 is net of time needed by the system to perform ingress and overhead processing, which is estimated elsewhere herein. As discussed here, embodiments of sequencing advantageously provide the most advantage in the most demanding of short frame intervals, all channels active and lower performances (less expensive) DSPs.

Figure 13:
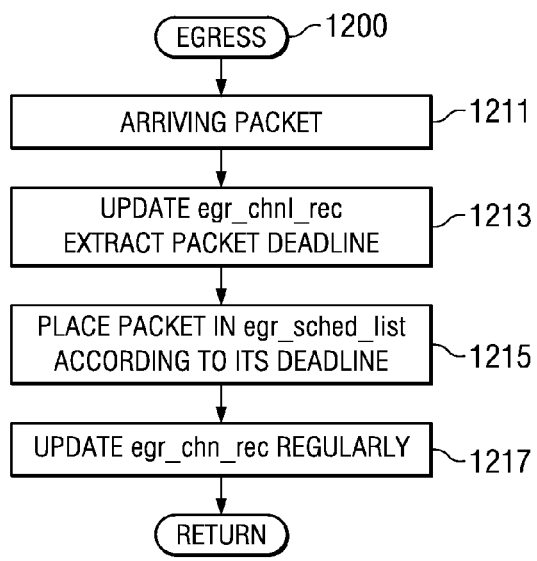
FIG. 13 is a flow chart of inventive process steps based on packet deadlines.

In FIG. 13 for egress method, operations begin at Egress 1200 with an arriving packet reception step 1211. The system has an organization of channel records egr_chnl_rec used by a step 1213. The channel number points to a corresponding channel record. Step 1213 extracts the packet deadline for a given packet and updates the organization of channel records egr_chnl_rec. The channel record contains a deadline value, which is a number that RAS (remote access switching) design specifies, and which is a number of 10 millisecond (ms) units to which the packet is subject before it becomes useless and may be thrown away. Next, a step 1215 places a packet of data in an egress scheduling list egr_sched_list according to the packet deadline value. Later, a step 1217 updates the channel record egr_chnl_rec. This update step 1217 is performed suitably on 10 millisecond boundaries (or otherwise periodically) or alternatively performed on some regular basis whether periodic, non-periodic determinate, or non-periodic random.

A more complex embodiment maintains an accurate record of how much time a given packet has remaining for it. Thus, in addition to the 10 ms interrupt of the less-complex embodiment above, representing number-of-10 ms intervals, the complex embodiment also calculates or uses a counter to determine what sample of the 10 ms period is passing by at a given instant of time. For example just after a 10 ms period a counter value might be 79 for example, and then just before the next 10 ms period the value would be zero (00). Somewhere in between would be 50 or 42, for example, representing number of samples left before 10 ms deadline. The number, e.g. 42, is the number of data cycles remaining in the 10 ms period. Embodiments with other-than-10 ms periods are also readily implemented.

In telephony the 10 ms period is important because certain standards specify 10 ms frames or buffers, 20 ms, 30 ms, and 40 ms frames and buffers. Thus, a packet with a 40 ms frame of data in a particular compression/decompression process or standard is sometimes used. The 10 ms period is a useful greatest common divisor (GCD) of the frame times of most of these processes and standards, and thus is advantageous for at least some of the embodiments discussed herein.

Consider a computation that takes time-now and computes a margin interval as an interval from time-now to last-moment-to-execute. See Step 1213 deadline control example #3 is a representation of amount of time, with 10 ms resolution, between time-now and time that processing for a given packet has to be executed. On the six steps of the scheduling egress side section of the software description later hereinbelow, a 10 ms resolution is employed, and other method, device and system embodiments operate in a more exact manner and/or with a shorter resolution.

Figure 24:
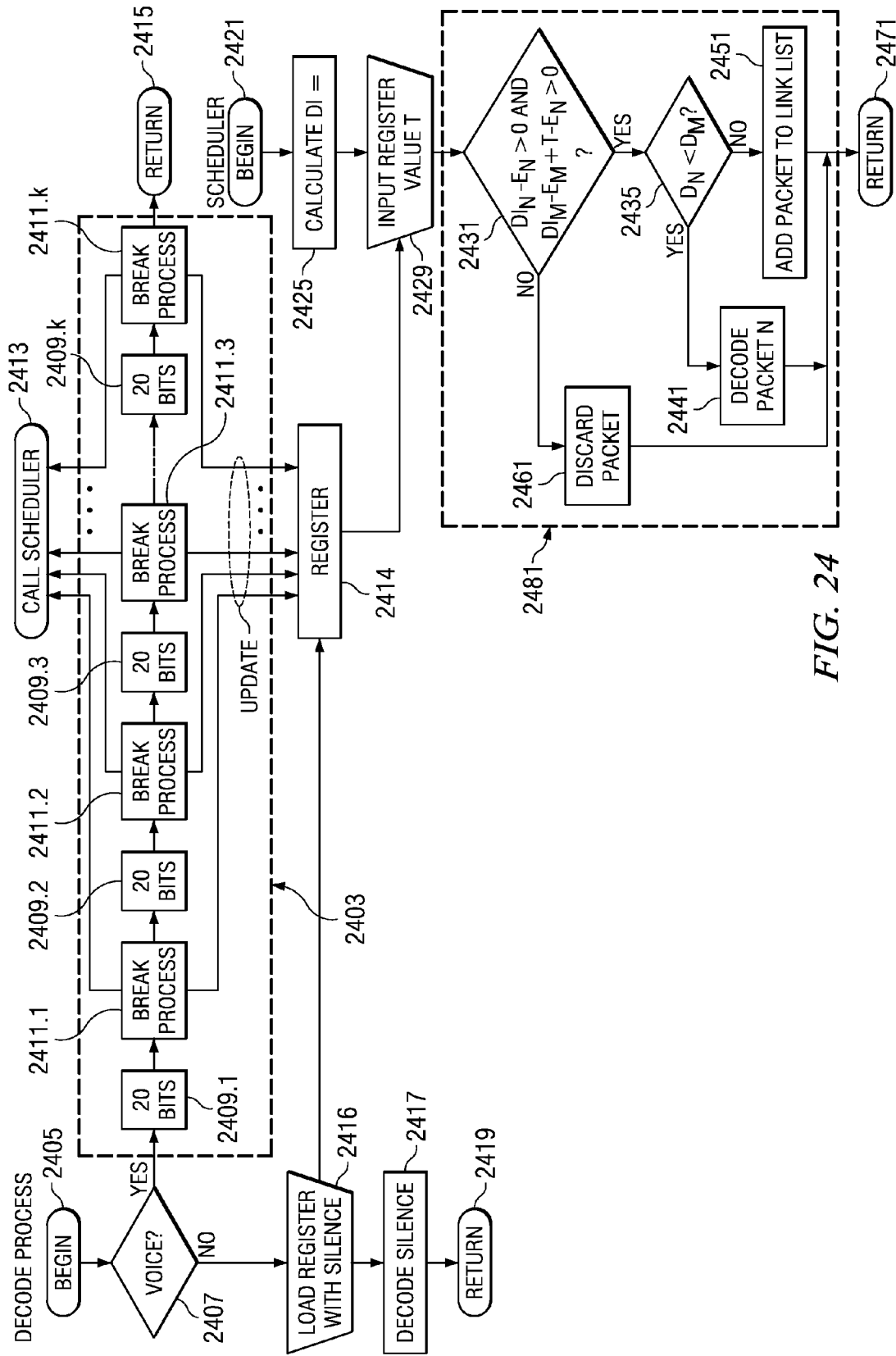
FIG. 24 is a flowchart of yet another inventive Staggered Deadline Process.

For example, in FIG. 24 another embodiment runs a one millisecond (1 ms) or a 500 microsecond (us) clock and counter and looks up the counter value at any desired instant to determine the time to a higher resolution. Indeed a one-microsecond (1 us) clock would confer more than enough resolution for most applications. Timers of any suitable type are contemplated for use in various embodiments. The timer is created based on the incoming or outgoing samples themselves. For example, 10 ms is occupied by 80 samples (8 KHz sampling rate Nyquist for 4 KHz voice passband), thus providing clock at least every ⅛ ms in which case the granularity of the clock would be 125 us.

Here a timer is used to heuristically compute the number of milliseconds remaining until the instant that a packet must be processed or be lost for practical purposes.

In FIGS. 8, 9 and 11 multiple channels contend for the same processor to decode or decompress and the processing of packets is based on their deadline interval DI. Multiple jittery packet channels contend for their opportunity to contribute to multiple decoded real time streams of decoded output, because one channel can defer to another channel to get processed first because the one channel does not need the decode processing just yet. Processes can look at a channel as something subservient to the program (my program picks up data, etc.), but a useful abstraction considers the channel as the active entity interacting with the other channels through the medium of real time processing. The channel can respond—the channel is an object comprising channel records with programs surrounding those records, and the process inquires when the channel needs the decoder, and the channel responds whether it needs the decoder right away or not.

Consider a voice stream of conversational voice. Interspersed with the voice are various spaces of silence. When the computer receives the packets and converts them into voice, some packets may be too late or lost and have to be replaced with silence with decay, noise, or interpolated data. In the case of silence, just before the D/A conversion, time constants of rise time and decay may be used. Thus, in process control systems, which might otherwise respond to silence very violently (e.g. pressure expected to be 25 psi is found to be zero), "silence" or "zero" frames are handled in a way that provides appropriate rise and decay respective to the system application.

In the voice area, the silence frame or silence packet contains an amount of time of the silence, or can be sent packet by packet.

When the silence packet enters the queue, a process embodiment here bypasses the decode process and go directly to the output side of the decoder, and make a period of silence. If a silence packet arrives late, it is not advanced in the queue as a voice packet would be, in the manner discussed earlier hereinabove in connection with step 1215. Therefore, the nature of a packet as being a voice packet or a silence packet suitably is introduced into the process.

Figure 14:
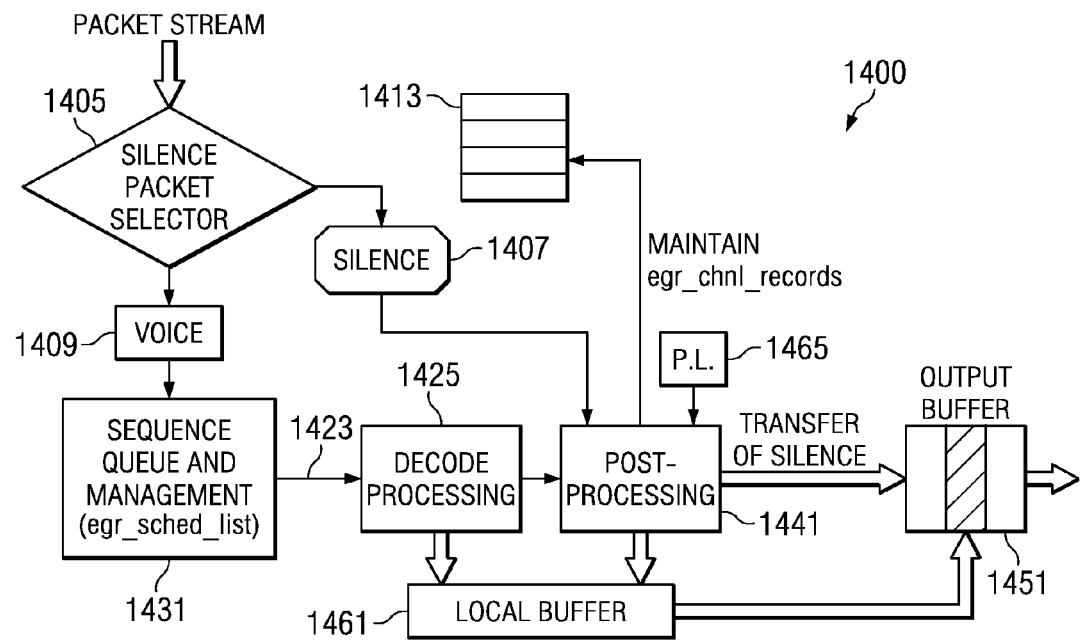
FIG. 14 is a flow chart of inventive process steps for handling information in various types of packets.

In FIG. 14, a Sequence Queue and Management block 1400 receives a voice packet 1409. A silence packet detector or selector 1405 routes voice packets such as 1409 to block 1431. The selector 1405 routes silence packets such as silence packet 1407 to a post-processing block 1441. An example of postprocessing generates voice data directly into the output buffer 1451 or into its local, or private, buffer 1461. Silence causes post processing 1441 to transfer silence directly to output buffer 1451, thus to fill certain spaces in the output buffer with data corresponding to silence in a manner consistent with the method used to represent silence in the system. The silence processing bypasses the queue block 1431. The postprocessing updates the channel records 1413 and increases the delay by the number of milliseconds of silence, thus acting as a source of maintenance of egr_chnl_records 1413.

When a silence packet is followed by consecutive voice packets; then according to schedule update in link list 1431, if 150 milliseconds of silence occur, the voice packets are scheduled in channel record 1413. The post processor simply updates by addition. If the frame is 4 units wide then the silence record (representing a frame 4 units wide) causes an update of an entry of 3 in channel record by adding 4 to 3 to equal 7. This then is the deadline interval for the next voice packet. Furthermore, if the silence packet is of a type that identifies plural frames of silence, by a number S in the packet, then the update is equal to the channel record plus 4S. (For example, 4S+3 is the new updated deadline interval value in the channel record.) Of course, if another type of packet represents a different frame width F, the number 4 is replaced with that frame width. In general the process updates a value of DI by the formula $$DI=DI+S\times F.$$

A packet arrives. Its character as silence or voice is detected in step 1405. Actual stripping of header, extracting data, and deciding whether silence or voice may involve 50-100 instructions, and these are concisely represented as the silence packet selector 1405 diamond. A voice packet 1409 goes to the queue 1431, eventually gets sent to voice decoder processing 1425, goes to post processing and decoded voice gets into the buffer 1451, and postprocessing 1441 updates the channel record 1413. Postprocessing updates the deadline interval DI or deadline interval entry in channel record 1413. Deadline interval whose example is 3 in channel record 1413 is updated by postprocessing 1441 of FIG. 28.

Decoding process 1425 provides digitized decoded voice to local buffer 1461 and also signals postprocessing 1441 which thereupon or concurrently does maintenance of the deadline interval entry in the channel record 1413 by updating it in the following way. The number of frames S that the silence packet represents is multiplied by the frame length F indicated by example numeral 4 in channel record 1413 whereupon the product is added to the deadline interval (e.g., 3) currently in the deadline interval entry of channel record 1413. Also the postprocessing 1441, depending on whether it is processing silence or voice, initiates a local buffer 1461 to store digitized voice from decode process 1425. Or, if the packet is silence, postprocessing 1441 causes a silence word 1465 to be transferred to the output buffer 1451 in the one or more number frames indicated to be silence by the silence packet. If there is a voice packet, the postprocessing 1441 causes the local buffer 1461 to issue a voice datum into the output buffer 1451 to take its place in the queue of that output buffer 1451.

Next consider the processing of a succession of silence packet, voice packet, silence packet, voice packet. The process detects a silence packet, then postprocessing 1441 fills out the output buffer 1451 with zeroes (or other silence signal).

Figure 15:
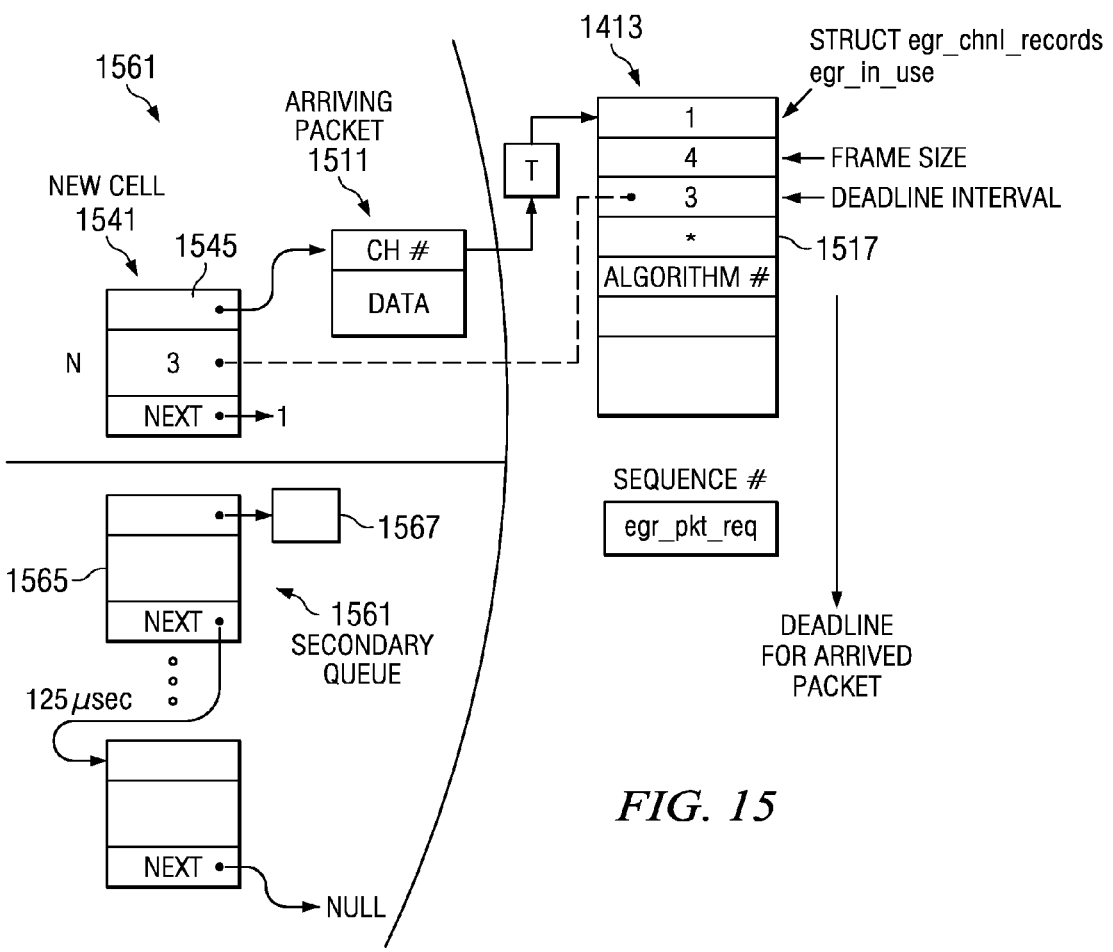

Turning to FIG. 15, a record in egress channel records 1413 has an example number "3" (with legend "deadline interval") entered therein indicating that it has 3 ten-millisecond intervals remaining before it becomes useless. This number "3" does not stay continuously to be 3, another component part of the channel record is a process wherein the deadline is updated regularly, e.g. every 10 ms., decremented by one (1) every 10 ms from 3 to 2 to 1 to 0. Thus, in a multichannel data structure, all the deadlines are reduced by one (1) every 10 ms. When the decrement goes from one (1) to zero (0), then the packet is too late to use anymore.

Further in the data structure 1413 egr_chnl_rec is an entry egr_in_use variable. The variable entry is "in use," so the entry is one (1). The channel becomes "in use" during a period when the channel was free (entry is zero (0)) and then a next call has to be processed, and then a given channel is assigned to that call and then the "in use" number is set to one. Advantageously, when the process is scanning many (e.g., 32) channel records, the system processing uses the egr_in_use variable to avoid processing those channels that are not in use since there is no need to do any processing on them. In a machine that can process 32 channels, such as 32 telephone calls, if at a given time only ten telephone calls need be processed, then only ten of the channel records would have a one (1) entry in egr_in_use.

The next entry number (for example, shown as "4") is data frame size F in units of 10 ms intervals, and is process dependent. This is not the packet length, but instead the length of a frame of compressed data, of which one or more frames are carried in the payload of a packet received in step 1211 in FIG. 13 and a packet 1125 in FIG. 1.

Beginning with raw data on the ingress side, a certain amount 40 ms. of PCM data is compressed into a packet by an encode process. Usually, but not always, the packet changes the amount of data from 320 words to perhaps as few as 20 words (16:1 compression). If the channels are very congested, the system suitably chooses a different compression process that compresses a fewer number of words, say 160, to 20 words (8:1 compression). Pure voice 1111 of FIG. 2 in digitized form is encoded into packets that are sent into the network 1121. One encoder process produces a frame 40 ms long. Another encoder process takes 160 words equivalent to 20 ms which also produces about 20 words for packets. Thus a frame is that interval of uncompressed digitized speech which an encoder process takes as its basic unit of compression.

A "frame task" for the ingress process is a task to take a frame for the encode process and produce a packet. The encode process depends on the sending computer process. For a telephone call, the encode process used by computer 1101 to send to computer 1151 may be a different encode process used by computer 1151 to send to computer 1101.

On the egress side, a frame task is the inverse process of decoding a packet or frame into decompressed or decoded real time data. On the egress side, a frame task is the processing required to reproduce from a single packet of data the frame which was intended to be reconstructed and now is, having traversed from the ingress side to the egress side. The process, taken as a whole, which is happening at the ingress or egress side which is needed in order to create a packet from a frame or which is needed to reproduce a frame from a packet, is called a frame task relative to that respective side. The system is arranged in some embodiments so that the frame task always takes the same amount of processing from frame task to frame task on a given ingress or egress side.

Among about a dozen popular international standard codec processes, choose which of the processes to use for a given transmission (or switch between or recode processes in a single transmission). Suppose, among 30 active channels on an egress side, some of the channels use process A using 40 ms frame size, others use a GPS process using 30 ms frame size, still others use frame size 20 ms—so that the system at any moment is processing a mix of processes. Note in FIGS. 14 and 15 in channel record 1413 having deadline numeral 3 for 30 ms, that this counts clock time. Instead it is the numeral 4 that represents the 40 ms frame size corresponding to a given 40 ms process as just discussed.

A reserved space 1417 for a finer resolution is marked with a star (*) in block 1413 of FIG. 15.

A queue 1431 holds all the channel records. The system has the deadline information indicating by when each packet has to be executed. The system copies the deadline interval entry "3" in block 1413 and associates it with its corresponding packet. The queue is a link list 1431 in FIG. 16, designated egr_sched_cell comprised of linked cells. Each cell A, B, C in the structure egr_sched_cell is a cell of three words that has a pointer to a packet, has a deadline for when that packet needs to be executed, and finally has a pointer to the next egress schedule cell in the queue, thus ordering the cells in order of their deadlines. The order of the cells represents the order in which the process is arranged to execute the decode process on the frame contents of the corresponding packets. Also note that the whole queue is advantageously updated every 10 ms. Thus, at 10 ms intervals a decrement process goes accesses every cell in the queue 1431 and decrements the deadline numbers by one (1, representing 10 ms).

Every cell that has a deadline of zero or a negative number after the decrementing process, or upon arrival, is thrown away from the queue 1431. The output buffer to the decoder has the corresponding head-end entry left blank or zeroed out, whereupon the decoder performs its native response to the absent frame.

Thus, each cell A, B, C in the queue egr_sched_cell points to a packet that still needs to go through the decode process and provides the deadline for the packet.

In FIG. 15, note further that the structure 1413 egr_chnl_records may not have the deadlines in same order as ABC in queue 1431 egr_sched_cell of FIG. 16. When a data packet 1511 arrives in FIG. 15, the process first associates the packet with an empty cell 1541 (called N). The software process first assigns in cell 1541 a pointer 1545 to the data packet 1511 and thereafter the data packet 1511 need not be moved, and only the egress schedule list (queue 1431) cells of FIG. 16 are relinked as the process proceeds.

In FIGS. 15 and 17, note that the letter N does not necessarily indicate that the cell 1541 will become the last cell in the queue. Instead the cell 1541 is inserted in the following manner into the queue 1431 in a place ordinally established by its deadline value "3." Once the pointer 1545 has been established, the process reads, recovers or calculates the deadline value 3 from the packet 1511 and plugs the deadline value "3" into the middle place in the new cell 1541 as illustrated in FIG. 15. Next, the process goes to the egress schedule list queue 1431 egr_sched_cell of FIG. 16 to establish such a place (see FIG. 17) for the cell N 1541 in the queue 1431 (and thus indirectly for the packet as well) that the deadlines above will be shorter, and the deadlines below will be longer, thereby advantageously establishing, maintaining and updating list 1431 as an ordered list queue.

In FIG. 16 queue 1431 represents the cell scheduling list at a time before update with the latest cell, which is depicted in FIG. 17. The list 1751 is the egress scheduling list 1431 after having been updated with the Nth record 1541, except that cell 1541 has had its last ($3^{rd}$) word arranged to point to cell C in old list 1431, and record B of cell list 1431 has had its $3^{rd}$ word updated to point to the cell N just added. In the software the $3^{rd}$ word is called NEXT. The deadline of cell B is less than the deadline of the new cell N, so the new packet 1511 can wait longer than B, and when the deadline for the new cell N is hypothetically less than or equal to that of cell C then the new cell N is sandwiched in between cell B and cell C in the queue.

The process performs a linked sort according to any of several methods. In a one method, cells and packets are not moved in memory or other storage. Instead, the method simply updates the pointers to keep the list ordered as new packets arrive and corresponding new cells get added to the list. Further the method updates the NEXT pointers to drop old cells as packets get decoded or go past their deadline. An alternative method physically relocates data in storage under software control to keep it in a particular order. In a further alternative method, hardware or firmware accomplishes the reordering and maintenance of the queue. Lookup table maintenance routines in RAM on a DSP, various kinds of table sorts and other methods are also contemplated.

Basically, in various embodiments as the new packets come in they are entered into a deadline-order list, or cells corresponding to them are entered into a deadline-ordered queue, or they are otherwise reordered, maintained and processed, in a manner responsive to the order of their deadline information or otherwise as a function of their deadlines.

In FIG. 16, maintenance of the scheduling list 1431 involves two distinct processes. A first process decrements the time-to deadline in the queue by one, every time 10 ms passes. This first process is initiated by a 10 ms interrupt, and the first process goes through the queue following the NEXT pointers and decrementing every cell deadline entry by one. This is suitably performed either inside an interrupt routine or just following return from interrupt. The last pointer in the queue is NULL or zero.

In an alternative form of the queuing process for handling the last cell in the queue, a header has two pointers. One pointer points to the beginning cell of the queue, and the second pointer points to the last cell of the queue. The process traverses the queue following the NEXT pointers and also comparing each successive NEXT pointer with the second pointer in the header. When the NEXT pointer equals the second pointer in the header, then the last cell is processed, and the update process terminates.

As stated two paragraphs above, updating the queue involves two distinct processes. The second of the processes updates the queue by inclusion of a newly-arrived packet 1511 from which a deadline was extracted for block 1413 and puts the deadline into new cell N 1541. Thus, the second process includes the new cell into the scheduling queue 1431. The second process accomplished this by going through the queue comparing the deadline of new cell 1541 with the deadline of each cell A, B, C already on the list. The process suitably assumes that the list is already sorted in deadline order, and then writes into the NEXT field of the new cell 1541 only when the deadlines higher in the list are smaller than the deadline "3" in new cell 1541 and the deadlines lower in the list are greater than or equal to the deadline "3" in new cell 1541. In this way the new cell 1541 is "inserted" into the list 1431.

Note further that some deadlines will be equal for distinct packets, so that the order of these distinct packets or cells in a larger queue may not matter, and they are suitably listed together in the larger queue. Alternatively, and advantageously, layers of priority are introduced in addition to the deadline priority layer just described. For example, frame size is a next deadline priority layer. Long frame size is advantageously given a higher priority than shorter frame size, because losing a 40 ms frame is more serious than losing a 10 ms frame.

The identity of the caller (by company, by organizational position, telephone operator, by name, or by service feature such as call waiting) is suitably introduced as a third layer of priority, thereby to put the cell with deadline "3" in a position in the queue relative to other cells having the same deadline "3" in accordance with this third layer of priority. Thus, yet another set of permutations of the process can be used to the put the cells in a desired order.

The foregoing considerations suggest a rule, or further dimensions of ordering the queue 1431, in the part of the process that orders the queue in a second key of ordering.

All of the packets in the queue egr_sched_cell are assumed to be in the same channel.

Sometimes, the packets from the same channel arrive in the wrong order. This is handled by reordering according to UDP (Universal Datagram Protocol) sequence number in the header of the arriving packet of FIG. 7. If packets are coming out of order, then the process determines the (large) number of milliseconds for a very-early-arriving packet and creates a new cell 1541 that will be rather low in the queue. When a subsequent out-of-order packet comes later for this same channel, another new cell is created with a relatively short deadline pertaining to the out-of-order packet to which the cell corresponds, and that new cell is entered into the queue higher in the queue than the cell for the earlier-received very-early-arriving packet. Thus, the sequence number or time stamp of the arriving packet is used in computing the deadline.

Deadline Interval DI

Where a voice decoder has a FIFO ahead, the process determines the hard real time to deadline, also called "deadline interval", DI herein, which includes the processing execution time E required. For an arriving packet N the deadline interval $DI_N$ is the difference between arrival time A and the deadline instant $D_N$ by which the particular channel must receive new data or suffer a frame of silence. If a packet has plural frames with different deadlines, the deadline interval DI is computed for each frame from time "NOW" to its respective deadline. As time elapses DI decreases, as the "NOW" approaches deadline D.

The formula for computing deadline interval DI in the scheduler often need not be revised if there is an egress buffer (called Egress Buffer 181 in FIG. 1 and Egress Channel Buffer 181 in FIG. 9) following the voice decoder. However, some embodiments do make the sample FIFO run asynchronously to the decoder, or insertion of very late out of order packets into the sample FIFO then the deadline interval DI should be computed relative to deadline instant for sample FIFO output and not relative to the deadline instant for frame output from the egress packet queue that feeds the decoder in FIGS. 1 and 9 (and called channel buffer 1175 in FIG. 11).

A recursive first procedure for computing the cell deadline entry D for new cell j 1541 is given as:

$DI_j = A - [$(Deadline D entered in queue for packet with highest sequence number Si for given channel C)+(Frame size F for process being used in egress channel C).times.(Sj−Si−1)$]$ where Sj is the sequence number of the out-of-order packet.

$DI_j = A_j - (T_0 + (i-1)F) - (Sj - Si - 1)F$ as further described below.

This first procedure depends on calculating deadline D for an original first packet when no cell has yet been established in the queue. Thus, the deadline D for that original first arriving packet is computed as the time when the decoder is first ready to accept that first packet minus the time of arrival A of that first packet. The deadline for each subsequently arriving packet is then computed from the formula. Note further that if the first packet was out of order, then the lower sequence number of a later-arriving in-order packet will produce a negative number for (Sj−Si−1) and thus may cause one or a few packets to be (acceptably) lost by virtue of passing their deadlines at the beginning of the transmission. This first procedure, being recursive, works well when the process of maintaining the queue has high reliability and low error rate. Error checking and redundant storage in the queue keeps errors low.

A second procedure for computing the deadline provides a storage location for the time To when the decoder was first ready to accept the first packet, and then continually increments that storage location with the frame size F in 10 ms units. For the ith packet, the decoder will be ready to accept that packet i at a time $T = T_0 + (i-1)F$. The deadline interval $DI_i$ is the latest packet time of arrival $A_i$ less the decoder-ready time $D_i$. Be careful not to confuse deadline interval $DI_i$ with deadline instant $D_i$. Thus, $DI_i = A_i - D_i$. In this second procedure, the formula for the cell deadline interval entry is $DI_i = A_i - (T_0 + (i-1)F$ This second procedure works well when there is substantial coherence or synchrony between the clock that produces the incrementing on indices i and j, and the clock that produces the sequence numbers S.

A third procedure uses both the first and second procedures, with error checking, for high even higher reliability when desired.

Further the process drops packets that remain beyond their deadline as decremented. There is no point in processing such packets, and they may be discarded. Assume the process waits for the out-of-order packet. There is a moment in time in which the packet can be lost. If the packet is lost, the decrementing process in the queue determines when it is lost. When the time has passed for the lost packet to arrive, and it is still not there, then the time has come for the decoder to put out blanks or noise into the audio stream, or otherwise do what the decoder is established to do reconstruct or otherwise handle lost packets.

In a first approach to handling out-of-order packets, the process detects sequence number (tag, time stamp, etc.) and channel number in the header of arriving packet 1511. The process goes through the process as described above; however, the out-of-order packet to be decoded has a deadline in the channel record 1413 equal to the deadline interval ("3") plus the frame size number ("4") multiplied by the number of missing sequence numbers. So, if the out-of-order packet has one currently-missing packet in between the out-of-order packet and the most recently previously received packet in the same channel, then the deadline number is entered to the queue 1431 as a cell with deadline revised to be 3+1.times.4=7. Thus, in a system with a sorted queue and known frame length for a given process, this process confers an elegant and advantageous solution.

In a second approach, a separate storage area holds the out-of-order packet (e.g., in a stack) until the next in-order sequence numbered packet does in fact arrive. The in-order packet is issued a new cell 1541 and new cell 1541 is entered into the queue 1431. Subsequently, the out-of-order packet in the separate storage area is then issued its own new cell, and that new cell is additionally entered into the queue.

One form of the process insures that additional packet will not be placed, the data coming from the coding on the extra packet, will be placed into the data stream remembering the 40 ms break. When a packet is out of order, the process not only adds 4 units in block 1413 but also schedules in the cell in the queue 1431 so that when the data is put into the decoder buffer, e.g., 1175.*c*, the data is placed farther back at position 1291, leaving one or more positions 1293 empty. The number of empty positions 1293 are equal in number to the quantity (Sj−Si−1).

In FIG. 1, an ingress buffer 121 is storage for at least two frames in order to have a complete frame of digitized voice 1111 to process by encoder 131, say 40 ms of data on the ingress side. The data is arriving and eventually the ingress side collects 40 ms of data. Then the system schedules the ingress process for encoding that 40 ms into a packet to be sent out. In the meantime, the system has space in ingress buffer 121 for a second frame because the data is coming in continually. Also, more than two frames are suitably used, but at least one buffer space has a frame being processed by the encoder 131, while one or more buffer spaces in ingress buffer 121 are provided for further data 1111 coming in.

For the ingress output buffers called ingress packet queue 141, storage for at least two frames is provided. When there is no jitter, two frames would be sufficient. When jitter and even out-of-order packets are present, buffer space for more than two frames is advantageous.

Turning to egress, note that in a multi-processor system, 10, 20, 30 and 40 ms. frames are supplied to the egress packet queue 151, so that the different length frames in the payloads of different packets from packetizer/depacketizer 161 are decoded by different decoding processes collectively called Decode 171. Buffer size at least as much in duration to the least common multiple (LCM) of the frame sizes in milliseconds is suitably used, e.g. 120 milliseconds of buffering or more.

Further in a multi-channel system 1101, frames for numerous channels are being continually received, and the device or system and process of operation are suitably arranged to process all the channels concurrently. Note further that even when the decode process is not identified in the data packets 1125, the decode process (e.g., G.723) is ordinarily identified in the channel data initially sent in signaling packets from sending computer 1101 when a particular call or connection is initially opened (see the ALGORITHM entry in block 1413 of FIG. 15). The channel data is then stored in computer 1151 in the egress channel record 1413, which includes an entry number that identifies which one (e.g., G.723) of several decode processes prestored in computer 1151 shall be executed by computer 1151 to decode the current call in that particular channel.

In FIG. 18, in a more complex sorting process, the deadline queue 1431 is augmented with an additional key that takes into account the amount of time that the decoder takes to work.

Once the list is sorted in order of time until deadline, then the different frames are destined for different decoders one 40 ms, another 30 ms, 20 ms. The FIG. 12 process decides which frame to issue next to the decoder in a single DSP embodiment wherein only one decoder is invoked and executing at a time.

Scenario #1: At the bottom of the link list queue 1431, suppose a cell has a deadline entry of 10 ms intended for a 20 ms decoder and higher in the queue is a cell with a deadline entry of 10 ms is destined for a 30 ms decoder.

Scenario #2: At the bottom of the link list queue 1431, a cell has a deadline entry of 30 ms intended for a 10 ms decoder and higher in the queue is a cell with a deadline entry of 10 ms is destined for a 30 ms decoder.

Scenario #3: At the bottom of the link list queue 1431, a cell has a deadline entry of 30 ms intended for a 10 ms decoder and higher in the queue is a cell with a deadline entry of 10 ms is destined for a 40 ms decoder.

As the process sorts, the last arriving packet is the last in a given group. If the new cell 1541 corresponding to packet 1511 has deadline 3, new cell 1541 is situated or defaults in queue 1431 at the very bottom of the group of cells having deadline 3 in queue 1431 but just above and before the first cell, if any, having deadline 4 in queue 1431. The process knows which decoder to call because each packet 1653 in FIG. 16 to which the first cell byte pkt_addr points, contains channel information, and block 1413 contains the process information whether obtained directly or indirectly from the data structures.

Return to the link list 1431. The link list update process orders the packets in order of deadline interval DI. Logically those packets should be executed first which have deadline intervals in the last 10 milliseconds before deadline. So the first to executed are the ones (all records which DI=1), the next are the twos (all records DI=2), the next are the threes (DI=3), etc.

In FIG. 18, a scheduling embodiment has actual separately maintained queues for 10, 20, 30, 40 and more, milliseconds, respectively. That way, searching and sorting the queues is faster than for one large queue made of all the separate queues combined, but the ordering principle is suitably made the same either way. Primary sort key is the deadline interval DI. Secondary sort keys contemplated herein are 1) identity of sender, 2) frame length for given process (wherein processing 40 ms frame is more important than 10 ms frame). In the 10 ms group, entries in number for up to the number of channels. These items are sent to decoder in order of priority.

If the number of microseconds (e.g. 423) needed to do an egress task were underestimated, then all that would happen is that the system would lose a few packets down deep in the 10 ms queue because at that point the maintenance would decrement all the time intervals and throw away everything that had not been processed in the 10 ms queue. If the decoder were slower in its operation than what it was being asked to do to process the full number N of channels, then an N-channel system would not be there in the first place.

Queues can be provided for every channel, then load up the queue with two or three packets before the process commences in FIGS. 1, 9, 11 and 14. Given 32 channel queues software provides a link list for each channel respectively. Another way, puts all the channels into one queue link list. In FIG. 18, a third way provides separate link lists for 0-10 ms, 10-20 ms, 20-30 ms, 30+ms.

Synchronous and Asynchronous Decoders

In a multiple DSP embodiment, or multiple data path embodiment, then more than one decoder can be simultaneously executing. In one subtype of the multiple data path embodiments, the channel decoders all begin on a 10 ms boundary. This is called synchronous.

Yet a further embodiment has asynchronous channels wherein the channel decode does not start on a 10 ms boundary even though the GCD of the frames is 10 ms. Running the channels asynchronously provides advantages of software management of the decode processes. Here, the deadline entries in the cells are suitably provided in more granular fashion (e.g. numbers pertaining to 5 ms, 1 ms, or a fraction of 1 ms in various versions), and still represent the time remaining until the frame is needed by its respective decode process. What is different is that the respective decode processes do not all begin on the same GCD time boundary. Thus, the channels could be synchronized on 1 ms, or say a 125 usec boundary in which the channel decode starts, for which deadline numbers are provided with higher resolution. Thus, the GCD 10 ms approach is not required, but does provide one group of elegant embodiments.

Foreground processing does not disturb the background processing thus advantageously a fine degree of isolation. Transfer from incoming packet all the way to the queue 1431 either operates on a high priority level.

Foreground processes are higher priority processes such as those that are initiated by an interrupt. For example, host 1115 writes a packet to memory by stealing computer cycles and sending an interrupt to the DSP C6201. (Alternatively, the DSP polls for a host write to determine when the host write is occurring.) Everything stops for the foreground process. At the same time, the main process calls the interrupt routine, stops the main process while the interrupt routine runs, and then processing returns from interrupt to resume the main process. The interrupt routine is written to take a relatively short time to execute, and this is called foreground processing when it has a higher priority for processor resources as opposed to the main process in the background.

Host updates egr_chnl_rec records including channel record 1413 by one process. Another process adds new cells 1541 to queue 1431. A further process decrements the queue cell deadlines. A still further process throws away cells and packets that have gone past their deadline. Yet another process issues packets based on the highest queue cells to the decoder process, which is still another process. Numerous choices are available to the real-time processing engineer skilled worker—for example, what interrupts shall be host interrupts, which shall be clock interrupts, what hierarchy of interrupt priorities shall be, what processes shall run in the foreground and background, and what routines shall take how long relative to one another. Many alternative process, device and system embodiments result from these choices, and it is unnecessary to belabor the explanation of these alternative embodiments further.

In FIGS. 14-17 when the packet arrives, the whole process of looking up channel data and updating queue 1431 could all be done at the same time. However, if the interrupt breaks the normal sequence, just as the top cell of the queue 1431 is being taken off to feed a decode process, then a frame might be lost. To avoid this problem, the process of taking off the top cell of the queue 1431 also includes a step of disabling or masking interrupts. Also, the interrupt routines are kept advantageously short. In this way, conflicts between different processes are made negligible. Also, when the link list is being updated and pointer values are being changed, the link list might be broken if an interrupt routine intervenes just then. Assign the pointer so the list is not broken, and then move the pointer down, and this part of the process is done, and the element is free—in this way list integrity is preserved. Notice this is a good reason for making the process short, so that a cell can be detached with just two or three program statements. If there were too many statements, it might otherwise be necessary to disable the interrupts which desirably is avoided for the most part.

Maintenance of queue 1431 by decrementing deadlines every 10 ms is suitably triggered by a 10 ms clock interrupt from the DMA (direct memory access) hardware. The DMA is programmed for the ingress side to continually put data from a T1 line (1.544 Mbps telephony communications line) into the buffer or buffers. The egress side DMA takes the data from the buffer on a continuous basis and puts the data on a T1 line going out of the system. Every 80 samples is just interrupt. Notice the DMA is running by cycle stealing, and the interrupt can take place while the DMA is still running.

Figure 19:
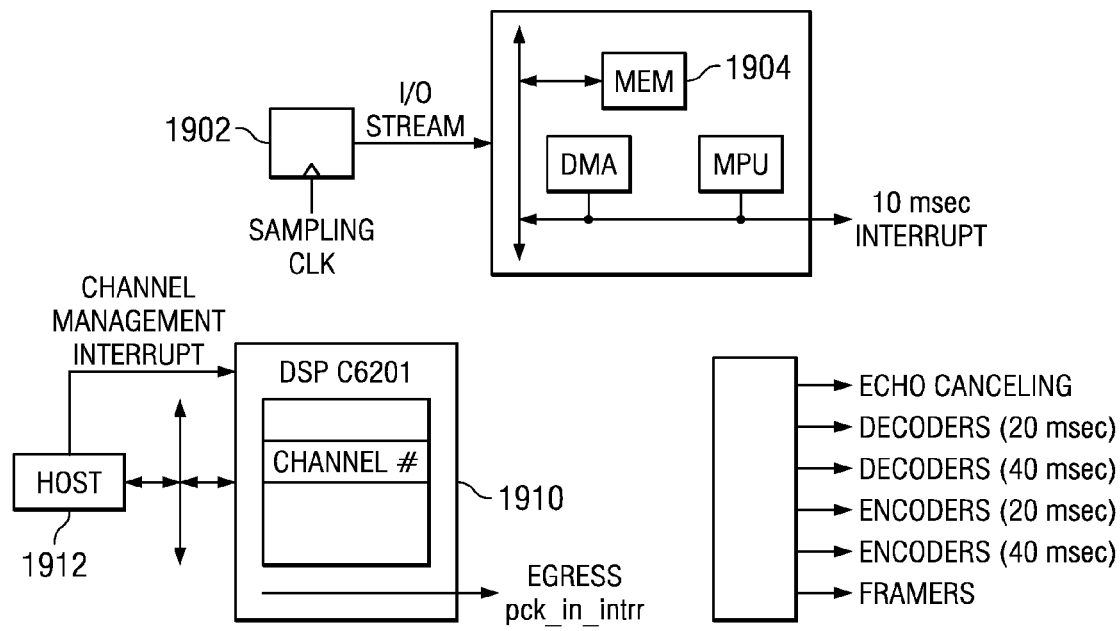
FIG. 19 is a block diagram of an inventive system emphasizing interrupt structures.

In FIG. 19, cycle stealing is a process which allows the system to run two blocks at the same time, such as the microprocessor MPU and DMA working off the same memory MEM which MPU and DMA share on the same bus. The processor does arithmetic while DMA uses the bus to talk to MEM, and then MPU accesses MEM while DMA is inactive. The bus has address lines, data lines, and control lines. Without DMA, MPU has every bus cycle available to it. When DMA needs a bus cycle to read or to write to MEM, then DMA pulls one of the control lines to deny the bus one cycle to the processor. Cycle stealing is this process, and is performed by hardware.

Keyboard entries by user are important but few and far between compared to the data processing tasks of the MPU. Keyboard triggers I/O in the foreground, while background heavy duty calculations proceed, which can be interrupted without any problem.

Independently, a process called Updating queue 1431 adds each new cell 1541. The updating process is initiated by host interrupt responsive to reception of a new packet.

Figure 20:
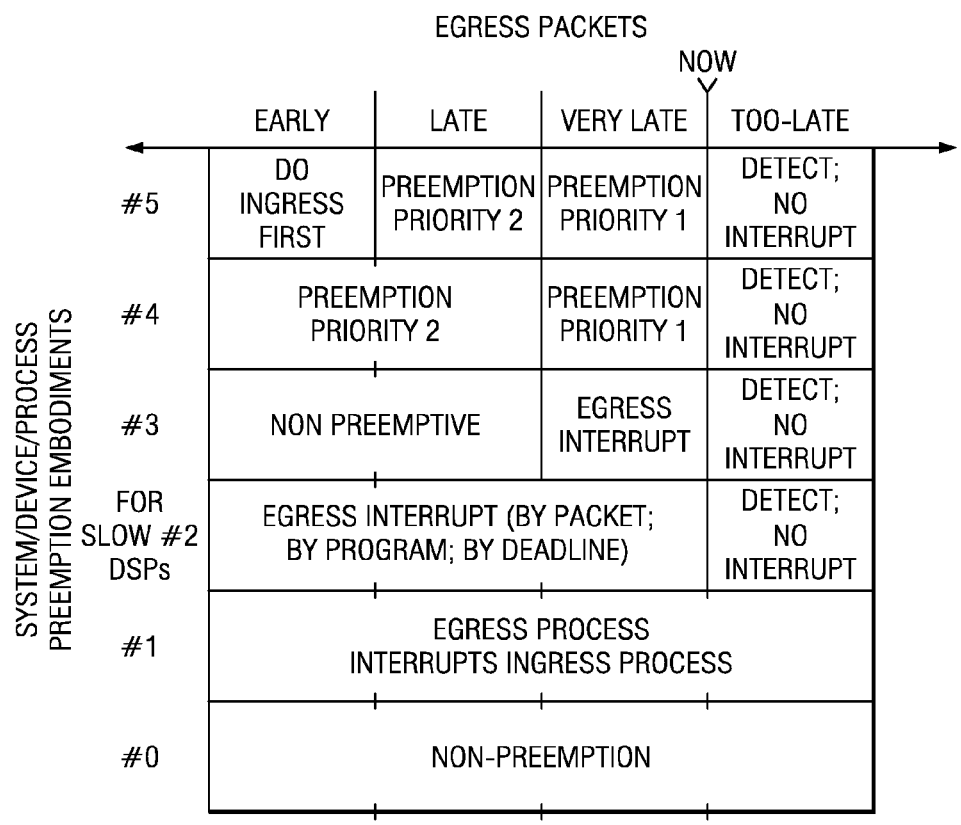
FIG. 20 is a chart of inventive embodiments according to interrupt or preemption policies wherein different embodiment types are represented on different rows, and handling of differently timed packets is grouped in columns according to time of arrival of a packet.

FIGS. 19 and 20 show the interrupt signals, their priority and what signals go to what interrupts in FIG. 15-17. The processor is suitably interrupted by a 10 ms interrupt and an arriving-packet interrupt pck_in_intrr.

In FIG. 19, a sampling clock 1902 to an I/O stream DMA takes the data from 24 voice channels into a twisted pair T1 line of USA. Europe has a 32-channel E1 standard. The system takes the I/O data and puts it into memory 1904. DMA clock produces the 10 ms (80 samples, 8 KHz standard telephony sampling rate) sampling clock.

In FIG. 19, the second priority channel management interrupt occurs when there is a boundary between the DSP processor 1910 and the host 1912. The host 1912 is the control of the packets with headers across the boundary between host and DSP. In the case of this example, the boundary is the PCI bus, to which the DSP TMS320C 6201 is connected. The packet header has channel number, and an optional UDI tag or sequence number.

In FIG. 19 egress packet interrupt completes the interrupt set of the example. The egress packet interrupt creates a secondary queue 1561, FIG. 15, using cell 1541. All the FIGS. 15-17 actions take place, the deadline is looked up in record 1413, and the cell 1541 is put into the scheduling list queue 1431 in the order specified by the a particular ordering process embodiment such as deadline ordering with or without further priority layers, as described hereinabove.

If during a certain period of time, the packet interrupt occurs, then a secondary queue 1561 is created. Advantageously, this process sets up a secondary queue which exists only during the time when the frame task is processed. The secondary queue 1561 in FIG. 15 has a cell 1565 pointing to a data packet 1567. The secondary queue 1561 is identical in structure to queue 1431 by virtue of being a queue, but notice that during this time no deadline lookup on block 1413 has been made, and no scheduling has occurred. Thus, secondary queue 1561 process embodiment is not identical to data structure 1751 wherein in 1751 a new cell N has been added in deadline order by updating.

While some embodiment processes do not use the secondary queue, the secondary queue approach does provide an elegant solution with its own advantages, the reasoning for which is described here. When the packet interrupt happens, the process desirably receives the packet, and could be designed to directly embark on the update process that produces an updated queue. One update process might disable interrupts, then update the queue, then re-enable interrupts. This approach is feasible, but has an elegant alternative.

In such alternative, the secondary queue process does very little at first by just linking, concatenating or hanging the new cell 1565 onto the bottom of a copy of queue 1431, to produce secondary queue 1561, so as not to disturb queue 1431 itself. Then the process runs an interruptible process on the list, even though the linkages are not yet in order, and operates on the list 1561 to put it in the desired order, whereupon the list 1561 is then substituted in one brief step for queue 1431 to establish queue 1751 by substitution for queue 1431 outright. In this way queue 1431 is updated to produce queue 1751 in a way that is not disrupted by interrupts and does not need to disable interrupts at any time.

Turning to the 10 ms DMA interrupt and output to the decoder, this 10 ms interrupt sets the rhythm of the process, device and system and is higher priority than the egress packet interrupt. The process resets the boundary, schedules the ingress (which is outside this part of the discussion), and updates all of the egress deadlines. Now, the process checks whether a new egress packet flag is set. The interrupt signal sets the flag and leads to execution of the ISR for new packet to create new cell 1541.

In FIG. 15, re-linking egress packets is the name of the function moving the new packets in from one boundary to another, and updating queue 1431 is done at a high priority. This involves a secondary queue 1561 to which only the ISR has access. Queue 1431 is suitably removed from the domain of the ISR (Interrupt Service Routine) and is never touched except when interrupts are disabled, and then new packets can be added using secondary queue 1561 without affecting the rest of the system.

Implementation of a De-Skewing Buffer

Let the jitter protection be 29 msec (which is equivalent to 232 samples).

The anti jitter works in the following way: at the beginning of the process (new call) collect 29 msec output data before starting the actual outputting.

Let
&data_in be the address where new data from transformed packets is being placed
&data_out be the address from where data is output,
&buffer be the start address of the buffer
Initially
&data_in=&buffer;
&data_out=&buffer;
The process begins at $T_0$. At $T_{0+29}$, after accumulating 29 msec worth of data
&data_in=&buffer+(8.times.29);

On the next sample clock data needs to begin to be output from the address
&data_out Eliminate the $T_{0+29}$ synchronization by noticing that there is no difference between 29 msec of 'active' silence, as opposed to 29 msec of silence. Let the initial 29 msec of the buffer be cleared, and do following initial assignments:
&data_out=&buffer;
&data_in =&buffer+(8×29)
At $T_0$ concurrently with the first sample being placed at
&data_in
output from
&data_out.

Thus the real data_out is 29 msec delayed in relation to data_in as required, except that the first 29 msec being outputted is an 'active silence'.

This solution, so clear for the 'trickling in' data, creates its own twist for data arriving in packets, and therefore in the output buffer, arriving in whole in frames. If the frame is 30 msec long, then at the time of its appearance there is 29+30=59 msec delay, and not just 29 as might have been expected. Thus, for 30 msec frames there is not only built in 30 msec delay but also 30 msec delay protection is advantageously provided.

The buffer works as follows. Assume for a while, that the data trickles into the output buffer one sample at a time. The process is dynamic. Samples are being outputted at a constant rate, while they arrive in a variable rate. Notice that the system creates a reservoir of samples worth 29 msec. This is the amount of time any one sample can be late without disturbing the periodicity, the constant rate of the output process.

Missing the Deadline

If a sample does not make the 29 msec deadline, something has to be done in its place, because the passage of time will not wait. Suitably a null sample or the last sample is sent in its place, and the sample is thrown away.

Packet Missing the Deadline

Note that in a realistic system it would be the whole packet that would miss the deadline.

One could try to play a catch up game in the case when the packet is ready to be placed in the buffer while only a few samples missed the deadline. It is believed that the benefit of trying to do the "catch up" (instead of throwing the packet away) may substantially increase the complexity. If it should be considered at all, it would be after the simpler strategy is up and running.

Thus, for practical reasons, the packet which missed "the first sample in the packet" deadline is replaced in its entirety with equivalent amount of null output samples.

Arriving Too Early

Within the limits of the available size of the buffer there is no problem caused by early arrival. Next consider how much buffering is needed and what happens if the system runs out of space after all. The 'too early' problem appears to be more complex than the 'too late' one.

Assume data trickling into the output buffer, one sample at a time, and that 59 msec of extra buffer space is available for early arrivals.

In a real world system there is nothing that is really too "early". Whatever packets are arriving must have been generated after the voice signal had occurred.

Thus, if the "too early:" buffer is about to overflow ($C_{ov}$), (that is if 59 msec of "early" data have accumulated), in reality the system is delaying the output by 29+59=88 msec.

First, assume that a considered choice was made as to the sizes of the two buffers—the "too late" and the "too early" one. If an overflow of the "too early" buffer is occurring, it means that there was a poor choice of the moment in time that was designed To—the very first time when the system started to output the data. This can happen as discussed next.

Create the $T_o$ moment out of available information. Assume that the very first packet arrived with considerable delay. If the arrival time of the first packet has been used as the reference point, most everything afterwards will appear as being too early.

An advantageous solution detects the overflow condition $C_{ov}$ and thereupon shifts forward the output pointer to skip some of the data ready to be outputted and adjusts the "amount of data ready to be output." Let the skip_count=7.times.8;/*7 msec*/
Then
data_out+=skip_count;/* moving the pointer toward fresher data */free_space_in_buffer+=skip_count;

In the FIFO model, the system just pushed off 7 msec worth of data. In the RAM, the above operations are in modulo [buffer_size] arithmetic.

This operation moves 'forward' the process by 7 msec. In other words 7 msec of data is skipped. This is something that should not happen more than twice. If it does, a better knowledge of the network is needed to make better estimates of the "too late" and the "too early" buffer sizes.

Note that skipping 7 msec worth of voice data has a little effect on the actual voice, but can have serious effect on modem data, particularly at high Baud rates. Thus the use of the process should be observed. It appears past the first second or two, review of what is said in the previous paragraph is needed.

Packet by Packet Jitter

Assume that the data appears in the output buffer one 30 msec frame at a time. Thus the average arrival of frames is 30 msec.

Assume that the very first frame arrived, and that the system started to output the data right away. The next frame must arrive within 30 msec. The possibility of jitter remains to be attended to.

Assume that the frame arrived, and the system waited 29 msec before starting to output the data. 20 msec is allowed for the jitter delay, and real 59 msec output delay.

If the packet cannot arrive early, but only late, then the system suitably uses just 60 msec worth of buffers.

If a frame can arrive early, the 60 msec worth of buffers, with the 29 msec pick-off point provides 29 msec delay protection, and 31 msec early arrival protection.

A first embodiment establishes 60 msec buffers, and sets the initial read-off delay to 10 msec, allowing to test for other values specifically 30 msec.

In FIG. 11, for example, a 3G cell phone/IP-phone suitably has a packet speech decoder in the phone and an IP stack in the phone, and the first-packet improvement buffering 1177 is introduced to ameliorate the sensitivity of the phone to accidents in arrival delay of the very first packet in its channel and to reduce incidence of lost packet impact on QoS due to late-arriving subsequent packets.

With one source, packet arrival time is plotted. Each packet, as it arrives, contains 80 samples. A phase lock loop enhances clock recovery to reconstitute clock for resampling at the receiver, because of clock discrepancies in a big network.

Preemption Embodiments

Note that in a telephone conversation, or videoconferencing exchange, there are two channels: egress (decode) and ingress (encode). It is important to determine which packets to process first: egress packet or ingress packet. When the packets arrive in sequence, preemptive processing suitably gives priority to the egress channel. In a conventional cellular phone, processing is preoccupied by the ingress processing to compress and send the stream. But in a VoP/VoIP phone, suddenly a late packet arrives to the egress process. As improved herein, the process knows the packet is late because it has a deadline interval measuring process. Further, the improved process preempts (interrupts) the system to allow the egress packet to go to decode in time.

Preemption means that there is one processor executing frame task A. Suddenly, in the foreground, a higher task B becomes available. Frame task A is interrupted, saved away, and frame task B is executed instead. At completion of frame task B, frame task A returns unless another higher priority task intervenes. When there is no egress work to do, the processor is occupied with ingress packets. When an egress packet arrives it preempts the ingress process, and the egress process on that packet runs to completion.

In FIG. 20 various preemptive embodiments, #1, #2, #3, #4 and #5, the egress packets have priority and they preempt the processor, and if egress packets accumulate they simply wait in turn until they are processed. Note, however, in least complex embodiment #1 in which the execution is simply in order of arrival, unneeded too-late packets (far right column) may be processed at the expense of not-too-late packets that are waiting but are merely Early, Late or Very Late.

Accordingly, FIG. 20 depicts another advantageous preemption embodiment #2. Each individual egress packet is analyzed for degree of lateness, and possibility of recovery by preempting system operation in favor of egress processing just in time before the deadline expires (thus ignoring Too-Late packets in FIG. 20). BIOS™ real time operating system (RTOS) for DSP provides a small real-time kernel which is a very slimmed down form of a real time operating system (not to be confused with a Bios in a PC ROM). BIOS™ RTOS has an I/O capability and a preemption of a very specific type. Once a task is assigned a priority level, the priority is essentially fixed unless the system is redesigned using a configuration tool. Each task is assigned its own single stack holding area so that storage is hierarchical.

In this embodiment #2 BIOS™ RTOS is combined as a wrapper with the ingress/egress processing. Using BIOS™ RTOS (1K of code) to organize the scheduling, gaining information about the packet, and preempting the system for egress, saves about-to-be-lost packets. The arriving packet runs a routine under BIOS™ to determine whether preemption is necessary (packet is Early, Late or Very Late, but not Too Late in FIG. 20), and then preempts to save packets.

Another process embodiment features fine resolution when all the channels are out of sync. The fine resolution orders the link lists according to exact amount of time to deadline if all the decoder processes are running out of sync with one another. The process records and updates a set of different deadline times for each decoder process running on the system to compute the deadline interval when the decoder processes run out of sync with each other (i.e., 10 millisecond intervals in each decoder are staggered and thus end at different instants). In this way, the sequence queue 1431 still advantageously keeps track of DI of packets from channel to channel since DI is properly calculated for each based on the deadline instant respective to that channel decode process. This fine resolution process is suitably combined with any of the processes of FIG. 20.

Suppose all frame tasks are 20 milliseconds, with 500 microseconds processing time in the decoder and 32 channels. The time needed to process the channels contends or interferes with the need to process late-arriving new packets.

In FIG. 20, preemption embodiment #2 advantageously utilizes relatively slow, less expensive DSP processors for processing many channels. This embodiment features limited use of preemption for very late packets in a slow system, say using one or more C54x DSPs in a line card for four channels. For four channels, while the basic time per process is the same, the amount of time allotted for the process for slower processors would be not 500 microseconds but three (3) to five (5) milliseconds (ten times as much). In that case, the preemption becomes more important. The egress packets have priority, and they are still ordered according to the time interval remaining to deadline, but simply all of them have priority over the ingress packet. Thus egress is not random but ordered according the need for the egress packets to be executed or processed. This embodiment is particularly advantageous for smaller inexpensive systems in which case the preemptive BIOS™ RTOS is suitably used.

In embodiment #3 of FIG. 20, organize processing with egress packets still organized according to priority and still deal with emergent situations but preempt any ingress packet when any egress packet is available to be processed in the last 10 millisecond period (Very Late category only). The Late packets (20 milliseconds) and Early packets (30 milliseconds or more) are not used to preempt, and non-preemptive processing is used to handle these Late and Early packets.

FIG. 20 embodiment #4 advantageously uses preemption to process Very Late packets at a higher interrupt priority than Late and Early packets (priority 2).

FIG. 20 embodiment #5 is described in detail in connection with FIGS. 4 and 31.

Preemptively Handling "Very Late" Packets

Before reading FIGS. 21-25, consider the processing limit (vertical dotted line in FIG. 12). This limit becomes crucial to saving a Very Late packet N from being lost. Even 500 microseconds of decode execution time $E_M$ (for an Mth packet in decode) is important here. Suppose a Very Late (FIG. 20) egress frame N arrives with $DI_N$ only 600 microseconds of life left and soon risks being thrown away regardless of the sequence queue processing. Further assume that decode processing execute time $E_N$ for this packet frame requires 200 microseconds, leaving less time (600−200=400, which is less than $E_M$=500) than the total execute time $E_M$ of 500 microseconds for a decode in progress for another channel, say. This amounts to a preemption decision criterion $DI_N - E_N > E_M$ (or $E_M + E_N < DI_N$) which is still further refined below. Preemption of the egress processing in the other channel can save the day by task preemption (FIG. 20 embodiments #3, #4 and #5) when the actual time T needed to complete the egress decode processing in progress is sufficiently advanced as described next.

Interrupt computation time is suitably also taken into account in the calculations in some embodiments, so that if processing the interrupt will occupy enough time that there is no point in handling a Very Late packet, the interrupt is not taken or is aborted.

Note that egress processing in the other channel may be at an intermediate point. The full 500 microseconds may not be needed to complete the egress processing of that channel because some time T=400 has elapsed, and decode execution is some fraction of the way (say 80%) to its own completion of $E_M$=500 microseconds of processing. Thus, suppose only 100 microseconds are needed to complete the decode in progress. Then the very late packet in the waiting channel has a chance to proceed, succeed in decode, and be saved from loss, since 100+200=300 which is less than the 600 microsecond deadline interval of the example. In other terms, $(E_M - T) + E_N < DI_M$. Implicit in these examples is the criterion in FIG. 20 that packet N is not Too Late, i.e., $DI_N - E_N > 0$. The deadline for the new packet N is sooner than the deadline for the packet M in decode. Otherwise the packet M decode would not be preempted in this embodiment. Since the longer time $DI_M$ to deadline is what is relevant for packet M, the preemption decision is written $D_M > E_M - T + E_N$. Thus, the processing in various ways can be designed (FIGS. 22, 23 and 24) to signal how many microseconds remain in the channel decode processing currently underway and preemption is based on the decision criterion ($DI_N - E_N > 0$ AND $DI_M - E_M + T - E_N > 0$).

These considerations lead to Embodiments #3, #4 and #5 of FIG. 20 that do special handling of Very Late packets (FIG. 20, third column). Here processing provides information back to the scheduler telling where the decode process currently is in its operations, thereby to make a decision to preempt or not to preempt or just to throw away the packet. Embodiments for keeping time on this very fine time scale are disclosed next in FIGS. 21, 22, 23, 24 and 25.

Figure 21:
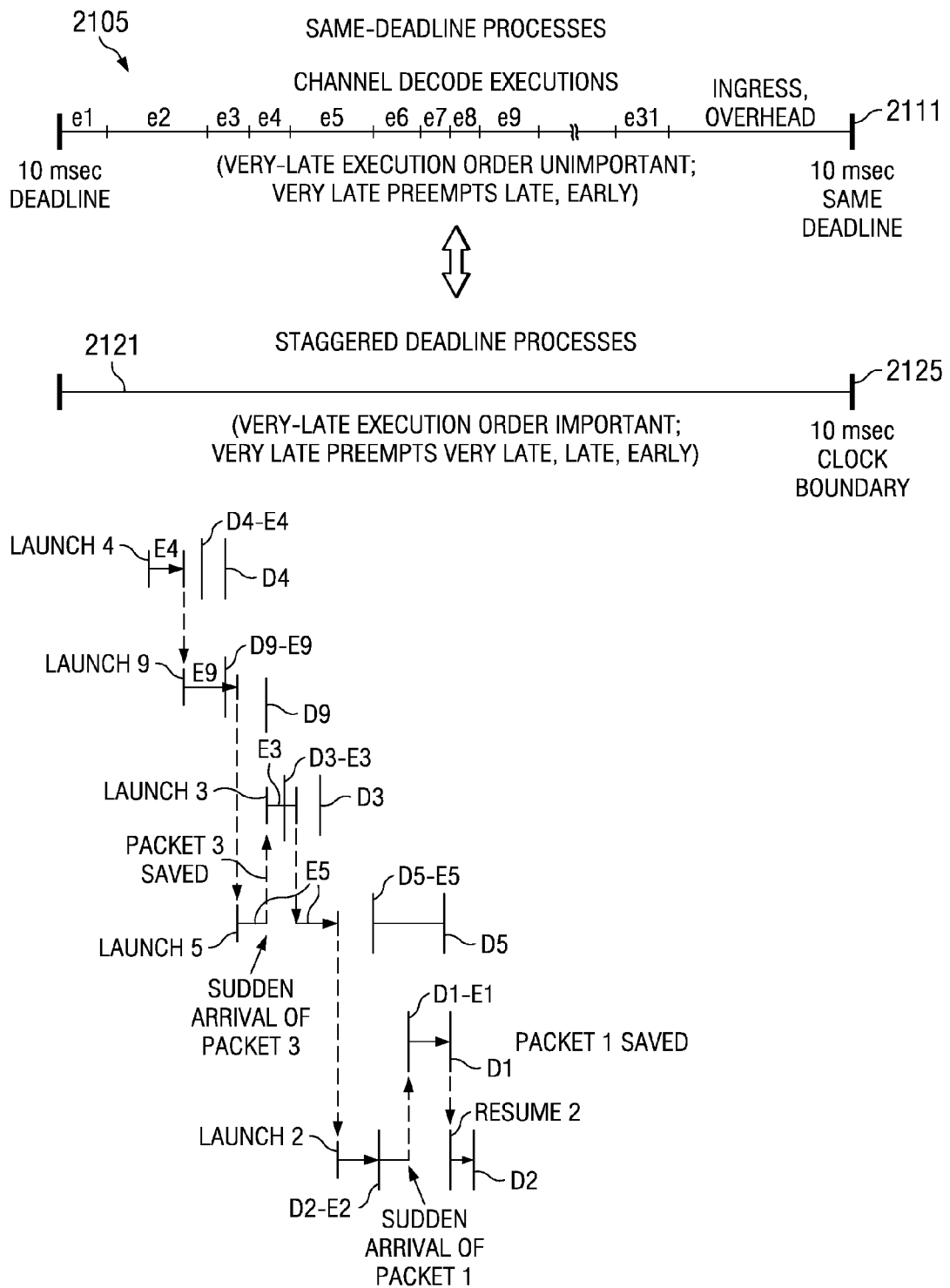
FIG. 21 is a comparative timing diagram of two categories of inventive processes—Same-Deadline processes and Staggered Deadline Processes, wherein an example of a Staggered Deadline process is spread vertically and horizontally in a lower part of FIG. 21.

FIG. 21 compares and contrasts channel decode processes of a Same-Deadline type and a Staggered Deadline type. At the top of FIG. 21, egress and ingress for all 32 channels are handled in a 10 (ten) millisecond window 2105 that extends from left to right across the page. All the channel decodes in the Same-Deadline channel decode process type need to be finished by an instant 2111 of the 10 millisecond Deadline. The execution order of various channel decode executions e1, e2, . . . e31 for the 32 channels is relatively unimportant. If a packet for a given channel, e.g., channel 7, has not arrived, then the channel 8 decode is performed. When the channel 7 packet does arrive, then it gets decoded, occupying execution interval e7. The ingress execution (Ingress Overhead interval) is suitably performed for the channels at beginning, at the end, or sometime in between, such as when not all channels have been decoded, and the system is waiting for more packets to arrive which have deadline 2111. Also, packets with a later deadline than deadline 2111 are suitably decoded, when there is time available for them. Also, such embodiment responds to very late arriving packets that do have deadline 2111 by preempting packets and packet decodes that have a later deadline than deadline 2111.

Compare now Staggered Deadline processes having their deadlines Di spaced along a 10 millisecond window 2121 having a clock boundary 2125. No longer does the clock boundary 2125 represent a single same deadline for all the 32 channels. Now, decode execution order for the various channels becomes important even for packets whose decode deadlines lie in the window 2121. Very-late execution order is important, and very late packets in some embodiments are made preempt other very late packets, as well as late and early packets, in order to reduce incidence of avoidable packet loss.

In FIG. 21 beneath window 2121, one example of the advantageously intelligent decode execution of packets in a Staggered Deadline process embodiment begins by recognizing the order of the deadlines Di in window 2121. For example, suppose the deadlines come in the order D4, D9, D3, D5, D1, D2 for illustratively six of the 32 channels. Packet 4 (meaning the channel 4 packet having deadline D4) is present, and the embodiment launches decode execution of packet 4, which occupies execution time interval E4 which completes not only ahead of the deadline D4, but coincidentally also prior to the instant D4−E4 when execution of packet 4 would have had to commence to save the packet 4 from loss.

Decode execution of packet 4 being completed, operations proceed to detect the presence of packet 9, which turns out to be present. The embodiment launches decode execution of packet 9, which occupies execution time interval E9 and completes ahead of the deadline D9, and interestingly after the instant D9-E9, the latest time packet 9 would have had to commence decode.

Decode execution of packet 9 being completed, operations proceed to a detection step to test for the presence of packet 3. However, the detection step determines that packet 3 has not arrived. Thereupon, operations test for presence of packet 5 which has the next most urgent deadline D5 after deadline D3. The detection step determines that packet 5 is present, and decode execution of packet 5 is launched (LAUNCH 5) quite significantly before its deadline D5.

Suddenly, packet 3 arrives very late. The embodiment responds to packet 3 by calculating that sufficient time exists to save packet 3, and therefore proceeds to preempt the now-underway decode execution of packet 5. Operations in FIG. 21 moving upward along the arrow PACKET 3 SAVED to LAUNCH 3 representing the operation of launching decode execution of packet 3. (Note that packet 5 decode is partially complete and these results are saved temporarily.) Decode execution of packet 3 occupies execution time interval E3 which successfully completes before deadline D3 and incidentally after the latest instant D3-E3 when packet 3 decode would have had to commence.

Decode execution of packet 3 being completed, operations do not need to proceed to the detection step to test for the presence of packet 5. Instead, operations RETURN to the point where decode execution of packet 5 was interrupted earlier, whereupon decode execution of packet expends the balance of execution interval E5, and completes decode not only ahead of deadline D5 but even ahead of instant D5-E5.

Decode execution of packet 5 being completed, operations proceed to the detection step to test for the presence of packet 1 which has the next-most-urgent deadline D1. However, the detection step determines that packet 1 has not arrived. Thereupon, operations test for presence of packet 2 which has the subsequently-next most urgent deadline D2 after deadline D1. The detection step determines that packet 2 is present, and decode execution of packet 2 is launched (LAUNCH 2) well before its deadline D5.

Suddenly, packet 1 arrives very late, see SUDDEN ARRIVAL OF PACKET 1. The embodiment responds to packet 1 by calculating that sufficient time exists to save packet 1, and therefore proceeds to preempt the now-underway decode execution of packet 2. Operations in FIG. 21 move upward along a vertical arrow to launch decode execution of packet 1 fortuitously just at the last instant D1-E1 available for packet 1 decode to commence. (Note that packet 2 decode is partially complete and these results are saved temporarily.) Decode execution of packet 1 occupies execution time interval E1 which successfully completes precisely at deadline D1 (PACKET 1 SAVED).

Operations now RETURN to the interrupted decode execution of packet 2 at the point RESUME 2, whereupon the balance of execution time interval E2 is expended, and whereupon decode of packet 2 successfully completes illustratively, fortuitously and precisely at deadline D2.

Figure 22:
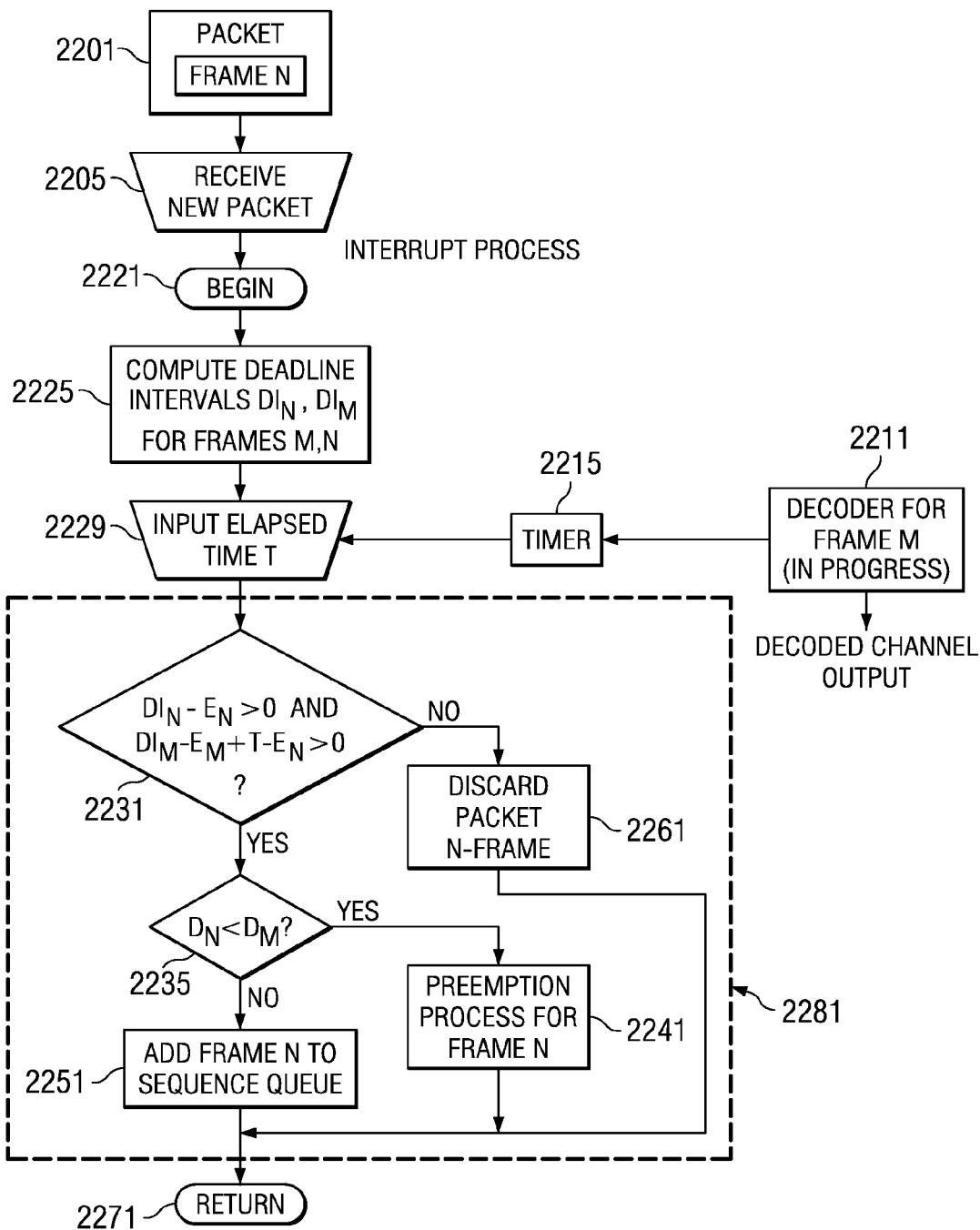
FIG. 22 is a flowchart of an inventive Staggered Deadline Process.
Figure 23:
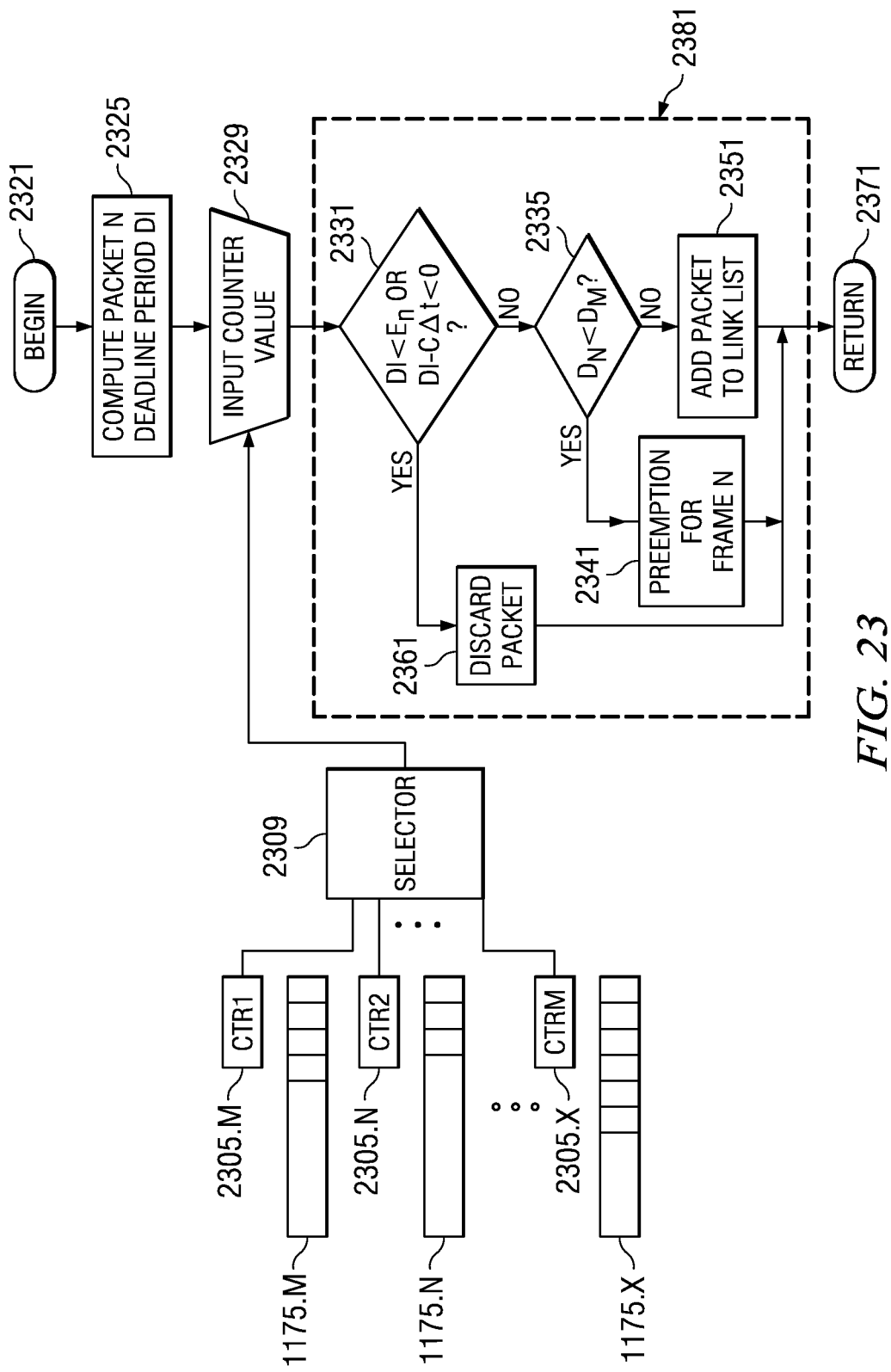
FIG. 23 is a flowchart of another inventive Staggered Deadline Process.

FIGS. 22, 23, and 24 illustrate three different embodiments for accomplishing interrupt (preemption) processes for saving packets as illustrated in FIG. 21. Where similarity or identity of function of blocks in FIGS. 22, 23, and 24 is disclosed, the last two digits of the numerals are made the same from Figure to Figure. To better comprehend each of the FIGS. 22, 23, 24, the reader is advised to study the descriptions of all of them, and compare and contrast with the last two digits of numerals in mind.

The skilled worker prepares any of a variety of embodiments to accomplish the functionality of FIG. 21 and the like, allocating process steps to foreground and background processing, or to main and preemption or interrupt processing in a manner effective to accomplish these functions and suggested in FIGS. 22, 23 and 24. Testing and debugging are, of course, inherent in the development process to effectuate the teachings herein.

In FIG. 22, a first process embodiment encounters arrival of a packet 2201 having Frame in channel N of decodable real-time information, and in a step 2205 receives, depacketizes, and enters the frame in channel N into an Egress Packet Queue of FIG. 9. Concurrently, a decoder process 2211 for a frame in different channel M is in progress to produce a Decoded Channel Output. The process provides a timer 2215 of elapsed time of the decoder process 2211, wherein the decoder process sets up the timer 2215, and sets the timer 2215 running.

Meanwhile, due to arrival of the new packet (see e.g. SUDDEN ARRIVAL OF PACKET 3 or 1 in FIG. 21), high priority interrupt process steps begin at BEGIN 2221. Next, a step 2225 computes Deadline Intervals DI for the frames in channels M and N. The interrupt task accesses the timer by input of Elapsed Time T in a step 2229.

A decision step 2231 determines whether there is enough time to execute both packets before their respective deadlines. (Compare with the part of FIG. 21 involving LAUNCH 3 and LAUNCH 5 wherein packet 3 is saved.) For channel N, e.g. channel 3, Deadline Interval DI less the decoder decode execution time EN required to decode a frame in that channel N is tested for greater than zero as a First Condition. For channel M, e.g. channel 5, Deadline Interval DI less the balance of decoder decode execution time required to finish decoding a frame in that channel M is computed less the time EN to be spent decoding channel N during the interrupt: as a Second Condition. The just-mentioned balance of decoder decode execution time required to finish decoding a frame in that channel M is EM minus Elapsed Time T. Thus, in the algebra the second condition becomes DIM−EM+T−EN>0.

In decision step 2231, if BOTH the First Condition and the Second Condition are true (YES), then operations proceed to a step 2235, to test whether the deadline for the channel N is less than (more urgent) than the deadline for the channel M decode in progress. If so, YES, then operations branch to a step 2241 to execute a preemption process for the frame in Channel N which decodes it and expends decode execution time EN. This branch corresponds to the FIG. 21 upward arrow PACKET 3 SAVED and action of LAUNCH 3.

In step 2235, if the result is NO, then operations proceed to a step 2251 to add Frame in Channel N to the Sequence Queue (egr_sched_list) as in FIG. 13 step 1215, and block 1431 of FIGS. 14 and 16. In other words, channel N is not as urgent as channel M decode.

In step 2231, if the result is NO (either or both of First Condition and Second Condition is not true), then operations branch to a step 2261, to discard the packet in Channel N. This packet is too late to be saved, or too late to be saved without losing already commenced decode in channel M. Thus, a packet triage is executed.

After any of the steps 2241, 2251 and 2261, operations pass to RETURN 2271, whereupon the decoder in step 2211 suitably resumes any interrupted operation therein.

In FIG. 23, another embodiment has egress buffers 1175.M, 1175.N, . . . 1175.X (compare FIG. 11) for depacketized data frames. The egress buffers 1175.M, 1175.N, . . . 1175.X are provided with respective counters 2305.M, 2305.N, . . . 2305.X arranged to hold counts representing or proportional to a number of bytes or words yet to process in the egress buffer 1175.i for each channel i. These counters 2305.M, 2305.N, . . . 2305.X are counting continually during the decode process and are advantageously used as timers as follows. If 320 words need to be processed in 500 microseconds, and the counter points to 180 words left, then elapsed time T is 250 microseconds (180/320, T=(320−C)/320 and C=180).

Thus, the embodiment of FIG. 23 advantageously provides an environment (in hardware, software or mixture thereof as skilled worker chooses) to make egress data counters meaningful in measuring time. If the system is arranged so that all deadlines for decode fall on the same set of 10 msec boundaries then preemption of Late packets by Very Late packets suffices to save Very Late packets. (The system is provided with sufficient processing power to process all Very Late packets even if all channels are active and so, the order of decode execution of the Very Late packets is less important). However, in other embodiments, the system has the deadlines for decode falling on different deadline instants other than just the 10 millisecond times. In such latter embodiments, one Very Late packet that has just arrived can and should be made to preempt another Very Late packet in decode execution because in such case the order of decode execution does matter to advantageously save the arriving Very Late Launch decode execution of the packets in order of their deadlines for launch ($D_i - E_i$) and preempt with suddenly arriving packets that are even closer to launch deadline. See FIGS. 21 and 23.

Further in FIG. 23 operations commence at BEGIN 2321 and proceed to a step 2325 to compute a deadline interval DI for a just-arrived packet in channel N corresponding to the egress buffers 1175.N. In the meantime a decode is taking place in a channel M, corresponding to the egress buffer 1175M. To begin a process of determining whether the decode in progress for channel M needs to be interrupted, a step 2329 inputs a counter value C in counter 2305.M. Next a step 2331 tests to determine whether the just-arrived packet must be triaged, by subtracting in a First Test from deadline interval DI for packet N the amount of time C delta-t needed to finish the rest of decoding in channel M. ("delta-t" is the amount of time each counter unit of C represents, thereby to put DI and C on same time units.) If the subtractive difference thus determined is less than zero, there is no time to spare from the decode in channel M in progress, whereupon operations branch to a step 2361 to discard the just-arrived packet of channel N. Also in step 2331, a Second Test determines whether deadline interval DI is less than the execution time EN needed to execute a decode for just-arrived packet in channel N. If either the First Test or Second Test is met (YES), then triage of the just-arrived channel N packet occurs by branch to the discard step 2361.

If in step 2331 neither the First Test nor Second Test is met (NO), then operations proceed to another decision step 2335 to test whether the deadline DN for the just-arrived packet is less (comes sooner) than the deadline DM for the packet in decode in channel M. If so, then operations branch to a step 2341 to initiate a high priority interrupt routine, to preempt the decode in channel M and execute a decode for the just arrived packet in channel N, whereupon RETURN 2371 is reached and decode in channel M resumes.

If the decision step 2335 determines that the deadline DM is earlier than the deadline DN for the just-arrived packet, then operations proceed to a step 2351 to add the just-arrived packet to link list of FIG. 16 whereupon it is advantageously decoded when its turn comes. Operations at each of steps 2351 and 2361 finally reach RETURN 2371.

A block of steps 2281 in FIG. 22 and a block of steps 2381 of FIG. 23, and a block of steps 2481 of FIG. 24 provide different alternatives which may be evaluated and interchanged with one another by the skilled worker in various embodiments.

FIG. 24 shows a layer of optimization for preemption in a VoP/VoIP process earlier designated in FIG. 20 as embodiment #3. Here egress is assigned a higher priority than ingress. If a very late egress packet arrives and its deadline is below a threshold amount, such as only 400 microseconds to go, then at that threshold a preemption process advantageously saves the packet from loss. The threshold amount is the length of time remaining to complete the task which is currently running on the system. The threshold amount will vary with identity of the particular task and thus be looked-up or signaled. The threshold amount varies and is calculable from the degree of completion of a particular task which has begun running according to information native to the task and for which a corresponding threshold calculation process is established according to this preemption embodiment.

In FIG. 24, the information is used in the calculation that determines whether the packet will be entered into the link list 1431 or not, i.e., just before the link list entry decision. Now in the process the process is divided into periods thereby to retain the nonpreemptive environment, waits until the break in the process occurs, and at that break time determines whether to open up the egress frame. During the break time, a control signal is passed back to a system control block for determination to schedule or drop a packet.

In FIG. 24 in measuring time with fine resolution, the arrival of encoded voice samples themselves which occupy 125 microseconds in sample period at 8 KHz rate, in itself constitutes a reliable clock. When using a fine resolution embodiment, use the very same clock contemplated there as a clock that provides the decode-elapsed time as well. The skilled worker thus makes the appropriate arrangements given the hardware being improved.

The FIG. 24 embodiment uses a voice decode process 2403 itself as a timer of its own progress through decode. If the decoder process 2403 has to process 160 samples of data, the process itself every 20 samples or so may be arranged to open itself up to be interrupted. At the same time, the process every 20 samples or so can set up a register 2414 and signal to it that it has reached 20, 40, 60, etc. samples. Then the register 2414 is accessed by a scheduler 2413 for that information stored therein for use in determining how to schedule packets, and whether to preempt. In this way, decode processes of a variety types exemplified by decode process 2403 are arranged to create signals which can be used for the advantages and new processes contemplated herein. In FIG. 24, operations commence with BEGIN 2405 and proceeds to a step 2407 to determine whether the next packet frame (e.g., in channel M) represents voice or silence. If voice (YES), then operations branch to the Decode Process 2403. There operations first initialize a register 2414 and then transfer and decode at a step 2409.1 illustratively 20 bits from a frame of voice (or media) data in an egress packet queue 1175.*i* of FIG. 11, or the Sequence Queue and Management block 1431 of FIGS. 14 and 16. After step 2409.1, a break process 2411.1 initiates a call to scheduler 2413 (shown as an oval above decode process 2403, and in more detail at the right in FIG. 24. Also, break process 2411.1 updates (either incrementing or decrementing methods suffice) a register 2414 so that the contents of register 2414 indicate a value proportional to or representative of the time elapsed into the decode execution of decode process 2403.

A quick pass through scheduler 2413 process steps at right in FIG. 24 takes care of any just-arrived packets, whereupon operations return to decode process 2403, and execute decode of 20 more bits at step 2409.2, followed by another break process 2411.2, and so on through 2409.3, 2411.3, ... 240.9 k, 2411.k and decode completion at RETURN 2415.

When, as noted above, scheduler 2413 is called, operations commence at BEGIN 2421 and then a step 2425 calculates the deadline interval for a just-arrived packet in, say, channel N, FIG. 23. Next a step 2429 inputs a value T from register 2414 representing elapsed time into decode process 2403. Operations proceed to a block of steps 2481 including steps 2431, 2435, 2441, 2451, and 2461 which are described in the same way as were the steps 2231, 2235, 2241, 2251, and 2261 in block 2281 of FIG. 22. After operations in block 2481 of FIG. 24, a RETURN 2471 is reached.

In FIG. 24 at step 2407, when the frame encountered represents an interval of silence, operations go to a step 2416 to load register b 2414 with an update representing the duration of the silence. Next a step 2417 decodes the silence as no-sound, or as white noise, or as decaying energy, or otherwise according to the silence decode process desired and selected by the skilled worker. A just-arriving packet in another channel suitably interrupts this silence decode process 2417 using scheduler 2413. After silence decode step 2417 operations there reach RETURN 2419.

Figure 25:
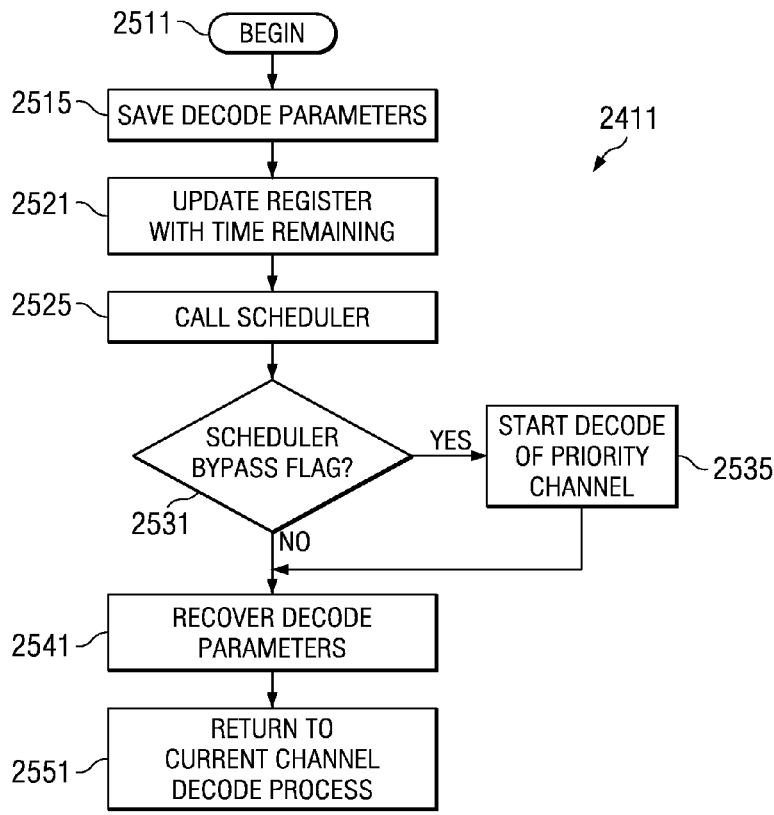
FIG. 25 is a flowchart of an inventive Break Process in the process of FIG. 24.

FIG. 25 illustrates a break process used in blocks 2411.1, 2411.2, 2411.3, ... 2411.k of FIG. 24. Operations commence at BEGIN 2511 and then at a step 2515 save decode parameters and data from the previous 20 BITS step 2409.k to the extent needed to initiate the next 20 BITS step 2409.k+1 when the latter's time comes. After step 2515 operations at a step 2521 update register 2414 with decode execution time remaining (or decode time elapsed) as coordinated with steps 2429 and 2431 of FIG. 24. Thus, decode time elapsed is input as time T in step 2429 and used as shown in step 2431. Decode time remaining (Tr) is alternatively fed to step 2492 and the test in step 2431 is made to be [(DIN–EN>0) AND (DIM–Tr–EN>0)].

In FIG. 25 operations go from step 2521 to a step 2525 that calls the scheduler 2413 that is suitably implemented as shown in FIGS. 22, 23 and/or 24. FIG. 25 also suggests a process embodiment wherein flag software is used in the scheduler 2413. The flag is turned on when a suitable test determines that any other packet or channel should be given priority over the decode process underway in FIG. 24. When this flag is on (YES) operations branch from step 2531 to a step 2535 to start decode of the priority channel. Note that operations may nested such that even that priority decode may be interrupted, whereby starting in step 2535 does not signify uninterrupted run to completion. After step 2535, or when the bypass flag is OFF in step 2531 (NO), then operations go to a step 2541 to recover the decode parameters and data from step 2409.k, whereupon operations proceed to a step 2551 to return and go to the now-current channel decode process 2409.k+1.

Figure 26:
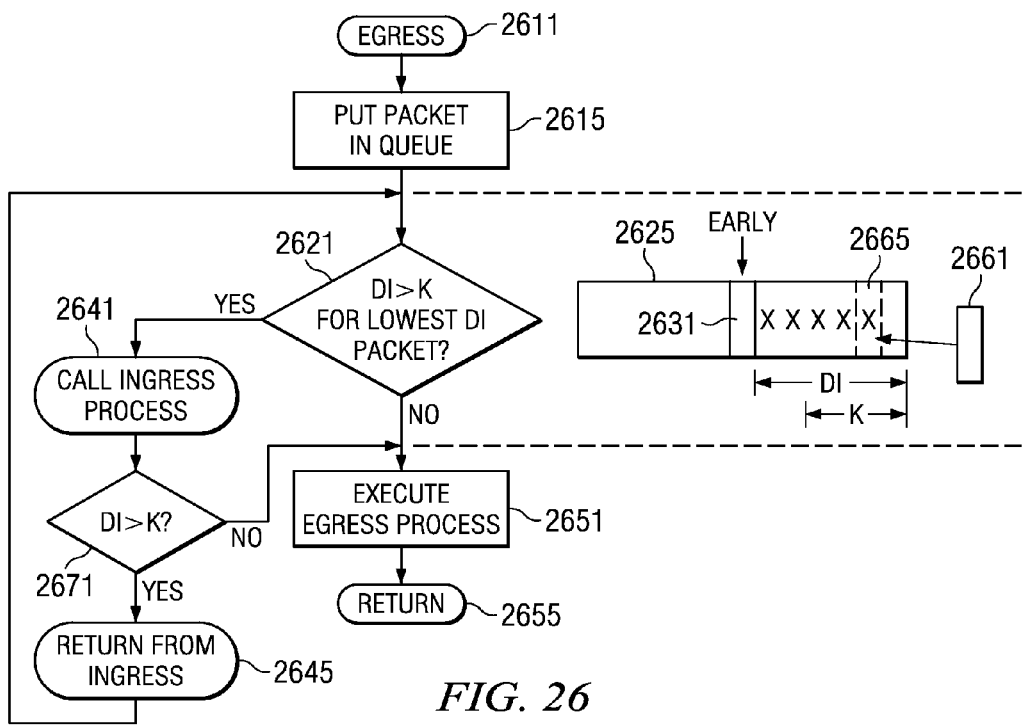
FIG. 26 is a flowchart of an inventive process example of FIG. 20 Embodiment #5, upper left cell "Do Ingress First"

FIG. 26 details a process example of embodiment type #5 of FIG. 20. Operations commence with Egress Begin 2611, and then at a step 2615 put an egress packet in a queue 2625. Next, a decision step 2621 tests to see whether Deadline Interval DI, for the latest packet in the queue 2625, exceeds a certain threshold number K of bytes (words or frames, etc. as skilled worker chooses). For example, suppose a frame 2631 is the packet that is the latest (lowest DI of all frames) in the queue. The frame 2531 is an early frame. Its DI exceeds the number K. Step 2621 determines YES and branches to step 2641, which calls an ingress process because there is plenty of time to fit the ingress process before any more egress processing is necessary in the channel.

If the test in step 2621 turns out to be NO, operations go to step 2651 to execute the egress process as discussed earlier hereinabove, whence a RETURN 2655 is reached. Also, if during the ingress process called in step 2641, the lowest deadline interval DI becomes less than K in decision step 2671, such as by entry of a newly-arrived packet 2661 into a queue 2625 position 2665, then a branch from decision step 2671 goes to egress step 2651. Otherwise, step 2671 determines YES and operations pass to RETURN From Ingress 2645 and back to step 2621.

Silence Processing Embodiment

Since silence processing has a much shorter processing duration than voice processing of a frame, the decoder in FIG. 24 suitably determines whether the packet is voice or not in block 2725. If not voice (i.e. silence), then the register 2414 is loaded with a silence processing period T=5 microseconds, for instance, and the silence packet is decoded, followed by a return. The scheduler 2413 checks the register 2414. A very late arriving packet that might have been discarded at step 2431, is now advantageously saved because the T value is so much less at stop 2429 for a silence packet.

In FIG. 24, the decode process is in another embodiment made to stop after processing part of a packet, and can thereafter recover and pick up where it left off. The skilled worker takes account of header-stripping processes, and checksum and other overhead processing.

The C6x DSP has multiple execution units. Some decode processes can go part way and break, and execute further, etc. Some parts of the decode routine may not be executing at a particular time. In a single-threaded embodiment, the C6x DSP or C54x DSP executes a thread of code as described in various embodiments as described elsewhere herein.

With four C54x DSPs configured in a system executing a single channel for each DSP, without the channels being serially ordered tasks, establish the system and process so that the egress task for a channel always has priority over the ingress task for that channel. Knowledge of the deadline for each egress packet is useful to determine what packets are too late and should be discarded.

In a multithreaded embodiment, a DSP such as TMS320C8x DSP or another example using 4 DSPs on the back end, use one of them to maintain the queue and from the queue whenever one of the processors is free, then it would take the next task to execute. A scheduler is a central processor that assigns the tasks to plural DSPs. Advantageously, a single queue compares and keeps track of what task needs to be executed next at any given time.

Single Channel Embodiment

In a cellular phone embodiment of FIG. 4, ingress packets at the sending phone become egress packets at a remote receiving telephone. Another process organizes the scheduling process to "mistreat" or delay the ingress packets to the least possible extent. Instead of assigning the egress packets priority over everything else, the process with advantageous flexibility utilizes information about the deadline for execution of each egress packet. In addition to concentrating on those packets which are late, the process considers those packets that are early with known long deadline intervals. The process nonpreemptively holds off processing a packet which is early because it is known to be early. One or more ingress packets are thus given priority nonpreemptively and processed instead of the known-early egress packet. The ingress packets thus processed are then sent out and arrive earlier than they otherwise would have arrived at a receiving location, and thus their probability of becoming lost packets is reduced significantly. (If in a trivial situation the egress packet that was early and did not need to be processed and has nothing ahead of it, then the process simply executes on that egress packet because it is at the top of the queue.) In this way, advantageous process embodiments improve even single-channel mobile terminals, cellular telephone handsets, and other single-channel applications.

In FIGS. 4 and 26, a non-preemption scheduler sees there is time to slip an ingress encode in an open opportunity time interval because the egress channel has only known-early packet content which allows. The egress packet is looked up for deadline interval, the process sees it has lots of time left, i.e. detects a deadline interval greater than a predetermined value. Then it processes an ingress packet. Advantageously, this embodiment increases the transmission quality of the network because it confers less delay of the ingress packets in terms of their deadline interval at the receiving end.

Operations begin at Egress begin step 2611 and proceed in a step 2615 to put a new packet in the queue. Next a step 2621 determines whether the deadline interval DI exceeds a predetermined time interval K for the packet in the queue 2625 having the lowest value of DI 2631. Time interval K is at least as large as a predetermined amount of time needed for an ingress process to encode more input speech at the sending end. If in step 2621 lowest DI does exceed K, then operations branch to a step 2641 to call the ingress process which then executes in less than time interval K and returns in a step 3145 to the step 3121. At some point step 2621 detects that the lowest DI packet has aged to the point where DI is not greater than K, and operations proceed to a step 2651 to execute the egress process, whereupon Return 2655 is reached.

Since a late arriving packet 2661 may come into the picture, its arrival interrupts or preempts the ingress process if DI for the late arriving packet is determined to be not greater than K in a step 2671 executed during the ingress process begun at step 2641. If this happens, then the ingress computations are suitably saved, if they have proceeded far enough to produce meaningful ingress information, and then operations go to step 2651 to execute the egress process for the late-arriving packet 2661.

In this way, as shown in FIG. 4, ingress processing at a source 481 is advanced, thereby giving the network ample time, or at least more time, to get ingress packets to a cell phone 491 where egress processing in phone 491 assigns a higher deadline interval DI value to the incoming packet than would have otherwise been the case.

Note further that since silence processing has a shorter processing duration than voice processing, the character of silence or voice is used in determining whether to allow the ingress process to go forward in lieu of the egress process.

Advantages conferred by the system of FIG. 4 thus are 1) less delay of ingress packets, and 2) increased resulting network transmission quality.

Figure 27:
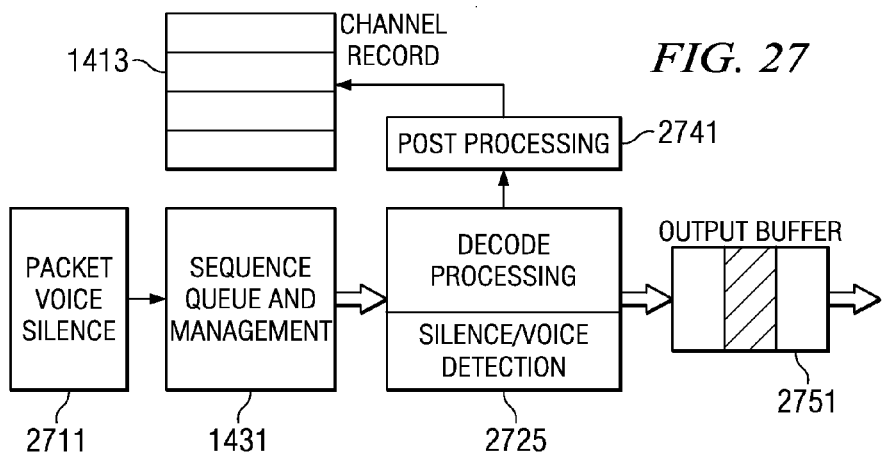
FIG. 27 is a block diagram of an alternative process to that of FIG. 14.

Alternatively to FIG. 14, as shown in FIG. 27 the system initially does not differentiate between silence and voice packets 2711. Such system goes through the decode process as if the silence were a voice packet. The silence or voice packet simply go to the sequence queue management 1431. Eventually they both get picked up and go into the decode processing 2725 that simply only at this point decides whether it is a voice packet or silence packet.

In FIG. 14, the silence process bypasses decode processes 1425, whereas in FIG. 27 the silence information goes to the decode processing block 2725. In FIG. 27 the local buffer of FIG. 14 is not used, and decode postprocessing 1441 of FIG. 14 is simplified because decode processing 2725 directly puts silence or voice data directly into an output buffer 2751. Simplified postprocessing 2741 updates channel record 1413. Whether voice or silence packet is involved, the deadline interval update process of simplified postprocessing 2741 is the same. Even when the sequence queue and management process 1431 may have a little more work to do, compared to FIG. 14 because silence packets go to process 1431 as well as voice, both types of packets are advantageously handled in a uniform way all the way until decoding process 2725 occurs. Thus, selector process 1405 of FIG. 14 is obviated. Also, many processes desirably have a continuity of execution, such as adaptive filtering and echo cancellation, and G.726 encode with delta modulation change voice to differences in amplitudes and mapping of a given fragment of speech.

If detection of silence occurs in decoding process 2725, the silence frame is suitably decoded into a ramp with a certain spectrum so that the silence is not as abrupt.

In the system of FIG. 27, the silence packets and their corresponding calls are used to schedule link list records in queue 1431 of FIG. 16. A silence packet has a usual header but a shortened payload compared to a voice packet. The payloads are stored in memory that in some embodiments have fixed locations even when the decode processing 2725 decodes from that fixed location. The code includes the capability of informing the front end queue management that a space has become available, so that when the packet has been decoded, that space is returned to availability as part of the queue space for new packets.

In both the systems of FIG. 14 and FIG. 27, the process is robust even if a silence packet and a consecutive voice packet arrive out of order. Sequence numbers of the packets are checked and deadline interval determined, thus automatically providing resequencing as the link list 1431 is updated. Then the decode knows it is a silence packet or voice packet because the header provides this information.

A management method by which the scheduling list 1431 is managed, decrements values in packets, adds packets, takes packets at top of queue and sends them to decoder. If the packet at top of queue is a silence packet, it likewise goes to the decoder 2725 in the FIG. 27 embodiment. The decoder detects that it is a silence packet, and detects the number of words of silence. Then the postprocessor 2741 updates the channel record with updated deadline interval. Silence processing takes less time (e.g., 5 microseconds) than voice processing, at say, a few hundred microseconds. Silence processing suitably fills an area of output buffer 2751 or memory with zeroes or noise with predetermined spectrum similar to previous voice packet, or interpolation, or other silence data.

Since silence processing has a different processing duration, the decoder or a data store takes account of this in operating the processor to consider it as a very late packet, or to issue timing to a register; or in determining whether to allow the ingress process to go forward in lieu of the egress process as described earlier above.

The decoder tells the scheduling list how far it is in its processing. In some embodiments the decoder and scheduler both form part of a nonpreemptive scheduling loop.

In preemptive embodiments, the process suitably is made to look ahead where a segmented decoder process of FIG. 24 allows itself to be interrupted because of a late arriving packet.

Conversely, suppose a silence packet is the arriving packet. Even if the silence packet is very late, even later than a voice packet which would have been discarded, the silence packet also has a larger deadline interval DI because it takes less time to be processed. In some embodiments a lost packet is treated the same as a received silence packet, and this consideration is less important. But in other embodiments a received silence packet is decoded to produce a different output sound from the sound which the decoder produces in response to a lost packet event detected in the last 10 milliseconds before the deadline for example. Also, in embodiments where a received silence packet contains a number indicating a value S of how many frames of silence, and a lost packet event only signifies a predetermined number of lost voice frames, then saving a silence packet from loss is also important. Thus, the deadline interval calculation advantageously saves silence packets for decoding that would otherwise be discarded.

In one type of embodiment, the process updates all the channel records every 10 milliseconds, and determines and maintains the status of the channel as silent or not. For example, when the buffer is shorter than the amount of silence, then a subprocess is repeatedly initiated or awakened to maintain the silence until the silence period has fully elapsed. The buffer is emptied with voice, and then more and more silence is suitably put in the buffer. Alternatively, a silence generation process is set up as a parallel hardware block or as a parallel process to the voice process.

Turning to the aspect of clock, if all channel clocks were running in lockstep (or not) on the same clock boundary, then consider the effect on the scheduling process. Some embodiments start up the output stream for every channel on a 10 ms clock boundary. Other embodiments start up the output stream for each channel in a manner distributed in a predetermined (e.g. incrementing by 1 ms intervals, or incrementing by 10/N ms intervals, or distributed randomly) way. Delaying the output allows the buffers to fill for a while initially, and permits the system some leeway in handling late packets at the cost of some delay or latency, which if excessive would be perceived by the users. See FIG. 11 buffer 1177. However, beyond the initial latency built into the process, tuning that latency for each channel by zero to 10 ms does negligible harm to user perception from the standpoint of latency alone. Using the tuned latency to then select that tuning that most advantageously saves late packets, is accomplished in various types of embodiments herein to improve the speech or other signal quality.

For example, if one packet gets in late it may be just in time and preempt processing in another channel. If the clock boundaries are staggered, but still 10 ms in period, a clock boundary for one channel may be coming up, so it's important to service the channel.

If clock is recovered on each of N channels, then the decoder is run at clock for each channel and therefore the time when the boundary is occurring may be occurring with a different and continually changing, precessing deadline instant relative to local 10 ms reference clock boundary. Thus, reference clock and N channel clocks may exist in some embodiments.

The number of centiseconds per frame does not differ significantly between the different processes because otherwise the frames would produce a misplaced pitch in the output. The decoder is running on the reference clock which is short compared to frame time in various embodiments. The different time when the speech is launched off is varying here, producing the variation between the channel clocks, rather than there necessarily being a precession between channel clocks.

Clock recovery for packets is suitably provided. Packet pulse rate inside each packet varies from channel to channel, but the hardware can take care of that process.

Host Interface
  Next Packet Address Generation
  Insertion of a Packet

This description starts with the Host placing a packet in the space of the DSP and its processes, including the scheduler:

There are several ways by which a packet can be placed in the DSP space, and then scheduled for decoding. First the "interrupt driven" solutions.

A—the Host writes the packet into fixed area, and then interrupts. The disadvantage lies here in the need to move the packet, so that the fixed area is made available for the next packet.

B—The location of the address of the space to write the packet into is fixed. The Host reads the address, writes the packet accordingly, and interrupts. The DSP side of the packets' memory management is left entirely with the DSP. This is an advantageous choice.

C—Associate a fixed area with each channel. That is a less viable alternative for more unpredictable packet arrival times. If more than one buffer per channel needs to be reserved, the solution becomes complex, and expensive in terms of the needs of reserved space.

Polling based solutions involve the DSP side periodically testing a flag. The Host writes a packet and sets a flag. The flag is periodically checked.

The solution described in some detail uses the Host interrupt service routine, which sets a flag. At some other point in time the flag is checked by the DSP. Thus results a combination of interrupt by the Host, and polling by the DSP. Strictly polling solutions are also feasible.

IMPLEMENTATION EXAMPLES

The system description herein follows a single packet from its arrival to decoding, inclusion into a voice stream and return of the storage occupied by the packet. Below the phrases "linked list", "list" and "queue" are used interchangeably.

Details are described in three phases. Phase 1 "Packet entities and lists" follows a single packet from arrival to its inclusion in the egress data stream. The packet is described as it "visits" different data structures. Phase 1 bypasses a layer of problems and solutions added on by the special constraints of real-time processing. Thus Phase 2 "Real Time behavior" describes underlying real-time issues and the system solutions. Phase 3 adds more description of "The four linked lists."

Phase 1—Packet Entities and Lists

The arrival of packets is unpredictable. Advantageously, the selected data structures used in this example are linked lists. Linked lists are well suited to handle unpredictable variations of order.

Important Data Structures

FIGS. 15-17 show three groups of structural components, each group containing an "egr_cell" and "packet_record." A group comprising an egr cell and associated (linked) packet record will be called "packet entity."

During initialization of the program certain number of egr cells and packet records is declared and linked together. During the lifetime of the program the links connecting (and thus making) each pair do not change. The two types of structures could be declared as one, but they are declared as separate for technical as well as tutorial reasons. Unlike the packet_records the egr_cells are accessed frequently so they are likely to be placed in the fast (internal) memory of the DSP processor.

Neither the cells nor the records are physically moved. Yet packets are effectively, but virtually, "moved" from one list of packets to another by approximately linking and re-linking the egr_cells and in consequence, the corresponding packets. The reason that packets are "moved" from one list to another is to transfer them from one real-time domain to another (see Phase 2—"Real Time behavior" as well as Phase 3—The four linked lists").

packet_record

The packet record comprises information about the packet and it is also a container for it, a place the packet will reside between its arrival, and its "consumption". The packet information and packet data is placed in the packet record by the host (see FIG. 2.1 for details).

```
1 Struct egr_packet_record
{
int channel_nr;
int packet_data {EGR_PACKET_MAX_STORAGE_SIZE};
};
```

In addition to being the storage for the packet data the packet_record contains information supplied by the host about the packet. Of interest here of the channel identification of the channel associated with the packet (called here channel_nr).

In implementation of a complete system the packet_record (and other structures shown later) may contain other elements in addition to those shown. For instance the packet record suitably includes a "sequence number" so that the system reorders packets that arrived out of order, or responds appropriately upon observing that a packet is missing. The data structures presented here include elements, which accomplish dynamic scheduling based on packet deadlines.

egr_cell

The egress cell "egr cell" includes a pointer pointing at a packet record, that packet's deadline, and a pointer at another egr cell. The last item strings the packets (to create a linked list) in any desired order.

```
struct egr_cell
{
struct egr_packet_record *packet_address;
int deadline; /* interval of time after which unfurling the packet has no value */
struct egr_cell* next;
};
```

FIG. 16 includes three "ordered packet entities 1431. They are ordered by use of the elements "next in each cell. The element "next" is a place for a pointer to any structural element of type "egr_cell". A special pointer of value NULL (pointer to nowhere) is used to indicate and to allow detection of the last egr_cell on the list.

Channel_record: Still another important structural component is the "channel record"

```
Struct egr_channel_record
{
int egr_in_use: /* if 1, this egress channel is on */
int egr_deadline; /* nr of 10msec interval till deadline */
int egr_prds_in_frame; /* channel's frame size in 10msec periods */
};
```

There is one such record per channel. If channel is not in use, it is skipped. Each time the channel is opened for new telephone call the egr_deadline is initialized. The initial value of egr_deadline results from size of the dis-queuing buffer. However, once the system is in operation, each time the packet is unfurled its deadline is increased by the frame size expressed in terms of numbers of 10 msec periods. The value of deadline is decremented by 1 on each 10 msec boundary (see "FIG. 9—The circular time" for an alternate way of handling the deadline record keeping.

FIG. 15 depicts a model of major events experienced by each incoming packet.

Assume that the packet just arrived. FIG. 16 shows how, with each arrival of a new packet its deadline is retrieved and placed in the egr_cell for the packet, while FIG. 17 shows how the deadline is used to sort the packet in into the list of already scheduled packets.

In FIG. 16 the egr_cell point to the packet record 1653 which contains the channel number. That value is retrieved to access related channel record, which in turn includes the current deadline. The value of the deadline .quadrature.$T_R$ is then transferred to the egr-cell.

Now the new packet is ready to be sorted in into the "scheduled" list. The list is equivalent to the one shown first time in FIG. 8 with annotation—"Arrived in the past." However, the "scheduled" list of FIG. 17, following an embodiment of the invention, is already appropriately ordered. Thus the new cell is linked into the scheduled list in the place reflecting that cell's deadline.

The scheduled list is in turn used as the source of information how to dispatch packets to execution (decoding) program. The dispatcher scoops one cell at a time from the top of the scheduled list. The top of the list includes the cell, which points to a packet of highest priority.

Phase 2—Real Time Behavior

"Real time behavior" is used here to be synonymous with the real-time phenomena of the interplay of functionally separate subprocesses. Three subprocesses include two interrupt service routines void interrupt EndOfBlock_isr (void);
void interrupt PacketIn_isr (void:
and the background activity
void RealTimeProcess (void);

The EndOfBlock_isr ( ) has the highest priority followed by PacketIn_isr ( ) and the RealTime Process ( ).

Sometimes those subprocesses are referred to as "threads," but here the term "domain" is used instead to imply a grouping of a subprocess with its logically associated and yet shared data. When the shared data is being modified by one subprocess, that data must be protected from access by another (subprocess), even if the latter is of higher priority. Sharing data (as well as other resources) makes real-time systems fundamentally different from sequential systems.

The EndOfBlock_isr ( ) is the highest priority interrupt, which creates the rhyme and rhythm for all the activity of the system. EndOfBlock_isr ( ) sets an EndOfBlock_Flag.

Recall that each frame is made of a number of "blocks", each block comprising 10 msec of voice data. The value of the global EndOfBlock_Flag permits the background RealTime Process ( ) to detect the 10 msec End-Of-Block boundary immediately after the EndofBlock_isr ( ) completes.

The PacketIn_isr ( ) is issued by the host each time right after the host places a new packet in the memory shared with DSP. The PacketIn_isr ( ) sets PacketIn_Flag. Likewise, the flag permits the background $_{Real\ Time\ Process\ (\ )}$ which detects arrivals of new packets.

An example of a function RealTimeProcess ( ) is listed below. While the two interrupt service routines have high priority and run for very short periods of time essentially to announce (to flag) special events, the $_{RealTime\ Process\ (\ )}$ runs continually in the background, except when one of the interrupt service routines (isr's) does.

A program below handles the egr side.

```
void RealTime Process (void)
{
while (1)
{
if (EndofBlock_Flag)
{
EndofBlock_Flag = 0;
Update_egr_deadlines ( );
};
if (PacketIn_Flag)
{
disable_interrupts ( );
PacketIn_Flag = 0;
    Relink_egr_packets (1);
enable_interrupts ( );
schedule_egr_side ( );
};
execute_one_frametask ( );
};
}
```

The "while (1)" indicates that this is a loop, which logically runs always. In reality the execution is suspended at a random point during exceptions noted above.

The first two c-language "blocks" are tests for occurrence of one of the two major events. If tests fail the control is passed to $_{execute\_one\_frametask}$ ( ) which decodes one packet, if there is one on the queue. The control then returns to the top of the loop to carry the tests.

Eventually, one or the other event will occur. If it is the End of Block signifying the 10 msec boundary, all structures containing packets are updated by decrementing the deadlines by one. Following the update_egr_deadlines ( ) in the code leads to updating three structures: the egr_channel_records, the egr_arriv_list, and the egr_sched_list, see Phase 3 later herebelow.

The PacketIn_Flag signifies that one or more newly arrived packets are there on the egr-arriv-list, waiting to be scheduled. To insert them in the egr-sched-list in the right order, those packets are removed from the PacketIn_isr ( ) domain. That is done by temporarily turning the interrupts off and giving the PacketIn_isr ( ) an empty pointer to start a new list. In the meantime the egr_arriv_list is renamed to egr_firewall_list. That list becomes input for the schedule_egr_side ( ) which sorts the packets into the egr_sched_list.

Phase 3—The Four Linked Lists

The entry list (egr_entry_list) is the storage of empty cells, with the exception of the top cell. When the host is ready to send down a new packet it looks up the location "host_com" to find its address where to place the packet.

After the host has inserted the new packet it issues an interrupt to let DSP know about it. That brings about an interrupt service routine called PacketIn_isr ( );

The PacketIn_isr ( ) de-links the cell (no longer empty) from the entry list and re-links it to the egr_arriv_list. That is done so the host can rapidly send down another packet without any additional complexity in handling the entry list. Another function carried out by the PacketIn_( ) is a call to a call Next_Packet_Address ( ). That routine looks up the entry list to find the address of the placeholder for the next packet. It then places that address in host_com, a location known to the host. Next time the host wants to send a down a packet, it looks up across the interface the location host_com and inserts the packet in the memory beginning at the address in host_com.

Thus the "arrived packets" list (egr_arriv_list) is the list of packets which were to collected during execution of a frametask. (See the "RealTimeProcess ( )") below.

The firewall list (egr_firewall_list) (cf secondary queue 1261) is the egr_arriv_list after being relinked from the host interrupt domain to the background processing domain. (See section on domains). The relinking of a list amounts to two simple statements, but it requires disabling the Packet In interrupt.

The "egr_arriv_list" is in the domain of the PacketIn_isr ( ) (see the "RealTimeProcess ( )"). At tome point in time this list is relinked (while the interrupts including the Packet In interrupt) are disabled.

The list of scheduled packets (egr_sched_list) contains the packets sorted by priority.

The entire firewall list is sorted in into the scheduled list, one packet at a time. Another alternative process sorts the firewall list first and then merges it into the scheduled list.

Execution (decoding and placing a frame in the egr buffer) takes the top packet from the scheduled list (if not empty) and passes it to the decoding routine.

Purging Late Packets

Some of the packets already waiting on the scheduled list may have waited too long. Their deadline has passed and they need to be removed. This is called purging late packets.

For the 10 msec δT approach the late packets are suitably removed at the 10 msec boundary, or as the part of the execution process deleting the top packet from the list. For the high-resolution θT approach top-packet deletion is performed by call purge_late_packets ( ) called from exec ( ).

When the compressed and encoded representation of a frame of voice data has been decoded and a frame has been placed in the egr buffer, the used packet entity is returned to the entry list and waits to be reused for some other arriving packet. That is done by return_egr_cell ( );

void return_egr_cell (struct egr_cell*cell_ptr);

Return of the cell is made in the "background domain", while the egr_entry_list is part of the PacketIn_isr ( ) domain. Interrupts are disabled for the duration of that call on the return_egr_cell ( );

Circular Operations

The next sections describe a solution to the problem of handling packet processing deadlines in the context of a system having circular buffers and a system timer counter roll-over (circular time) and packet time-stamp rollover.

"Circular Buffers" or "Circular Memory"

The primary objective of circular buffers is to provide means of resynchronization of data between mutually asynchronous data sources and sinks. In DSP the circular buffers are commonly used to bridge the constant sample-data rate of input and output with DSP processor, which is commonly programmed to process entire blocks (frames) of data at one time. An additional role of the circular buffers in packet telephony is to provide buffering, needs for which arising from different on-route delays of individual packets.

There are two things to remember about fifo or circular buffers. A word cannot be taken from an empty buffer, and a word cannot be added to a full buffer.

An example here is the egress (output) side of digital packet telephony system where the decoder produces frames of output data. That data is inserted into a buffer at the rate the process produces them, to be consumed by separate process, which reads the data out at the sampling rate, and feeds them into a Digital-to-Analog converter, one sample at the time.

FIG. 9 shows one such egress buffer. Region containing the voice data currently in the buffer is shown shaded and can wrap around (not shown) to the other end of the buffer. On the left, the input boundary $bf_{IN,A}$, marked with the arrows pointing into the region, a frame of samples is inserted each time the DSP computer decodes a packet. Concurrently, on the right, the output boundary $bf_{OUT,A}$, marked with arrows pointing out of the region, data words are retrieved and sent to the Digital-to-Analog converter DAC or a trunk line E1/T1.

FIG. 1 shows voice data (shaded). On the right, the jagged end samples (data words) are "consumed" to feed a Digital-to-Analog converter [or a trunk line]. Concurrently, on the left, the tailed end groups of samples are "produced" (inserted) each time a frame of data is added. Thus both boundaries are moving. Within the contiguous yet finite memory the soft boundaries cannot move indefinitely. Eventually they will encounter the hard, limiting boundaries of the assigned region within the physical memories, i.e., the end of the buffer area. The process is thus made to continue at the beginning of the buffer area—hence the name circular addressing.

Notice two addresses (pointers) in FIG. 9, namely $bf_{out}$ (buffer output) and $bf_{in}$ (buffer input). Inserting a voice sample into the buffer and incrementing the address is suitably coded in c language as follows:

$*bf_{in}$=in;

$bf_{in}=bf_{in}+1$;

where "in" is an address of the IO port representing ADC. Thus, the contents of a sample are entered or placed at the location addressed by $bf_{in}$ and then a pointer for $bf_{in}$ is incremented or upped to point at the next address.

This places the sample "in" at the location addressed by $bf_{in}$ and increments $bf_{in}$ by 1. Thus the $bf_{in}$ which is holding now the next address may exceed the size of the buffer. In that case, intercept that condition and modify that address so the next sample goes to the beginning of the buffer. To create the circular input, one which after filling in the buffer's end will continue at the beginning needed to associate another line of code with the first one:

If $(bf_{in}>=bf_{start}+N)bf_{in}=bf_{start}$;

where N is the size of the buffer, and $bf_{start}$ indicates that buffer starting address. Notice that out-of-order packets are loaded into the circular buffer in order of arrival. The addresses assigned by $circ_{bf}$ become their respective pointers loaded as address data into the sequence queue. The sequence queue 1431 orders the pointers (and thus the packets indirectly) in deadline DI order or other priority advantageously established by the sequence queue 1431.

Now define a function or a macro $circ_{bf}$, which combines the two addressing statements.

```
typedef unsigned address;
    address circ_bf(address in_address, address start_address, int
        bf_size)
    {
    in_address = in_address + 1;
    if (in_address >= start_address + N) in_address = start_address;
    address = in_address;
    }
```

Having defined $circ_{bf}$ insertion of a word into the buffer is called as follows:

$bf_{in}=circ_{bf}(bf_{in},bf_{start},N)$;

Buffer size N is made large enough so that the largest reserve R never exceeds N. Otherwise good data might exist at $bf_{start}$ when wraparound occurs.

Retrieving a voice sample can be coded in c language as follows:

$*out=*bf_{out}$ $bf_{out}=circ_{bf}(bf_{out},bf_{start},N)$;

where "out" is the address of the I/O port representing DAC. Where $circ_{bf}$ accomplishes $bf_{out}=bf_{out}+1$ If $(bf_{out}>=bf_{start}+N)bf_{out}=bf_{start}$;

The consequence of the additional operations now incorporated in $circ_{bf}()$ the physical boundaries, insofar as the problem is concerned, vanish. The physical buffer has the voice data straddling the buffer.

The size of a data region in the circular memory can be measured. In the case of a contiguous region, its size is the difference between two addresses: [the last plus 1] and [the first] address in the region. A simple subtraction is needed in the case of model on FIG. 1. However, in the case of the region wrapping around the ends the value of the $bf_{out}$ will be less than that of $bf_{in}$ and a special operation of modulo subtraction is advantageously used.

That operation is called circ-delta herein. The familiar relation $R=bf_{out}-bf_{in}$;

is now replaced with
$R$=circ-delta $(bf_{out},bf_{in},N)$;
The following illustrates one way to calculate circ-delta:

$R=bf_{out}-bf_{in}$;

If (R<0) R=R+N;

There is a simpler way. It appears that subtraction operation works just fine here, provided that N is of form $2^k$ and we disregard the "borrow".

Recall from FIG. 10 that packets carry frames that vary in frame decode length F. In an embodiment that prioritizes which channel to process based on smallness of reserve R, this automatically gives some preference to the longer decode length channels where loss of a single packet is more serious. In another embodiment R=F circ-delta ($bf_{out}$, $bf_{in}$, N), and the prioritization can explicitly include or leave out frame decode length F as the skilled worker chooses.

"Circular Time" (Also "Cyclic Time")

Consider "digital" time. A digital clock may present time in hours, minutes and seconds. Between the transitions the (digital) current time value stands still. By contrast, real time "flows" continuously. Real time changes between the "seconds" ticks. A more finely graduated clock may show or act in response to fractional part of a second. Nevertheless, it is the nature of digital clock to have discrete transitions in values, and thus maintain a particular current time value during the period between those transitions.

Considering digital time, there is a differentiation between "linear time" [λT] and the "circular time" [θT]. Linear time, if expressed in numbers, starts with '0' and then ticks through an endless ascending sequence of natural numbers. By contrast, the circular time may start with '0' as well, but it ticks only to some value k−1. On next tick it resets to '0', to start the cycle again. Physical clocks are often not only "circular", but also digital: based on a fixed duration elementary interval, be it one cycle of a pendulum, or a cycle of an atomic clock.

Linear range:

A conventional 12-hour wall clock has a linear range of 12 hours. Modulo arithmetic is used to calculate time intervals. The interval between 2 and 5 is three hours long (5−2=3), but between 1 of the next period and 10 is 1+12−10=3. Thus the modulus equal to the linear range is used in the calculation.

Linear time has a never-ending linear range. Long continuous durations involved in the operation of communications equipment makes long time-stamps preferable. A 32 bit time-stamp at the rate of 8 kHz (the telephony standard) represents time for about six days (0.125 msec.times.$2^{32}$).

Counter Size

To use circular time, select a desirable clock rate $r_{CLK}$ [Hz], and corresponding clock cycle period $c_{CLK}=1/r_{CLK}$, and an estimate of the largest interval of time $t_{MAX}$ [sec] that ever needs to be maintained by the system. That provides the required clock range [number k] which leads to number of bits [number b] needed to implement the clock. The size $T_{MAX}$ of the system clock (clock range) is made at least twice the largest time span $t_{MAX}$ between any two most time distant packets that will ever occur in the system.

For standard 8 kHz telephony, a 16-bit clock provides a total span of over 8 seconds (125 µsec*$2^{16}$>8 sec) which substantially exceeds the longest time span between any traces of two most distant streaming media packets that will likely exist concurrently in a given channel in a global system. Thus $t_{MAX}=2^{16}$ and $k-1=2^{16}-1$.

Let the 16-bit circular time clock have a buffer of the size $2^{16}$ words having $2^{16}$ addresses.

Assume a 16-bit address counter for the buffer is initially reset and begins to count the sampling clocks. Each arriving packet can be associated with the current time $t_{NOW}$. Thus at each clock tick $$t_{NOW}=t_{NOW}+1$$

At the moment of packet's arrival the value of $t_{ARV}=t_{NOW}$ is obtained by copying the contents of the counter ($t_{ARV}=t_{NOW}$).

Recall that for linear time λT the value of the deadline for the arriving packet is $$t_{DDL}=t_{NOW}+\text{circ-delta}(bf_{out},bf_{in},N);$$

or $$t_{DDL}=t_{NOW}+R;$$

Now, since $t_{NOW}+R$ can straddle circular time boundary, introduce new operation $\text{circ}_T$. Thus introduce $$t_{DDL}=\text{circ}_T(t_{NOW}+R);$$

Where $\text{circ}_T$ is the mathematical function modulus ($t_{DDL}$, $T_{MAX}$). The c language implements 'modulus' as '%'. Thus $$t_{DDL}=(t_{NOW}+R)\%t_{MAX};$$

Now introduce the circular time "compare" operation, when sorting the new packet into the queue. A solution to a simpler problem sheds light on the "compare" operation.

One of the functions needed to be performed by the system is to purge packets which missed the deadline while waiting on the sequence queue 1431. Of course the packet most likely to have done so is packet A, the one on the top of the sequence queue 1431 in FIG. 16. Carry out the subtraction $$\Delta\lambda=t_{DDL,top}-t_{NOW};$$

If Δλ is greater than or equal to zero, the packet is eligible for processing. Otherwise the packet is purged.

With introduction of circular time the two values can possibly straddle the system clock modulus time boundary $T_{MAX}$, producing false results, i.e., a form of rollover error. The situation here is quite different than the case of calculating reserves in circular buffers, where $bf_{out}$ always is logically smaller than $bf_{in}$. Here either of the two values being compared can be logically smaller. Thus, inventing a way to differentiate between different categories of results yields the following.

First notice that if Δλ is negative and small, the result is likely to indicate that in the logical values domain $t_{DDL,top}$ is less than $t_{NOW}$ (and the packet is to be purged). If the value Δλ is negative and large (while the two values are known to be close) then conclude that in the logical values domain $t_{DDL,top}$ is greater than $t_{NOW}$, that modulo $T_{MAX}$ arithmetic is necessary, and the correct result is $$\Delta_\theta = T_{MAX} + (t_{DDL,top} - t_{NOW});$$

This is a good observation, but it is not yet a completed process. Words like "small" and "large" do not effectively differentiate categories in the middle of the circular region for difference-of-linear-time values $\Delta_\lambda$ near half the system clock modulus $T_{MAX}$.

To create an "automated" process, use a system clock modulus $T_{MAX}$ where $$T_{MAX}=2*t_{MAX};$$

where $t_{MAX}$ is defined as before: $t_{MAX}$ is the linear time range or difference that includes any two most distant events, the record of which is ever concurrently present in the system.

Define now new operation $\text{circ}_T(t_A, t_B, T_{MAX})$ for any two values $t_A$ and $t_B$ where $0 \leq t_A < t_{MAX}$; $0 \leq t_B \leq t_{MAX}$. Let $$\Delta = t_A - t_B;$$

then if $0 \leq \Delta < t_{MAX}$ then $\text{circ}_T(t_A,t_B)=\Delta$; [$\text{circ}_T$ is positive, no straddle]     CASE 1 if $-t_{MAX} \geq \Delta > -T_{MAX}$ then $\text{circ}_T(t_A,t_B)=\Delta+T_{MAX}$; [$\text{circ}_T$ is positive, straddling]     CASE 2 if $0 > \Delta > -t_{MAX}$ then $\text{circ}_T(t_A,t_B)=\Delta$; [$\text{circ}_T$ is negative, no straddle]     CASE 3 if $t_{MAX} \leq \Delta < T_{MAX}$ then $\text{circ}_T(t_A,t_B)=\Delta-T_{MAX}$; [$\text{circ}_T$ is negative, straddling]     CASE 4

Figure 28:
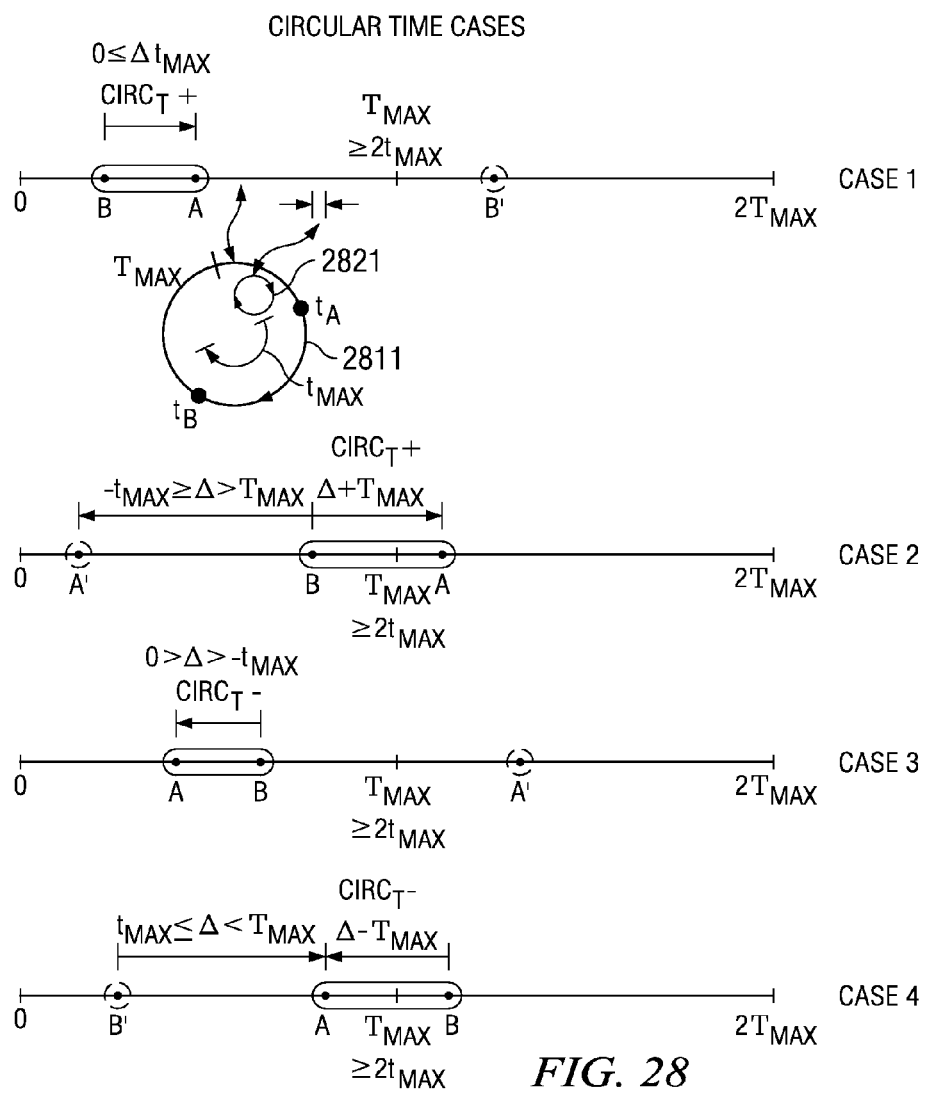
FIG. 28 is a comparative time diagram of various cases of inventive process operations of converting linear time differences to circular time differences, for use in computing Deadline Intervals in other inventive processes herein.

If after obtaining value of Δ as a result of above
If Δ equals $T_{MAX}$ then $\text{circ}_T(t_A, t_B)=0$
If Δ equals $-T_{MAX}$ then $\text{circ}_T(t_A, t_B)=0$ FIG. 28 illustrates the four results above designated Case 1, Case 2, Case 3, and Case 4. Rightward arrows for Δ or $\text{circ}_T$ indicate that their sign is positive, wherein event A has occurred after event B. results are designated Case 1, Case 2, Case 3, and Case 4 in FIG. 28. Leftward arrows for Δ or $\text{circ}_T$ indicate that their sign is negative, wherein event A has occurred before event B.

A clock face 2811 shows circular time that goes from one (1) "o'clock" to $T_{MAX}$ as its "twelve o'clock." Times $t_A$ and $t_B$ show up as large dots on the clock face 2811. A 180-degree turn is designated $t_{MAX}$. This 180-degrees is a span within which the system determines the order of events A and B using the circular time difference process described here. A small circle 2821 suggests the system clock incrementing with fine resolution like a second hand on clock face 2811, as linear time moves from left to right from zero (0) to twice $T_{MAX}$.

Figure 29:
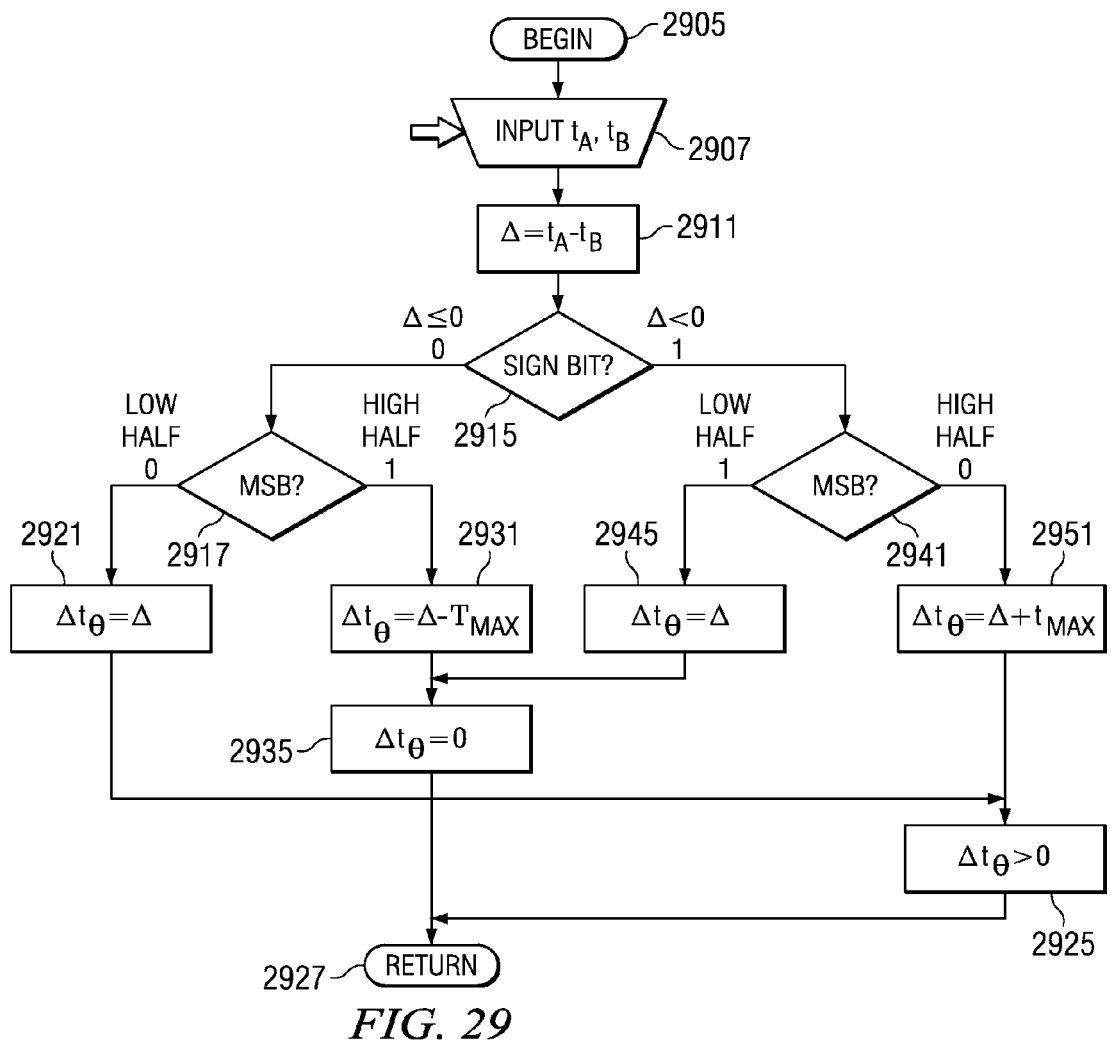
FIG. 29 is a flow chart of operations of in an inventive process for comparison with the time diagram of FIG. 28, wherein the process converts linear time differences to circular time differences.

In FIG. 29 circular time operations to provide circular time difference $\Delta t_\theta$, which signifies $\text{circ}_T(t_A, t_B)$, commence with a BEGIN 2905 and proceed to input tags or computed values representing a pair of times $t_A$, $t_B$ in step 2907. Next a step 2911 finds their linear time difference $\Delta=t_A-t_B$. A decision step 2915 tests the sign bit of the difference from step 2911 next. If the sign bit is positive, then a decision step 2917 tests the most significant bit (MSB) of the difference from step 2911.

If the MSB is zero (0), meaning the difference is in the low half of an interval zero to $+T_{MAX}$, then a Case 1 condition of $0 \leq \Delta < t_{MAX}$ is present and $\Delta t_\theta$ is set equal to $\Delta$. Then a step 2921 sets a flag representing that $\Delta t_\theta$ is positive. If the MSB is one (1) in step 2917, meaning the difference is in the high half of an interval zero to $+T_{MAX}$, then a Case 4 condition of $t_{MAX} \leq \Delta < T_{MAX}$ is present and $\Delta t_\theta$ is set equal to $A - T_{MAX}$ in a step 2931. Then a step 2935 sets a flag signifying that the circular time difference $\Delta t_\theta$ is negative. Note this advantageously remarkable operation: a POSITIVE LINEAR time difference is converted and interpreted to be a NEGATIVE CIRCULAR time difference sometimes and not others.

Turning now to the other side of decision step 2915, suppose that the sign bit is negative for the linear time difference $\Delta = t_A - t_B$. Then a decision step 2941 tests the most significant bit (MSB) of the difference from step 2911.

If the MSB is one (1), meaning the difference is in the low magnitude half of an interval zero to $-T_{MAX}$, then a Case 3 condition of $0 > \Delta > -t_{MAX}$ is present and $\Delta t_\theta$ is set equal to $A$ in a step 2945. Then operations go to the step 2935 which sets a flag signifying that the circular time difference $\Delta t_\theta$ is negative. If the MSB is zero (0) in step 2941, meaning the difference is in the high magnitude half of an interval zero to $-T_{MAX}$, then a Case 2 condition of $-t_{MAX} \geq 4 > -T_{MAX}$ is present and $\Delta t_\theta$ is set equal to $\Delta + T_{MAX}$ in a step 2951. Then operations go to the step 2925 which sets a flag representing that $\Delta t_\theta$ is positive. Note this advantageously remarkable operation: a NEGATIVE LINEAR time difference is converted and interpreted to be a POSITIVE CIRCULAR time difference sometimes and not others.

After either of steps 2925 and 2935 operations then go to RETURN 2927, completing the operations of this advantageous circular time differencing embodiment.

Figure 30:
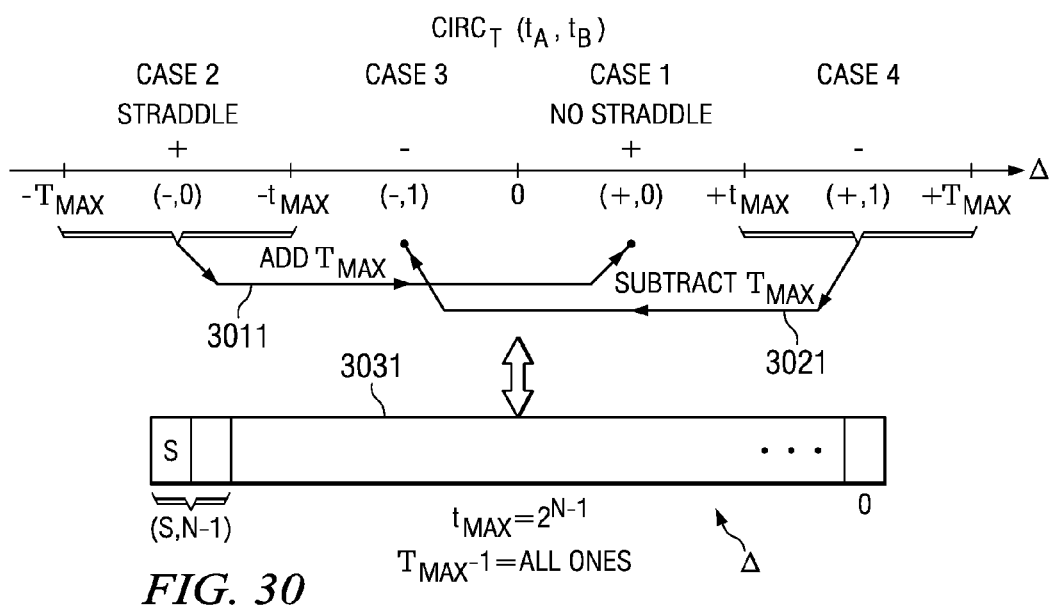
FIG. 30 is partially block diagram of a register, and partially graphical illustration of the various cases of FIG. 28 wherein a variable of linear time difference Delta is used, and various operations of add and subtract (or neither) are employed.

The four components of the process above are ordered according to the results. Less procedurally complex is the view ordered according to the value of $\Delta$. This approach is illustrated in FIG. 30.

if ($\Delta \geq 0$)

{if ($\Delta < \frac{1}{2} T_{MAX}$)$\Delta t_\theta = \Delta$; else $\Delta t_\theta = \Delta - T_{MAX}$;} else if ($\Delta \geq -\frac{1}{2} T_{MAX}$)$\Delta t_\theta = \Delta$; else $\Delta t_\theta = \Delta + T_{MAX}$;};

where $\Delta t_\theta = \text{circ}_T(t_A, t_B, T_{MAX})$.

Thus, in FIG. 30, the high half intervals appear at the extreme left and extreme right quarters of the line or axis representing values of linear time difference delta. In those two extreme quarters, an operation of ADD 3011 or SUBTRACT 3021 operates on bits representing linear time difference delta, which bits are temporarily stored in a register 3031. Further in FIG. 30, notations for signs and MSBs are entered for each quarter of the line. Here was used $\geq$ while could use > for the sake of the clarity of the next section "Looking at the Sign Bits".

The above statements replaced the values of $t_{MAX}$ with that of $\frac{1}{2} * T_{MAX}$. This is permissible both here as it would be in the quad above, since by definition $t_{MAX} \leq \frac{1}{2} T_{MAX}$. Thus the inequalities hold up correctly.

Also eliminated was the comparison with $T_{MAX}$. Because of circularity all values are within the $-T_{MAX}$, $+T_{MAX}$ range and no comparisons are needed.

Looking at the Sign Bits

Looking at the single statement solution in "Closing statements, section 2" above, notice that "if ($\Delta \leq 0$)" is a test of the sign of $\Delta$.

The sign in 2-complement arithmetic, now universally adopted in DSP computers, see FIG. 29, is encoded as the leftmost bit. It is "0" for zero and positive values, and "1" for the negative values.

Just inside the test of the sign there is another test.

"if ($\Delta < \frac{1}{2} T_{MAX}$)" is a test of the most significant mantissa bit Consider that $\delta$ is positive. In a 3-bit mantissa arithmetic 000, 001, 010 and 011 (0, 1, 2 and 3) are all less then half of full range, while 100, 101, 110 and 111 (4, 5, 6 and 7) are greater then half of full range. Thus the decisive factor (FIG. 29) is the most significant bit (MSB) of value. If it is 0, the value is less than the half of $T_{MAX}$. Otherwise it is greater.

Now consider $\delta$ being negative. Inside this side of the statement there is the test if ($\Delta \geq -\frac{1}{2} T_{MAX}$)

Again enumerate three bit mantissas, but this time in negative numbers: 111, 110, 101, 100 ($-1, -2, -3, -4$) have the most significant bit (MSB) equal "1", while 011, 010, 001, 000 ($-5, -6, -7, -8$) that is the larger negative numbers have "0". Again. the decisive factor in FIGS. 29, 30 and 32 is the MSB, or most significant bit of value.

Hardware or Hardware-Like Solution

Figure 31:
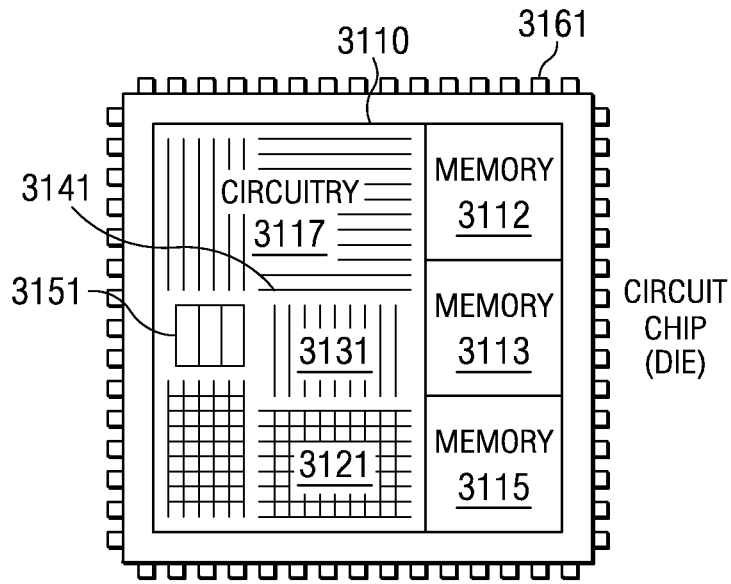
FIG. 31 is a partially block, partially pictorial diagram of an integrated circuit chip improved as described herein.

In FIG. 31, a semiconductor chip embodiment has a core microprocessor, microcontroller, or digital signal processor 3110 combined on a single chip with a section of nonvolatile memory 3112 and sections 3113 and 3115 of SRAM (static random access memory). The nonvolatile memory 3112 is loaded with, or manufactured to have stored therein, the software of FIGS. 1, 5 and 6, and FIGS. 9 through 29, such as blocks of .speech coder, packetize, VoIP control, IP stack, and GUI as the skilled worker selects. Further in FIG. 31, the single-chip integrated circuit DSP 3110 has an instruction decoder 3117, at least one ALU (arithmetic/logic unit) 3131 and a multiplier unit 3121. Buses 3141 interconnect decoder 3117, ALU 3131, multiplier 3121, and memories 3112, 3113, 3115, with a DMA and bus interface unit 3151.

Figure 32:
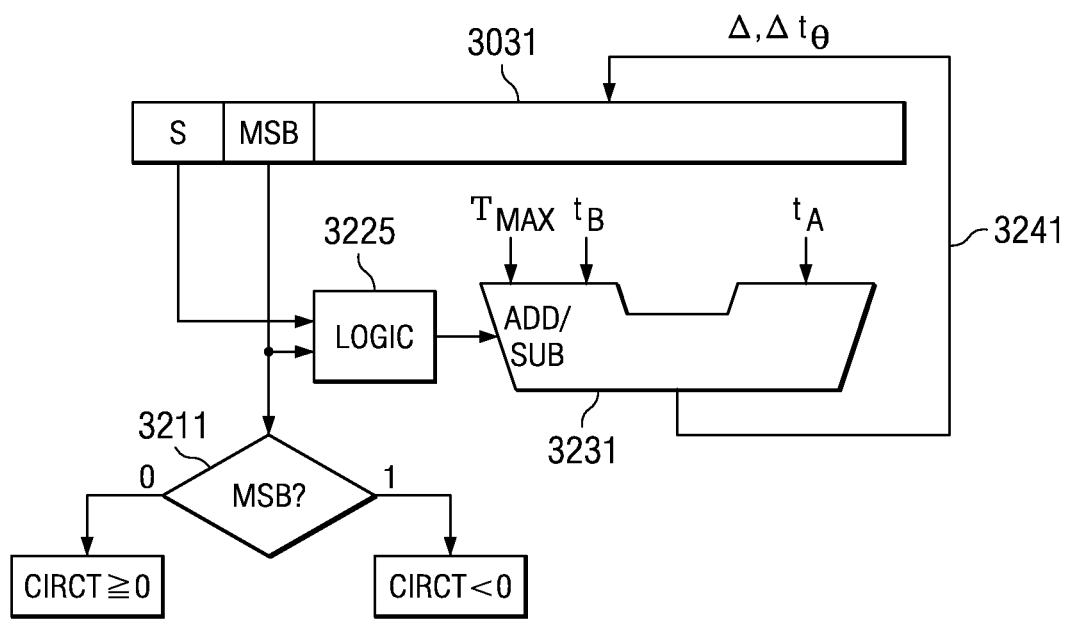
FIG. 32 is a partially block, partially flowchart, diagram of operations corresponding to those of FIGS. 28-30 implemented in inventive hardware circuitry and process.

In FIG. 32, the comparison $A = \text{circ}_T(t_A, t_B)$ produces real values of the time intervals. In reality, sorting and purging processes of FIG. 13 are concerned primarily with the sign of $\text{circ}_T$, meaning determining which of two time stamps $t_o$ and $t_B$ is bigger, and which is smaller.

The sign of $\text{circ}_T$ is determined from the sign of $\Delta$ and the next MSB bit.

00 implies ($t_A > t_B$)
01 implies ($t_A < t_B$)
10 implies ($t_A > t_B$)
11 implies ($t_A < t_B$)

Surprisingly, however, the outcome of the comparator-type, or sign only comparison is determined by the second most significant bit, when a conventional arithmetic is used, and can be determined by uncomplicated logic when other arithmetics are used.

FIG. 32 shows a decision step or decision hardware element 3211. If in the register 3031, the second most significant bit of $\delta$ (the most significant bit of value) is 0 (zero), then $\Delta t_\theta$ is positive which implies that $t_A$ is arithmetically larger than $t_B$ and therefore $t_A$ represents a more recent event. Otherwise, $t_A$ is an earlier event then $t_B$.

The methods are advantageously utilized in both software and hardware embodiments if $((\Delta \& 0x8000)=0) \ldots$ In the statement the second leftmost bit of the 16-bit δ is isolated by marking it off, and compared to "0". Thus, if ($\Delta \& 0x8000$) is "True" then $t_A \geq t_B$, and $t_A < t_B$ otherwise.

Further in FIG. 32, an adder/subtractor circuit 3231 is supplied with values of times $t_A$ and $t_B$ at inputs thereto. The SIGN bit and the MSB bit from register 3031 are fed to a logic circuit 3235 which is designed by ordinary skill to drive an ADD/SUBTRACT control input of adder/subtractor circuit 3231 to appropriately cause an add or a subtract therein according to Cases 2 (two) and 4 (four) respectively when they occur. The result of adding (Case 2) or subtracting (Case 4) or doing nothing (Cases 1 and 3) is fed from adder/subtractor circuit 3231 to register 3031 or to memory via a bus 3241. In this way circular time difference CIRCT is implemented in software or high speed hardware for a variety of applications.

Figure 33:
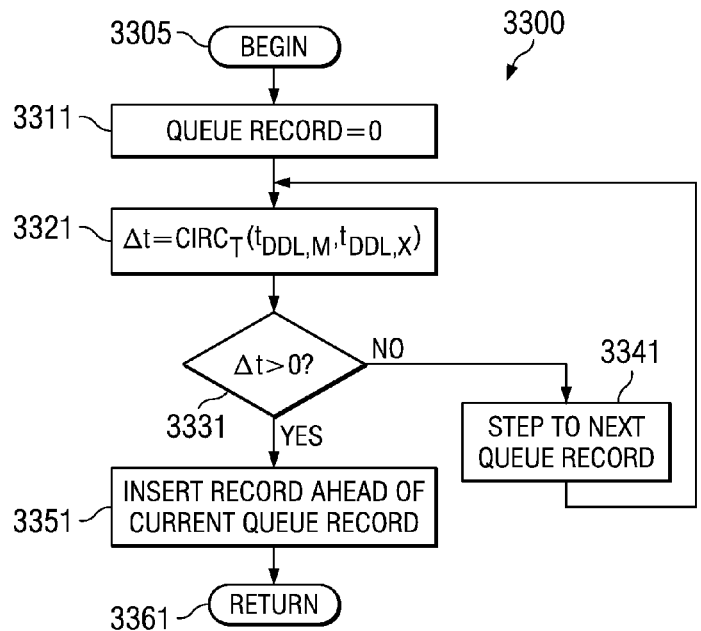
FIG. 33 is a flowchart of inventive process embodiment that sorts new information into a queue and utilizes the circular time difference process of FIG. 29.

In FIG. 33, when packets are sorted by time-to-deadline (DI) to determine which is to be processed first, then advantageously carry on comparisons $$\Delta t = circ_T(t_{DDL,M}, t_{DDL,X}, T_{MAX});$$

Interpreting the potential result, if $\Delta t > 0$ (is positive) implies that the item already on the queue has longer deadline, and the item being sorted in should be inserted before. If $\Delta t \leq 0$ the sorting process should step to the next item on the queue.

The above process 3300 advantageously and efficiently "updates" the queue 1431. Compare FIG. 33 with FIGS. 16 and 17.

Operations of process 3300 commence at a BEGIN 3305 and initialize a Queue Record pointer at a step 3311 before entering an updating loop. Then a step 3321 computes the circular time difference $\Delta t = circ_T(t_{DDL,M}, t_{DDL,X}, T_{MAX})$ between a record to be sorted into the queue and the time associated with a record already in the queue. Next a decision step 3331 determines whether the circular time difference is positive. If not, operations at step 3341 step to the next queue record and loop back to step 3321. Finally, the sorting loop determines that the circular time difference is positive, and operations to proceed to a step 3351 to insert the new record ahead of the current queue record, thereby sorting the new record into the queue. Thereupon, a RETURN 3361 is reached.

Figure 34:
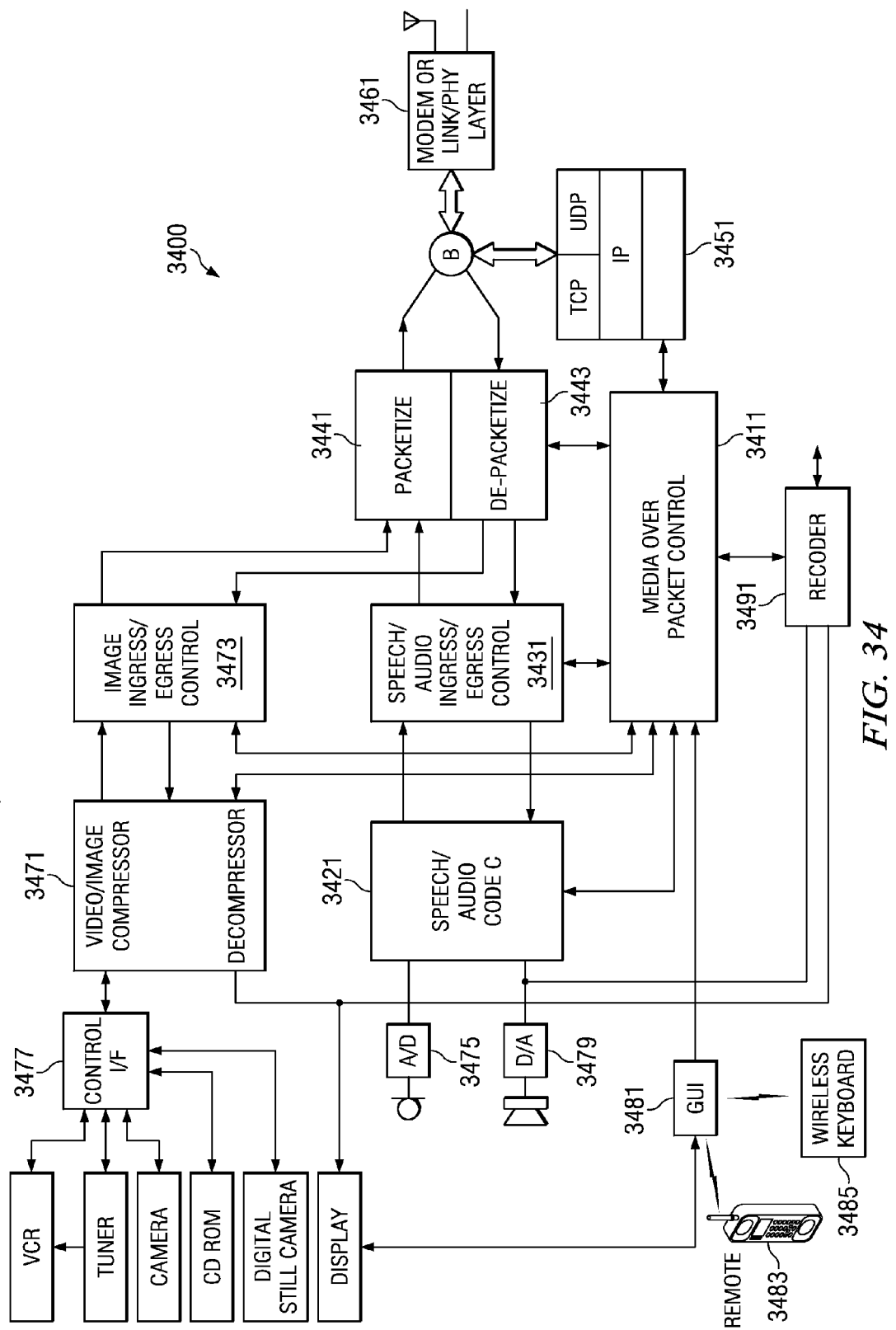
FIG. 34 is a block diagram of an inventive system for image, video, speech, and audio improved packet communications.

FIG. 34 depicts a media over packet computer system 3400 having improved packet playout control software of FIGS. 1, 5, 6 and 9-29 for both speech/audio and image real-time information. A media over packet control block 3411 is interconnected with speech codec and/or audio codec 3421, a speech/audio ingress/egress software control block 3431, a packetize block 3441, depacketize block 3443, a TCP/UDP/IP stack 3451, an image compressor/decompressor 3471, and an image ingress/egress control block 3473.

A microphone and A/D circuit 3475 supply speech/audio codec 3421 with sampled audio information. Speech/audio codec 3421 supplies frames via speech/audio ingress/egress software control block 3431 and to packetize block 3441 which couples to at least one software object connecting via a modem and/or link/physical layer block 3461 to a network or wireless communications path. Block 3461 is any kind of modem or any device that has a link layer and/or physical layer for communication purposes.

Various image sources supply image data via a control interface CTRL I/F 3477 to video compressor and/or image compressor 3471. The image sources include a television Tuner, a VCR video tape recorder and player, a video camera, a CD-ROM drive having images on it, a digital still camera, the output of a medical image processing computer such as a CAT (computer aided tomography) scanner, PET (positron emission tomography) scanner, MRI (magnetic resonance imaging) scanner or other image processing computer (not shown).

In an architecturally elegant and similar way to the audio blocks above, image compressor 3471 supplies frames via image ingress functions in image ingress/egress software control block 3473 and to packetize block 3441 which couples to software object B connecting via the modem 3461 to the network. Real time data such as from a medical monitor or industrial process control (not shown) are suitably coupled analogously into the transmit path.

In the receive direction a software object B receives packets from one or more communication paths in the network and supplies them to depacketize block 3443 coupled to egress functions in the speech/audio ingress/egress software control block 3431. Software 3431 provides depacketized frames to audio codec 3421 for decoding of frames for output through D/A converter and an audio output transducer 3479 such as a loudspeaker. Packet playout control and lost packet compensation in software 3431 are performed as described elsewhere herein.

In an architecturally elegant and similar way in the image path, the software object also receives image packets from one or more communication paths in the network and supplies them to depacketize block 3443 coupled to image ingress/egress control software 3473, which in turn provides image data playout control and lost packet reconstruction for image decompression in block 3471 for decompression of image frames. Decompressed image frames are output to a Display system such as television or cathode ray tube monitor, or liquid crystal display, or digital micromirror display or digital light processing display, video recorder, image processing equipment, storage area network (SAN), or other image utilization systems.

The media over packet control 3411 is coupled to a GUI graphical user interface 3481 associated with the Display. The GUI 3481 is suitably controlled by an infrared or Bluetooth wireless link from a remote control source 3483, from a wireless or wired keyboard 3485, and/or from a wearable communication and control device.

Real time data such as from a medical monitor or industrial process control are suitably coupled from the network via software object B analogously into the receive path in packets coupling to a medical and/or industrial information processing and display.

In gateway, wireless base station, and other applications a recoder 3491 is suitably enabled by media over packet control 3411. Image information decompressed by video/image codec block 3471 and audio information decoded by audio codec 3421 are both coupled to the recoder 3491. Recoder 3491 then recodes or transcodes the information and produces an output compressed and coded according to a different form than was received by system 3400. It is contemplated that systems such as those shown in FIGS. 1, 3, and 4-6 as well as system 3400 of FIG. 34 are suitably cascaded and integrated for various telecommunication and networking purposes. Where many channels are processed simultaneously, the systems are suitably replicated or multiplexed to the extent desired, so that software and hardware are effectively, efficiently and economically employed.

Where blocks are shown herein, they are suitably implemented in hardware, firmware or software in any combination.

Figure 35:
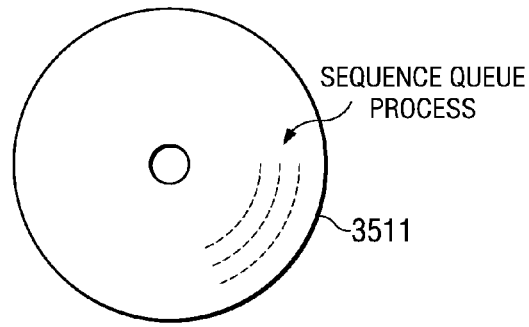
FIG. 35 is a pictorial diagram of one embodiment of an inventive storage article of manufacture improved with physical variations establishing an inventive sequence queue process, and other inventive processes described herein.

FIG. 35 depicts an optically accessible storage disk 3511 that has physical variations representing bits of information. In one embodiment the bits of information represent processor instructions such as DSP instructions for speech encoder 541 and ingress/egress control 581 coupled to packet software stack DSP and MCU instructions. Instructions in the packet software stack direct packets containing the real-time information from the sender computer 203 by at least one path in the packet network 200 to the receiver computer 205.

In a further storage disk 3511 embodiment, the bits of information represent any of the operations established in FIGS. 1, 5, 6, 9-29 and 33.

Figure 36:
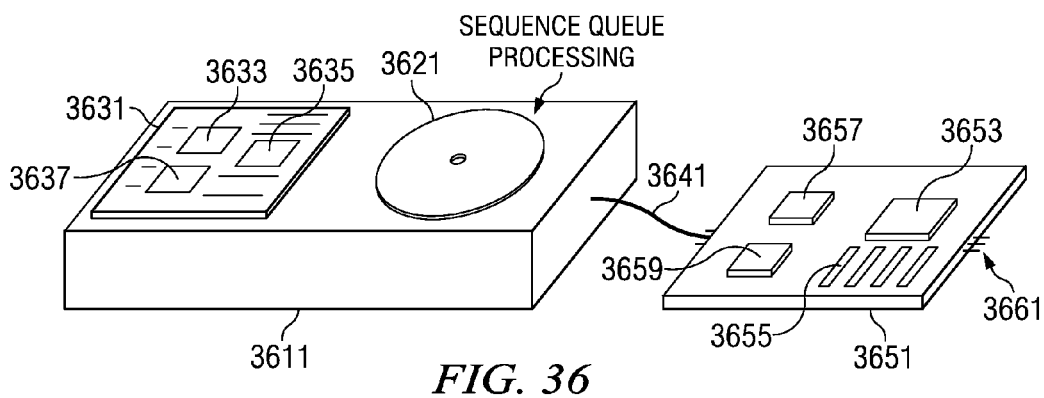
FIG. 36 is a pictorial diagram of another embodiment of an inventive storage article of manufacture having a disk drive, control system and system computer add-in card improved with physical variations and software establishing one or more inventive processes described herein.

In FIG. 36 storage 3611 is provided by a rotatable magnetically readable hard disk storage disk 3621 bearing any or all of the instructions described in connection with FIG. 35. The hard disk 3621 is controlled and read by a hard disk drive control circuitry assembly 3631 having a read channel 3633, microcontroller or DSP 3637, and a memory 3635 interconnected for motor control, and actuator control to read and write disk 3621 from a read write head (not shown). Storage 3611 is connected by an IDE, PCI or other suitable coupling 3641 to a computer printed circuit board or add-in card 3651. The card 3651 has a microprocessor 3653, memory 3655, DSP 3657 and modem 3659 interconnected to provide packets from and to a connector 3661.

Figure 37:
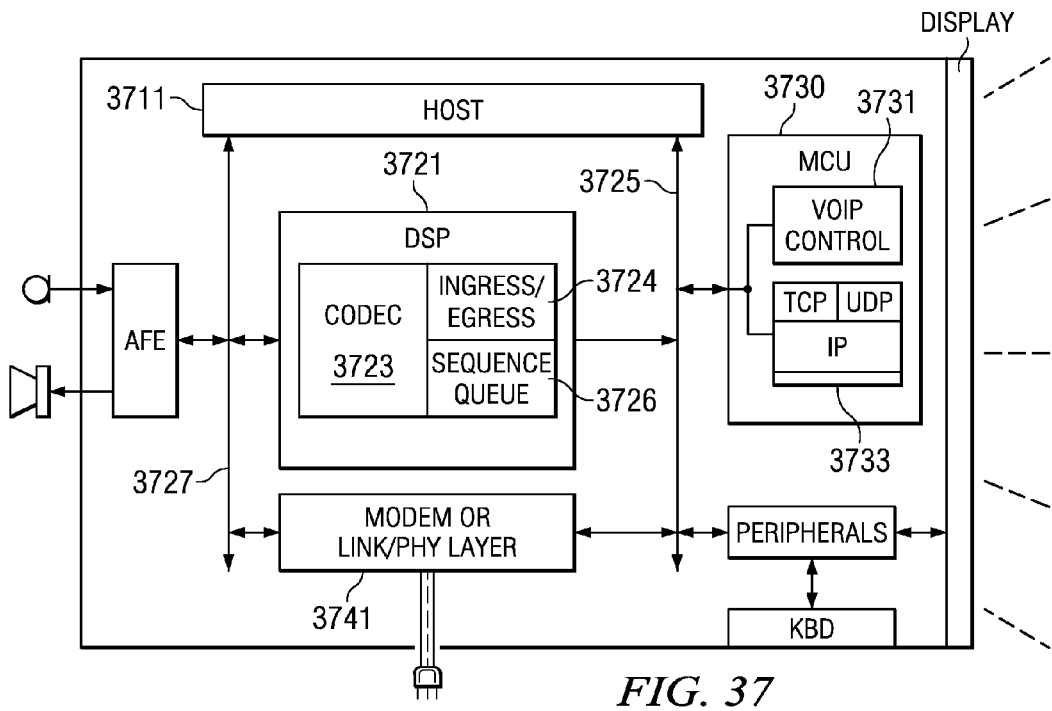
FIG. 37 is a block diagram of an inventive Internet appliance system improved with inventive processes and inventive integrated circuits as described herein.

In FIG. 37, some embodiments add memory and a control program for prestoring and playing coded speech to augment or even replace the speech codec in some appliances and talking toys that speak for themselves in normal operation or during maintenance. MCU (microcontroller unit) 3730 has a VoIP control 3731 and a TCP/UDP/IP packet network protocol stack 3733 and an ingress/egress control block 3724 and sequence queue block 3726 coupling a speech encoder/decoder 3723 to a network using the software as described elsewhere herein. Busses 3725 and 3727 couple a host computer 3711 to DSP (digital signal processor) 3721 and MCU 3730 executing the aforedescribed software and further couple all of them to a modem or Link/Physical Layer 3741, analog front end AFE to microphone and loudspeaker, and to Peripherals coupling to touchpad KBD and display. In this way, advantageous media over packet is accomplished in computers, IP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus. These and other devices are suitably connected to a packet network wirelessly or via cable, telephone lines, power lines or otherwise for remotely located monitoring, control, user commands and maintenance.

Figure 38:
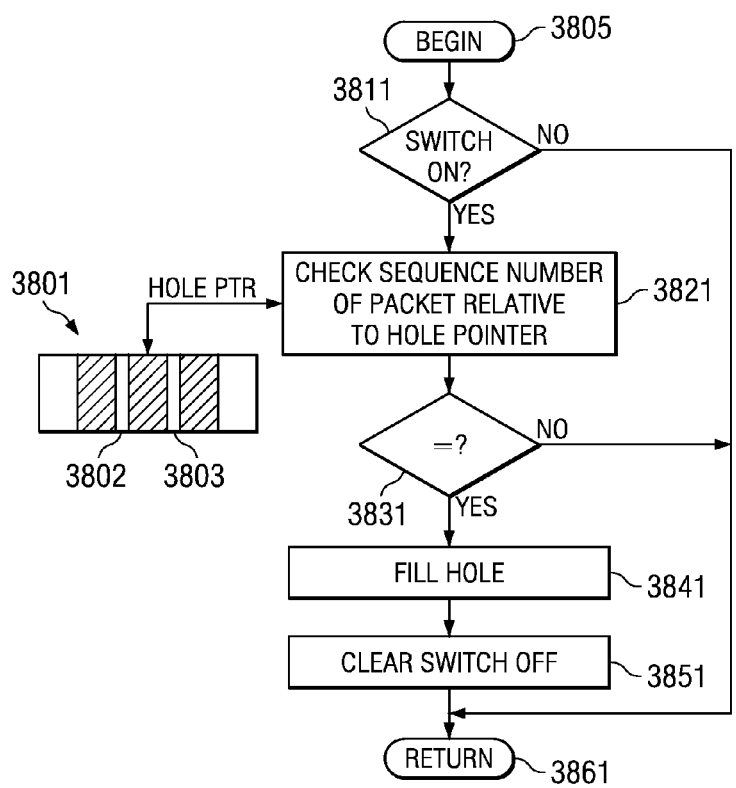
FIG. 38 is a flowchart of an inventive process for handling gaps or holes in buffer reserves of data, when such gaps or holes occur in operations of inventive integrated circuits and systems as described herein.

In FIG. 38, an embodiment advantageously addresses management of one or more gaps or holes in the reserves of FIG. 9 egress channel buffers. In FIG. 9 for simplicity, the reserves (shaded) were shown as a contiguous sequence of samples from a circular addressing point of view, even when the samples wrap around buffer boundaries as in FIG. 9 egress channel buffers D, E and F.

By contrast, in FIG. 38, two holes 3802,3803 illustratively exist in the reserve in an egress channel buffer 3801. Each incoming packet has a time stamp like a number in a sequence 1, 2, 3, 5, 6, 7. The number 4 is missing from the foregoing sequence, and represents a hole. The packet with the time stamp represented by the number 4 may arrive tardily but nevertheless in time for decode. Where the size of a reserve is used to express its priority for decode, an embodiment desirably handles reserves with holes in an intelligent manner. In one type of embodiment, the size of the reserve is still computed as the distance from beginning to end even if there are small holes. For example, software suitably starts at the smallest DI frame in the reserve and stops the count or computation as soon as a gap of a predetermined width (e.g. greater than 2 frames) is encountered. For gaps of less than or equal to the predetermined width, the count continues. In this way, a reasonable estimate of the degree to which a channel is backing up in the buffer is obtained.

The channel record 1413 of FIG. 15 is suitably enhanced with additional entries:

1) End of Egress Buffer deadline
2) Hole Pointer value
3) Switch on or off, where switch (flag) is turned on when at least one hole is present in reserve 3801, for that channel.
4) Width of hole
5) Sequence number of missing packet (if computable)

If plural holes occur, different embodiments suitably handle them. In one approach, only the hole having the most urgent deadline is tabulated in channel record 1413. In a second alternative, the two holes having the smallest deadline intervals DI are tabulated in channel record 1413. In a more complex embodiment, software tabulates all holes.

FIG. 38 shows operations for filling a hole in a process which commences at a BEGIN 3805 in response to arrival of a new packet. Next, a decision step 3811 detects whether the Hole Switch has been turned according to a monitoring process as described above. If so (YES), a next step 3821 checks the sequence number of the packet relative to the hole pointer value. Then a decision step 3831 determines if the sequence number of the packet equals the hole pointer value. If so, a step 3841 fills the hole by putting the new data from the packet, suitably decoded if need be, into the storage area that constitutes the hole. Then a step 3851 clears the Hole Switch off, whereupon a RETURN 3861 is reached. Note that if the Hole Switch was originally off in step 3811, or the packet sequence number matched no hole pointer value in step 3831, then operations branch respectively from steps 3811 and 3831 to RETURN 3861.

Thus, various embodiments shown and others as taught herein confer advantages on packet communications processes, devices and systems. Where blocks are shown herein, they are suitably implemented in hardware, firmware or software in any combination.

The embodiments described are merely illustrative, while the scope of the inventive subject matter is defined by the appended claims and equivalents thereof.

Software Examples

Software is prepared by the skilled worker according to the process examples described herein. The process leads to two main types: 1) wherein the scheduling process on the ingress side resembles that on the more difficult egress side, and 2) wherein the scheduling process on the ingress side is less complicated than that on the more difficult egress side.

Channel Control Structure

The starting point in the design is often the design of the data structures through which all programs communicate.

Each channel has an associated control block.

This block is a part of an array of the size of the maximum number of channels. The block is divided in two regions, one for the ingress (encode) side of the process, the other for the egress (decode) side. The reserved size of the regions reflects the largest requirement any process type may require for the channel specific control information. For instance the requirements of g723 may be larger than that of g729.

The structures contain several 'common elements':

Common to all types of processes and contained in these control blocks are pointers to channel data. For instance, the egress control structure will contain 'output address' (used by DMA), input address (used by decoding process to insert new data), channels context (frame to frame transition) data, etc.

Also, the control structures include the decode process ID (alg_ID). The ID is used not only to call the correct process, but also implies which structure template is used to arrange the process specific control data.

The decoder suitably receives as parameter variable containing the channel_number, or a pointer to the channel-in-question related control structure.

Main Program

The main program includes initialization and an infinite loop. Certain threads—programs running concurrently (in parallel) are provided:

1. The main program loop runs in the background and includes
A. Scheduling
(i) Testing for occurrence of one of two interrupts (which are the two other two threads)
(ii) In consequence of testing: scheduling ingress and/or egress frame tasks
B. Conditional execution of a single scheduled frame task
2. The 10-msec-interrupt and
3. The egress-packet-has-arrived-interrupt The main program loop begins with testing for interrupts, and subsequent scheduling of frame tasks for execution. The 10 msec interrupt signals the 10 msec boundary. On any one of the 10 msec boundaries and only on those boundaries any number of ingress frames may become ready.

On the egress side, each arriving packet causes an interrupt. Thus the test for occurrence of the two types of interrupts leads to scheduling for execution of the one or more of ingress frame tasks, and one or more of egress frame tasks. Multiple egress packets may be waiting to be scheduled.

After testing for interrupts, a scheduling loop moves into an execution stage. If available, a single frame task is executed, and program control returns to test for the occurrence of the interrupts.

The main loop invokes the schedule in the following way is indicated by code outline:

```
/* global */int 10 msec_boundary = 0;
/* the while loop in the "main"*/
while (1) /* more specific termination needed */
{
if (10msec_boundary = 0) continue;
10msec_boundary = 0;
scheduler ( );
};
etc.
/* the 10 msec isr */
interrupt void 10msec_isr (void)
{
10msec_boundary = 1
}
#define NR_OF_CHNLS 24
void scheduler (void)
{
int I;
for (i=0; i<NR_OF_CHNLS: i++)
{
encode(i);
decode(i);
};
}
```

Arrival of and the registration of arrival of the packets [carried out in the egress_packet_in_intrpt ( )] is completely insulated from the rest of the system. In other words, the bookkeeping chores like attaching the packet to the "arrived" queue is done by the isr (interrupt service routine) without any notifications to the rest of the system except for setting the new_egr_pkt_flag. Since no testing of the flag is done during execution of any one frame task, the number of egress packets which may have arrived, and need to be scheduled when the flag is tested, may be greater than one.

During initialization of the egress side several functions are executed on behalf of the egress side:

```
init_empty_egr_list ( );
init_channel_egr_arry ( );
test_env_init_process ( ); /* initialize test environment */
next_egr_empty_record ( ); /* notify host */
Function init_empy_egr_list ( ) operates on two arrays declared as
    egr_empty_sched_list [EGR_EMPTY_LIST_SIZE] of
egr_sched_cell struct egr_sched_cell
{
struct egr_pkt_rec * pkt_addr;
int deadline;
struct egr_sched_cell * next;
};
and
egr_pkt_storage_array [EGR_EMPTY_LIST_SIZE] of
egr_pkt_rec struct egr_pkt_rec
{
int channel_nr;
int pkt_data [MAX_PKT_STORAGE_SIZE];
};
```

Each egr_pkt_rec represents a storage whose size can accommodate the channel number, and the largest packet.

As a result of the init_empty_egr_list ( ) egr_empty_sched_list is made into a linked list, with each egr_sched_cell of the list including a pointer to an egr_pkt_rec, and the next egr_sched_cell. FIG. egr_01 illustrates the detail.

Function init_channel_egr_any ( ) operates on
egr_chnl_records [MAX NR OF CHNLS] of egr_chnl_rec
where each egr_chnl_rec is shown below

```
struct egr_chnl_rec
{
int egr_in_use; /* if 1, this egress channel is on */
int egr_deadline; /* nr of 10 msec interval till deadline */
int egr_max_10ms_prds; /* alg dependent MAX periods in frame */
int egr_exec_time; /* time (microsec) to complete frame process */
};
```

The function of init_channel_egr_arry ( ) is to clear egr_in_use for all channels.

Function test_env_init_processes ( ) is a wrapper for test initialization of specific channels to run. In the associated code a call on init_egr_chnl_(int channel_nr) initializes only the egr channel 5.

Finally next_egr_empty_record ( ) notifies the host on the address of the first available (empty) egr_pkt_rec, where the first packet will be placed.

Dynamics of the egr processes:

The host receives the addresses of the egr_pkt_rec (where it to deposits the next packet)

first by execution of next_egr_empty_record ( ) from main ( ), and subsequently, then by execution of next_egr_empty_record ( ) from within egress_packet_in_intrpt ( ).

Execution of egress_packet_in_intrpt ( )

This interrupt routine is invoked each time after the host has deposited a new packet.

This isr sets new_egr_pkt_flag relinks the packet from the empty list, and places it on the 'arrived' list and it also notifies the host of the new address for the next packet.

The reason for forming the 'arrived' list, instead of sorting the packet right into the 'scheduled' list [according to the packet deadline] is to minimize the time the system needs to be kept in the 'interrupt state' so that other interrupts can occur more freely.

Once the packet is on the 'arrived' list it is ready to be sorted into the 'scheduled' list, with one extra step explained below, in the "The 'if (new_egr_pkt_flag)' section."

The Main Loop Scheduling and Execution

The main loop is organized into two polling scheduling sections, and the execution section.

The execution section executes one 'frame task' at a time, either for egress or ingress sides, and returns to schedule the next process, if it is there. This way the maximum amount of time that any single egress packet will need to wait to be scheduled is equal to the [maximum] execution time of a single frame task.

Deadlines

When a packet arrives it has a limited amount of time to be converted to PCM data, before the corresponding channel runs out of data already accumulated.

In the presented programs an arriving packet is checked for its deadline, which is then compared with the deadlines of the packets already on the list. Thus, if the packet needs to be executed right away, it is placed on the top of list, while if it can wait it is placed somewhere down on the 'scheduled' list.

Deadlines in More Detail

The frame tasks for the egress side are scheduled according to the hard deadlines of the corresponding channels. These hard deadlines represent the amount of time from 'NOW' to such time when the channel's egress PCM data will run out. To minimize that possibility of missing the deadline, the egress frame tasks must be scheduled for execution at the time each packet arrives.

In the presented design, an arriving packet is not scheduled immediately, but soon after its arrival. The scheduling takes place whenever the currently executing frame task completes execution.

Note: To schedule the packet immediately after the arrival would require that the scheduling be carried out on the level of the isr, or by subsequent preemption of the current frame task. The latter utilizes a BIOS approach. In either case, all the updates of deadline data are mutually excluded from being used while the scheduling takes place. In this process embodiment the mutual exclusion is obtained automatically. In the case of isr or preemption, the exclusion creates another level of complexity.

The place in the execution queue ('scheduled' list) depends on the hard deadline in relation to other packets' deadlines.

In one example, the scheduling for execution is done with the resolution of 10 msec boundaries. This might seem like a very rough resolution. Notice however, that for any one packet, its hard real-time deadline is on some 10 msec boundary.

Now consider those packets that may be missed because they arrive too late for completion of intelligent scheduling of the queue as described in an embodiment above wherein the amount of time held in different list structures is updated every 10 msec. An additional process embodiment saves some of the very late packets using preemptive capabilities of BIOS.

Function update_egr_deadlines ( )

There are two separate structures, which are updated.

The amount of time from the present 10 msec tick to this channel hard real-time deadline is stored in egr_chnl_records [channel_nr].egr_deadline Naturally, for all active channels, the 10 msec interrupt causes (albeit indirectly) the .egr_deadline variable to be decremented by 1.

The variable .egr_deadline is incremented by value contained in egr_max_10 msec_prds every time a new frame is created from a packet and placed in the buffer. The incrementing is done by exec egr_pkt_( ) called by exec_a_frame task ( ) called from within the main loop in main ( ).

When the packet arrives it becomes (by being pointed at) a part of an egr_sched_cell linked list cell. Just prior to that cell being scheduled the deadline data is then copied from egr_chnl_records [channel_nr].egr_deadline into that egr_sched_cell's egr_sched_cell.deadline variable.

The second structure that is updated every 10 msec and at the same thread level as the first update process (as to avoid conflicting situations requiring a separate mutex (mutual exclusion brackets) is the 'scheduled' list.

This is done to maintain the same time reference for all its uses—time from NOW to specific HARD DEADLINE.

For the egress side the key variable is new_egr_pkt_flag which is set by the egress_packet_in_intrpt ( ) interrupt routine.

```
The 'if (new_egr_pkt_flag)' Section
{
disable_interrupts ( );
new_egr_pkt_flag = 0;
relink_egr_pkts ( );
enable_interrupts ( );
schedule_egress ( );
};
```

This section repeated below verbatim is made of two components. The first components is a 'mutual exclusion' section, which protects the current use of the 'arrived' list from simultaneous use by the egress_packet_in_intrt ( ) isr.

Further, again to minimize the locking of the system, the 'arrived' list (which may contain several packets which arrived during execution of the last frame task) is re-linked from the placeholder called 'arrived' to a placeholder called 'middle'. As soon as this is done, the mutex is completed, and new packets can be placed into the placeholder 'arrived' without interfering with, or being interfered by the scheduling and execution process.

Function schedule_egress ( )

The schedule_egress ( )

removes packets, one a time, from the 'middle' list, computes the deadline for each packet by calling egr_pkt_deadline ( )

places each packet on the 'scheduled' list by 'sorting it in according to the value of the deadline.

If the deadline has passed, the egr_cell with the attached packet are returned back to the egr_cell_pool.

If the deadline is near (less then 10 msecs) a call is made to 'emergency scheduling ( )' which can be implemented when BIOS becomes available.

Out of the Scheduling Section

The 'schedule_egress ( )' is the last function in the "if (new_egr_pkt_flag) section". The section completes falling into 'exec_a_frame task ( )'

Function 'exec_a_frame task ( )' void exec_a_frame task (void) {if (exec egr_pkt_( )) return; /* return if egr frame task has been executed, proceed otherwise */ exec_igr_frame ( );};

The exec_a_frame task execute one frame task, and returns to check the scheduling section.

The egr frame task have (in this implementation) a priority and it is being executed by a call on exec_egr_pkt_( ).

Function exec egr_pkt_( )

This function removes the packet from the top of the (egr) execution list. If that list is empty, the function returns 0.

At this point the function obtains direct access to whatever variables are needed to initiate the execution of the conversion from packet to PCM frame. For the example the function obtains channel number, and pointer to the actual packet data. In this example it is assumed that other needed variables (like decode process alg_id) are indirectly accessible by channel_nr.

The exec_egr ( ) call from inside the exec-egr_pkt_does the specific dispatching of execution.

Afterward, the egr_sched_cell is returned to the pool together with the packet storage.

Another important step is taken, and the .egr_deadline for that channel is incremented by egr_max_10 msec_prds.

What is claimed is:

1. An integrated circuit comprising:
   A. processor circuitry; and
   B. embedded instructions for operating the embedded circuitry, the embedded instructions providing for:
      i. receiving in a buffer a first packet of real-time information for one communication channel;
      ii. determining a first deadline time for the first packet, the first packet having a first deadline time for being decoded by the processing unit, past which first deadline time the first packet is discarded if not decoded;
      iii. starting decoding the first packet with the processing unit;
      iv. receiving in the buffer a second packet of real-time information for another communication channel after the starting decoding of the first packet;
      v. determining a second deadline time for the second packet, the second packet having a second deadline time for being decoded by the processing unit, past which second deadline time the second packet is discarded if not decoded, and the second deadline time being before the first deadline time;
      vi. testing to determine whether the second packet can be decoded ahead of the second deadline time by continuing decoding the first packet and then decoding the second packet;
      vii. placing the second packet in a queue if the second packet can be decoded ahead of the second deadline time by continuing decoding the first packet and then decoding the second packet; and
      viii. stopping decoding of the first packet and starting decoding of the second packet if the second packet cannot be decoded ahead of the second deadline time by continuing decoding the first packet and then decoding the second packet.

2. The integrated circuit of claim 1 in which the instructions provide for stopping decoding of the first packet and saving the decoding of the first packet before starting decoding of the second packet.

3. The integrated circuit of claim 1 in which the instructions provide for the stopping decoding of the first packet and resuming decoding of the first packet after completing decoding of the second packet.

* * * * *